United States Patent [19]
Yoshino et al.

[11] Patent Number: 6,052,143
[45] Date of Patent: Apr. 18, 2000

[54] SPINDLE UNIT CONTROL METHOD AND IMAGE FORMING APPARATUS

[75] Inventors: Satoshi Yoshino, Kawasaki; Satoshi Mifune, Hyogo; Yoshinori Wada, Kawasaki, all of Japan

[73] Assignee: Fujitsu Limited, Kawasaki, Japan

[21] Appl. No.: 08/906,161

[22] Filed: Aug. 5, 1997

[30] Foreign Application Priority Data

Jan. 8, 1997 [JP] Japan .................................. 9-001699

[51] Int. Cl.$^7$ ....................................................... B41J 2/47
[52] U.S. Cl. ........................... 347/261; 347/250; 347/254
[58] Field of Search .................................. 347/235, 248, 347/254, 261, 262, 133, 250; 331/1 A, 17; 358/298; 360/73.03; 369/53, 48; 386/88, 89

[56] References Cited

U.S. PATENT DOCUMENTS 4,613,877  9/1986  Spencer et al. ......................... 347/133
5,095,315  3/1992  Takeyama ............................... 347/235

FOREIGN PATENT DOCUMENTS 3-182355  8/1991  Japan .

*Primary Examiner*—N. Le
*Assistant Examiner*—Hai C Pham
*Attorney, Agent, or Firm*—Armstrong, Westerman, Hattori, McLeland, & Naughton

[57] ABSTRACT

A spindle unit control method controls a plurality of spindle units which rotate in synchronism with each other, and comprises with respect to each of the spindle units a first step of obtaining a phase error by comparing phases of a detection signal indicating a rotary reference position of the spindle unit and a first clock signal, a second step of generating a second clock signal having a phase which is adjusted by delaying or advancing the phase of the first clock signal by the phase error, and a third step of controlling the rotation of the spindle unit by a phase locked loop based on the detection signal and the second clock signal. The first clock signal is used in common with respect to each of the spindle units, and the second clock signal is independent for each of the spindle units.

26 Claims, 42 Drawing Sheets

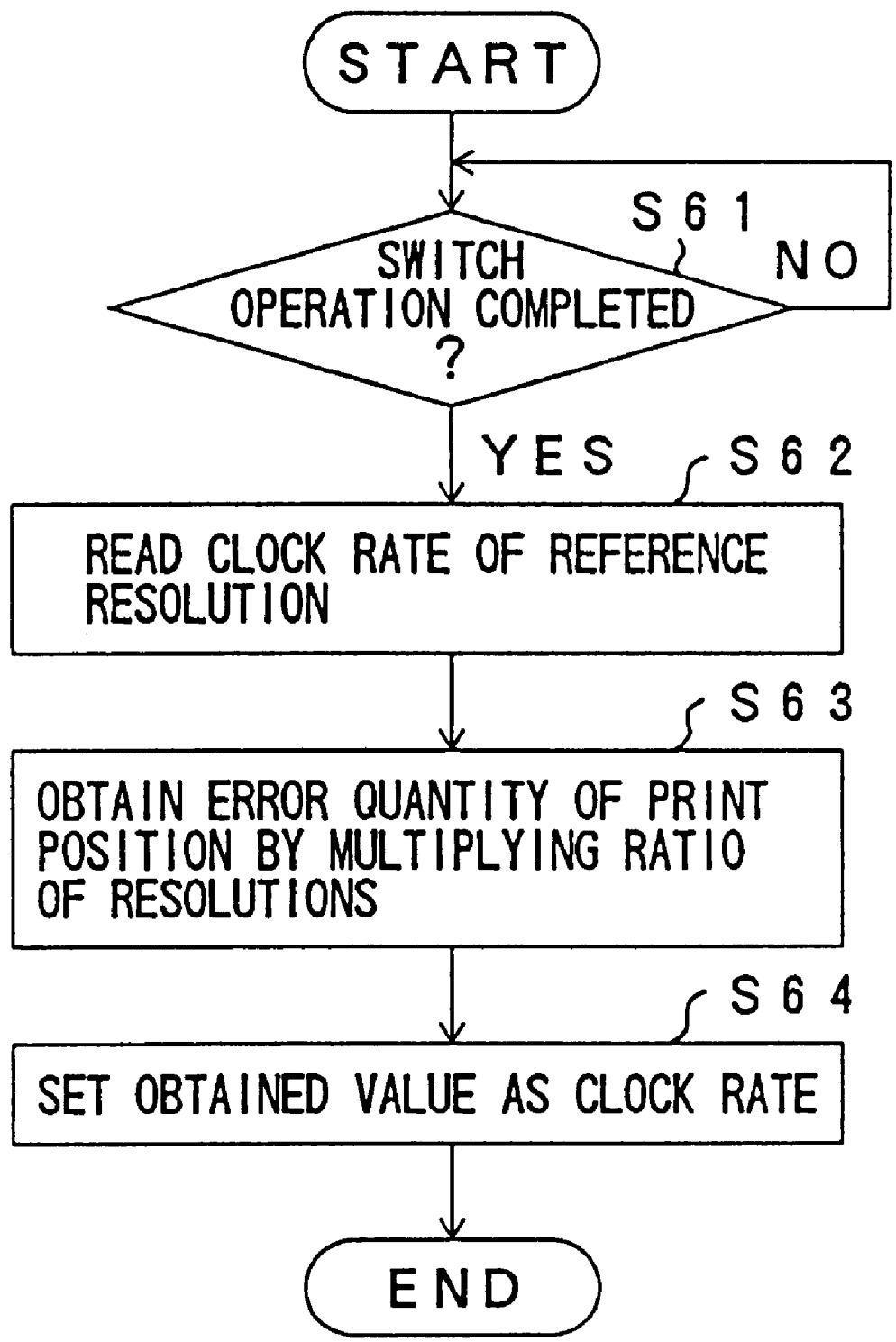

SPINDLE UNIT CONTROL METHOD AND IMAGE FORMING APPARATUS

BACKGROUND OF THE INVENTION

The present invention generally relates to spindle unit control methods and image forming apparatuses, and more particularly to a spindle unit control method and an image forming apparatus which are suited for forming an image having a high quality.

For example, a spindle unit includes a polygonal mirror which is provided on a rotatable spindle, and by irradiating a light beam such as a laser beam on the rotating polygonal mirror, it is possible to optically write image data by scanning a photoconductive body by a reflected light beam from the polygonal mirror. Accordingly, in order to form an image having a high quality, it is desirable that a scan position of the light beam of the spindle unit is controlled with a high accuracy.

Recently, in image forming apparatuses such as copying machines and printers, opportunities of forming a color image on a medium such as paper have become more frequent. When forming the color image, a plurality of spindle units are used. Hence, in order to form a color image having a high quality, it is desirable to control the plurality of spindle units with a high accuracy so as to rotate in synchronism with each other.

FIG. 1 is a diagram showing an example of a part of a conventional image forming apparatus. In FIG. 1, the image forming apparatus generally includes optical units 101 through 104, photoconductive drums 111 through 114 and developing units 121 through 124 which are respectively provided with respect to yellow (Y), magenta (M), cyan (C) and black (K), and a transport belt 1111 which transports paper 100 in a paper transport path 110. The optical unit 101 optically writes an image on the photoconductive drum 111, and the written image is developed by the developing unit 121, thereby forming a toner image on the photoconductive drum 111. This toner image is transferred onto the paper 100 which is transported. Images are similarly transferred onto the transported paper 100 by the other photoconductive drums 112 through 114. Since the paper 100 in the paper transport path 110 successively makes contact with the photoconductive drums 111 through 114, Y, M, C and K images are successively transferred onto the paper 100 in an overlapping manner, so as to finally transfer a multi-color image on the paper 100.

If the Y image transferred onto the paper 100 by the photoconductive drum 111 and the M image transferred onto the paper 100 by the photoconductive drum 112 do not perfectly overlap, a color printing error occurs and greatly deteriorates the image quality. With respect to the C and B images which are transferred onto the paper 100 by the other photoconductive drums 113 and 114, these C and B images must also overlap perfectly.

When a pitch between two mutually adjacent photoconductive drums is denoted by P mm and a paper transport speed is denoted by V mm/sec, the two images transferred onto the paper 100 by these two mutually adjacent photoconductive drums should overlap perfectly if a time difference T of image transfers made by the two mutually adjacent photoconductive drums satisfies a relationship T=P/S.

For the sake of convenience, it will be assumed that the above described time difference T is an integral multiple of a main scan period C of the photoconductive drum of each optical unit, that is, T=nC, where n is an integer. In this case, main scan start timings of the optical units must be synchronized. In addition, even in a case where the above described time difference T is not an integral multiple of the main scan period C of the photoconductive drum of each optical unit, the main scan start timings of the optical units must still be synchronized with a certain phase error. In the following description, it is assumed for the sake of convenience that the relationship T=nC stands.

When the main scan start timings of two optical units are synchronized, a dot D1 written by one optical unit and a dot D2 written by the other optical unit have the relationship T=nC on the time base as shown in FIG. 2, and the two dots D1 and D2 perfectly overlap on the paper 100. However, if the main scan start timings of the two optical units are not synchronized, a dot D3 written by one optical unit and a dot D4 written by the other optical unit have a relationship T=mC+α on the time base, where m is an integer and α is an error quantity, and the two dots D3 and D4 do not overlap perfectly on the paper 100, thereby generating a dot printing error.

FIG. 3 is a diagram for explaining an example of a conventional spindle unit control method. In FIG. 3, each of the optical units 101 through 104 are controlled in the same manner, and thus, only the control with respect to the optical unit 101 will be described. The optical unit 101 includes a laser 131 which emits a laser beam, a spindle unit 132 which is rotated by a motor 133, and a BD detector 134. The spindle unit 132 includes a spindle which is rotated by the motor 133, and a polygonal mirror which is fixed on the spindle. The laser beam from the laser 131 is reflected by the polygonal mirror and scans the corresponding photoconductive drum 111. The BD detector 134 detects a rotary reference position of the polygonal mirror, and outputs a BD signal which indicates the main scan start timing.

A Hall element frequency generator 135 detects a rotational speed (period) of the motor 133, and supplies a FG signal to a phase locked loop (PLL) control circuit 136. The PLL control circuit 136 controls the rotation of the motor 133 by a feedback control based on a reference clock signal RCLK from a reference clock oscillator 139 and the FG signal from the Hall element frequency generator 135.

However, according to the conventional method shown in FIG. 3, no consideration was given whatsoever with respect to the phase relationship of the reference clock signal RCLK and the BD signal. Ideally, the reference clock signal RCLK and BD signals BD1 through BD4 obtained in each of the optical units 101 through 104 should be synchronized as shown in FIG. 4. However, because the phase relationship of the reference clock signal RCLK and the BD signal is actually not controlled, the phase relationship of the reference clock signal RCLK and each of the BD signals BD1 through BD4 becomes indefinite as shown in FIG. 5. For this reason, it was impossible to perfectly synchronize the optical units 101 through 104 so as not to generate the dot printing error described above.

Accordingly, a method has been proposed which supplies the BD signal from the BD detector 134 to the PLL control circuit 136 in place of the FG signal from the Hall element frequency generator 135, as shown in FIG. 6. In FIG. 6, those parts which are the same as those corresponding parts in FIG. 3 are designated by the same reference numerals, and a description thereof will be omitted. In this case, the rotation of the motor 133 is controlled by a feedback control based on the reference clock signal RCLK from the reference clock oscillator 139 and the BD signal from the BD detector 134.

But according to the method shown in FIG. 6, although consideration is given as to the phase relationship of the reference clock signal RCLK and the BD signal, the phase relationship of the reference clock signal RCLK and each of the BD signals BD1 through BD4 becomes essentially fixed. As a result, it is impossible to cope with a change in load, change with time, temperature change and the like in each of the optical units 101 through 104, and it was impossible to perfectly synchronize the optical units 101 through 104 so that the dot printing error described above will not occur.

The speeds (periods) of the reference clock signal RCLK and the FG signal or the BD signal are compared in the PLL control circuit 136, and the motor 133 is driven by a speed control output AFC which is dependent on a result of the speed comparison. In addition, when the rotational period of the motor 133 becomes within ±1% of a certain prescribed value, for example, the PLL control circuit 136 starts the phase comparison between the reference clock signal RCLK and the FG signal or the BD signal. For example, a phase control output APC which is dependent on a phase difference between a rising edge of the reference clock signal RCLK and a rising edge of the FG signal or the BD signal is output from the PLL control circuit 136. Accordingly, an energy described by f(VAFC−VAPC) is supplied to the motor 133 from the PLL control circuit 136.

FIG. 7 is a time chart showing the relationship of the reference clock signal RCLK, the FG signal, the phase control output APC, and the speed control output AFC. In FIG. 7, φ denotes a phase error between the reference clock signal RCLK and the FG signal. As shown in FIG. 7, an energy component VAPC of the phase control output APC and an energy component VAFC of the speed control output AFC respectively vary depending on the change in load, change with time, temperature change and the like of the optical unit. In other words, the phase error between the reference clock signal RCLK and the FG signal or the BD signal is determined by the characteristic of each individual optical unit and the environment of each optical unit such as the temperature, and the phase error is not always constant.

Hence, when the spindle unit is controlled depending on the comparison result of the comparison between the reference clock signal RCLK and the FG signal or the BD signal, it is impossible to perfectly synchronize a plurality of spindle units so as to prevent the dot printing error, and there was a problem in that the quality of the image becomes deteriorated.

On the other hand, depending on the characteristic of the spindle unit, intervals of the dots formed on the photoconductive drum sometimes deviated along the main scan direction. In addition, the focal distance of the spindle unit with respect to the photoconductive drum differs for each of the spindle units, and the scan width of the photoconductive drum in the main scan direction differs for each of the spindle units. For this reason, the dot printing error was easily generated particularly among the Y, M, C and K images when forming the multi-color image. Therefore, it was desirable to suppress the dot printing error in the main scan direction.

SUMMARY OF THE INVENTION

Accordingly, it is a general object of the present invention to provide a spindle unit control method and an image forming apparatus, in which the problems described abore are elimianted.

More particularly, it is a first object of the present invention to provide a spindle unit control method and an image forming apparatus which can improve the quality of an image by preventing a dot printing error among a plurality of spindle units in the image which is finally formed on a medium.

In addition, it is a second object of the present invention to provide a spindle unit control method and an image forming apparatus which can improve the quality of an image by preventing a dot printing error in the image which is finally formed on a medium, regardless of characteristics and focal distances of spindle units.

Another object of the present invention is to provide a spindle unit control method which controls a plurality of spindle units which rotate in synchronism with each other, the spindle unit control method with respect to each of the spindle units comprising a first step of obtaining a phase error by comparing phases of a detection signal indicating a rotary reference position of the spindle unit and a first clock signal, a second step of generating a second clock signal having a phase which is adjusted by delaying or advancing the phase of the first clock signal by the phase error, and a third step of controlling the rotation of the spindle unit by a phase locked loop based on the detection signal and the second clock signal, the first clock signal being used in common with respect to each of the spindle units, the second clock signal being independent for each of the spindle units. According to the spindle unit control method of the present invention, it is possible to prevent a dot printing error among a plurality of spindle units in an image which is finally formed on a medium, and the quality of the image is improved.

Still another object of the present invention is to provide an image forming apparatus comprising a plurality of spindle units which rotate in synchronism with each other, the image forming apparatus, with respect to each of the spindle units, comprising phase comparing means for obtaining a phase error by comparing phases of a detection signal indicating a rotary reference position of the spindle unit and a first clock signal, phase adjusting means for generating a second clock signal having a phase which is adjusted by delaying or advancing the phase of the first clock signal by the phase error, and control means for controlling the rotation of the spindle unit by a phase locked loop based on the detection signal and the second clock signal, the first clock signal being used in common with respect to each of the spindle units, the second clock signal being independent for each of the spindle units. According to the image forming apparatus of the present invention, it is possible to prevent a dot printing error among a plurality of spindle units in an image which is finally formed on a medium, and the quality of the image is improved.

A further object of the present invention is to provide a spindle unit control method comprising a first step of dividing a scan interval which is scanned by a light beam from a spindle unit into a plurality of sections in a main scan direction, and correcting a video clock rate which indicates a minimum unit of image data within each of the sections depending on a characteristic of the spindle unit, and a second step of correcting the video clock rate depending on distances between the spindle unit and each of the sections. According to the spindle unit control method according to the present invention, it is possible to improve the quality of an image by preventing a dot printing error in the image which is finally formed on a medium, regardless of characteristics and focal distances of the spindle units.

Another object of the present invention is to provide an image forming apparatus comprising a spindle unit scanning a to-be-scanned member by a light beam, first means for dividing a scan interval of the to-be-scanned member which is scanned by the light beam into a plurality of sections in a main scan direction, and correcting a video clock rate which indicates a minimum unit of image data within each of the sections depending on a characteristic of the spindle unit, and second means for correcting the video clock rate depending on distances between the spindle unit and each of the sections. According to the image forming apparatus of the present invention, it is possible to improve the quality of an image by preventing a dot printing error in the image which is finally formed on a medium, regardless of characteristics and focal distances of the spindle units.

Therefore, according to the present invention, it is possible to prevent a dot printing error in an image which is finally formed on a medium by controlling spindle units, and the quality of the image is greatly improved.

BRIEF DESCRIPTION OF THE DRAWINGS

FIG. 42 is a flow chart for explaining an embodiment of a process of a CPU.

DESCRIPTION OF THE PREFERRED EMBODIMENTS

In the present invention, when controlling a plurality of spindle units which rotate in synchronism with each other, a phase error is obtained by comparing phases of a first clock signal and a detection signal which indicates a rotary reference position of the spindle unit, with respect to each of the spindle units. A second clock signal is generated by adjusting the phase of the first clock signal so that the phase of the first clock signal is delayed or advanced by the phase error. The rotation of the spindle unit is controlled by a phase locked loop based on the detection signal and the second clock signal. The first clock signal is used in common among each of the spindle units, and the second clock signal is independent for each of the spindle units. Accordingly, a dot printing error among the plurality of spindle units is prevented in an image which is finally formed on a medium, and it is therefore possible to improve the quality of the image.

Further, in the present invention, a scan interval which is scanned by a light beam from the spindle unit is divided into a plurality of sections in a main scan direction, and a video clock rate which indicates a minimum unit of image data within each of the sections is corrected depending on a characteristic of the spindle unit. In addition, the video clock rate is corrected depending on distances between the spindle unit and each of the sections. As a result, it is possible to improve the quality of an image by preventing a dot printing error in the image which is finally formed on a medium, regardless of characteristic and focal distance of the spindle unit.

Figure 1:
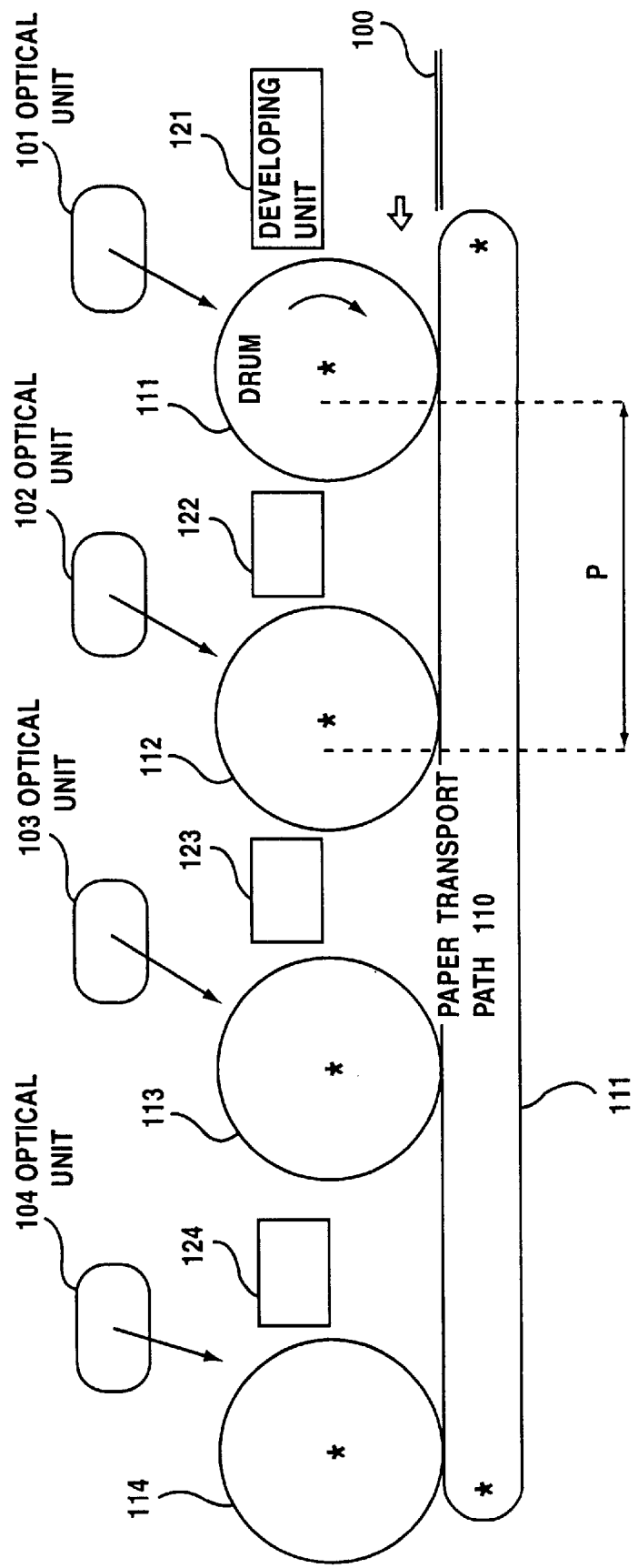
FIG. 1 is a diagram showing a part of an example of a conventional image forming apparatus.
Figure 2:
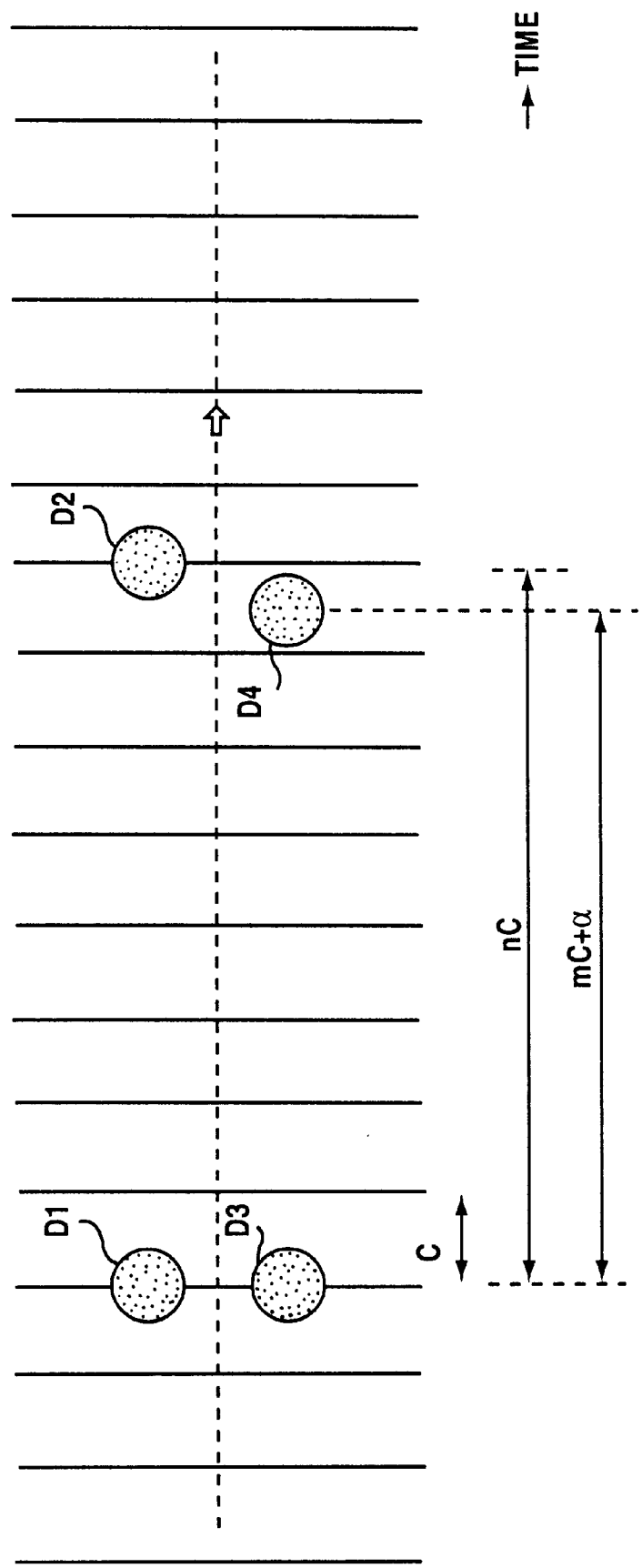
FIG. 2 is a diagram for explaining a dot printing error.
Figure 8:
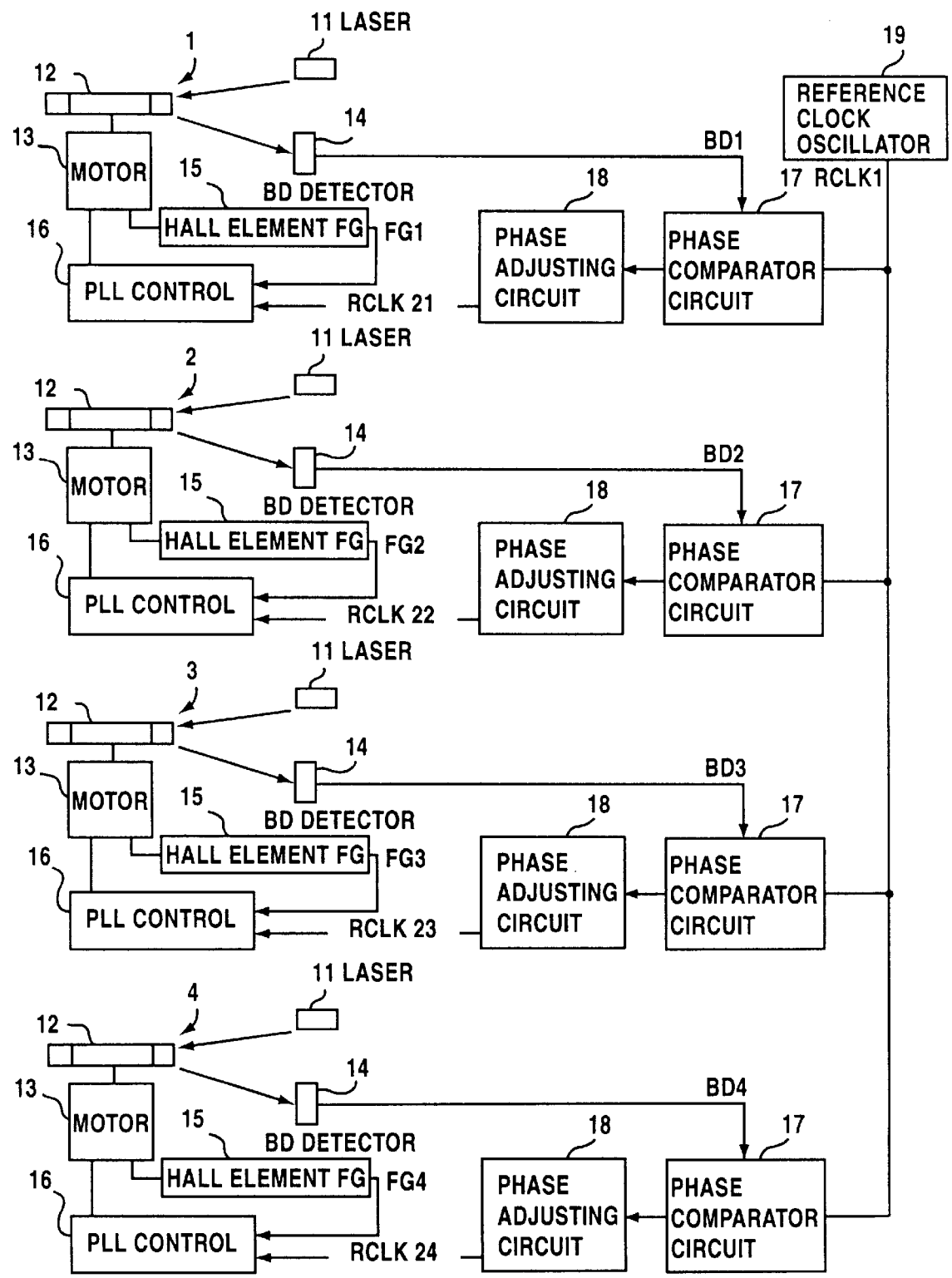
FIG. 8 is a diagram showing a part of the construction of a first embodiment of an image forming apparatus according to the present invention.

FIG. 8 is a diagram showing the construction of a part of a first embodiment of an image forming apparatus according to the present invention. The first embodiment of the image forming apparatus employs a first embodiment of a spindle unit control method according to the present invention. In the first embodiment of the image forming apparatus, the present invention is applied to a multi-color printer, and the basic construction of the image forming part may be that shown in FIG. 1, for example, or any other known construction including a plurality of image forming units. For the sake of convenience, it is assumed that the image forming part has the basic construction shown in FIG. 1.

In FIG. 8, the image forming apparatus includes optical units 1 through 4 which are provided in correspondence with yellow (Y), magenta (M), cyan (C) and black (K). Each of the optical units 1 through 4 is controlled in the same manner, and thus, a description will only be given with respect to the control with respect to the optical unit 1. The optical unit 1 includes a laser 11 which emits a laser beam, a spindle unit 12 which is rotated by a motor 13, and a BD detector 14. The spindle unit 12 includes a spindle which is rotated by the motor 13, and a polygonal mirror which is fixed on the spindle. The laser beam from the laser 11 is reflected by the polygonal mirror and scans a corresponding photoconductive drum such as the photoconductive drum 111 shown in FIG. 1. The BD detector 14 detects a rotary reference position of the polygonal mirror, and outputs a BD signal which indicates a main scan start timing, that is, a BD signal BD1 in this case. A phase comparator circuit 17 compares the phases of the BD signal BD1 and a reference clock signal RCLK1 from a reference clock oscillator 19. A phase adjusting circuit 18 adjusts the phase of the reference clock signal RCLK1 by delaying or advancing the phase of the reference clock signal RCLK1, depending on a phase error between the BD signal BD1 and the reference clock signal RCLK1, which is obtained from the phase comparator circuit 17, so as to generate a clock signal RCLK2. In this case, the phase adjusting circuit 18 generates and outputs a clock signal RCLK21. This clock signal RCLK21 has the same frequency (period) as the reference clock signal RCLK1.

A Hall element frequency generator 15 detects the rotational speed (period) of the motor 13 and supplies to a phase locked loop (PLL) control circuit 16 a FG signal, that is, a FG signal FG1 in this case. The PLL control circuit 16 controls the rotation of the motor 13 by a feedback control, based on the clock signal RCLK21 from the phase adjusting circuit 18 and the FG signal FG1 from the Hall element frequency generator 15.

Similar feedback controls are carried out in the other optical units 2 through 4, respectively based on independent FG signals FG2 through FG4 and clock signals RCLK22 through RCLK24.

Figure 9:
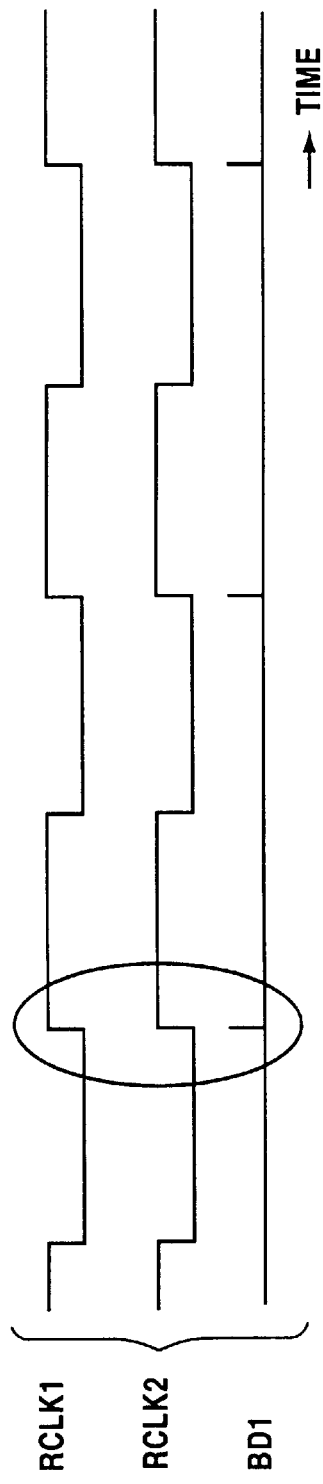
FIG. 9 is a time chart for explaining the operation of the first embodiment of the image forming apparatus.

In other words, as shown in FIG. 9, the PLL control circuit 16 carries out the feedback control so that the rising edge of the reference clock signal RCLK1 and the rising edge of the BD signal are synchronized.

Figure 10:
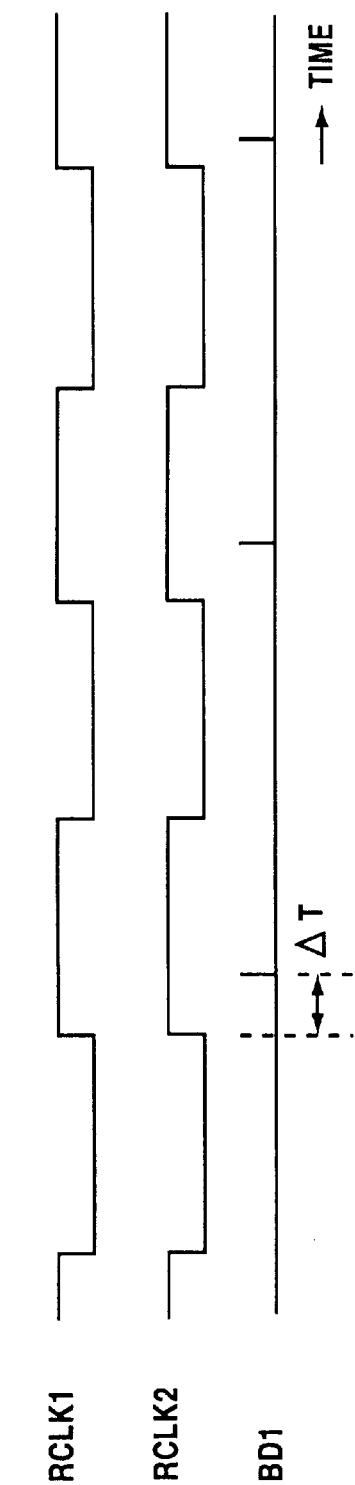
FIG. 10 is a time chart for explaining the operation of the first embodiment of the image forming apparatus.

First, the clock signal RCLK2 having the same frequency as the reference clock signal RCLK1 is output from the phase adjusting circuit 18 depending on the phase error between the reference clock signal RCLK1 and the BD signal BD1, and this clock signal RCLK2 is supplied to the PLL control circuit 16. Hence, when the clock signal RCLK2 supplied to the PLL control circuit 16 has the same phase as the reference clock signal RCLK1 as shown in FIG. 10, the BD signal BD1 is output from the BD detector 14 with a phase error $\Delta T$ with respect to the reference clock signal RCLK1.

The above described phase error $\Delta T$ is measured in the phase comparator circuit 17, and the phase adjusting circuit 18 shifts the phase of the reference clock signal RCLK1 depending on the measured result, so as to generate and supply the clock signal RCLK2 to the PLL control circuit 16.

Figure 11:
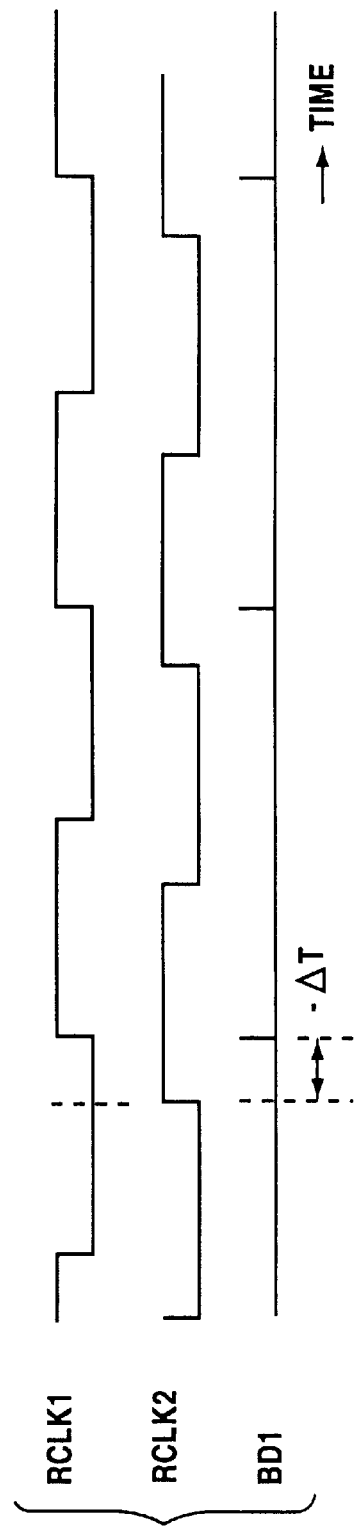
FIG. 11 is a time chart for explaining the operation of the first embodiment of the image forming apparatus.
Figure 12:
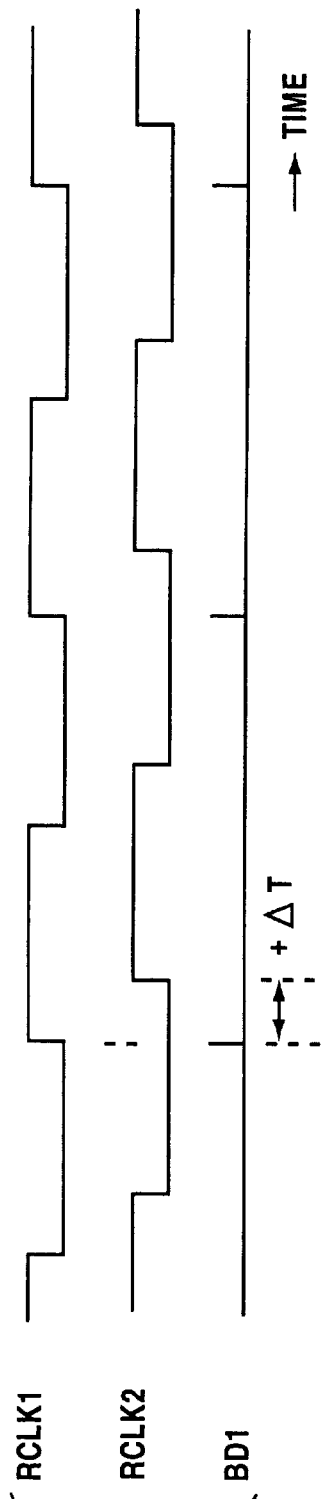
FIG. 12 is a time chart for explaining the operation of the first embodiment of the image forming apparatus.

As a result, when the clock signal RCLK2 having a phase error $-\Delta T$ with respect to the reference clock signal RCLK1 as shown in FIG. 11 is supplied to the PLL control circuit 16, the rising edge of the BD signal BD1 output from the BD detector 14 becomes synchronized to the rising edge of the reference clock signal RCLK1. In addition, when the clock signal RCLK2 having a phase error $+\Delta T$ with respect to the reference clock signal RCLK1 as shown in FIG. 12 is supplied to the PLL control circuit 16, the rising edge of the BD signal BD1 output from the BD detector 14 becomes synchronized to the rising edge of the reference clock signal RCLK1.

Figure 13:
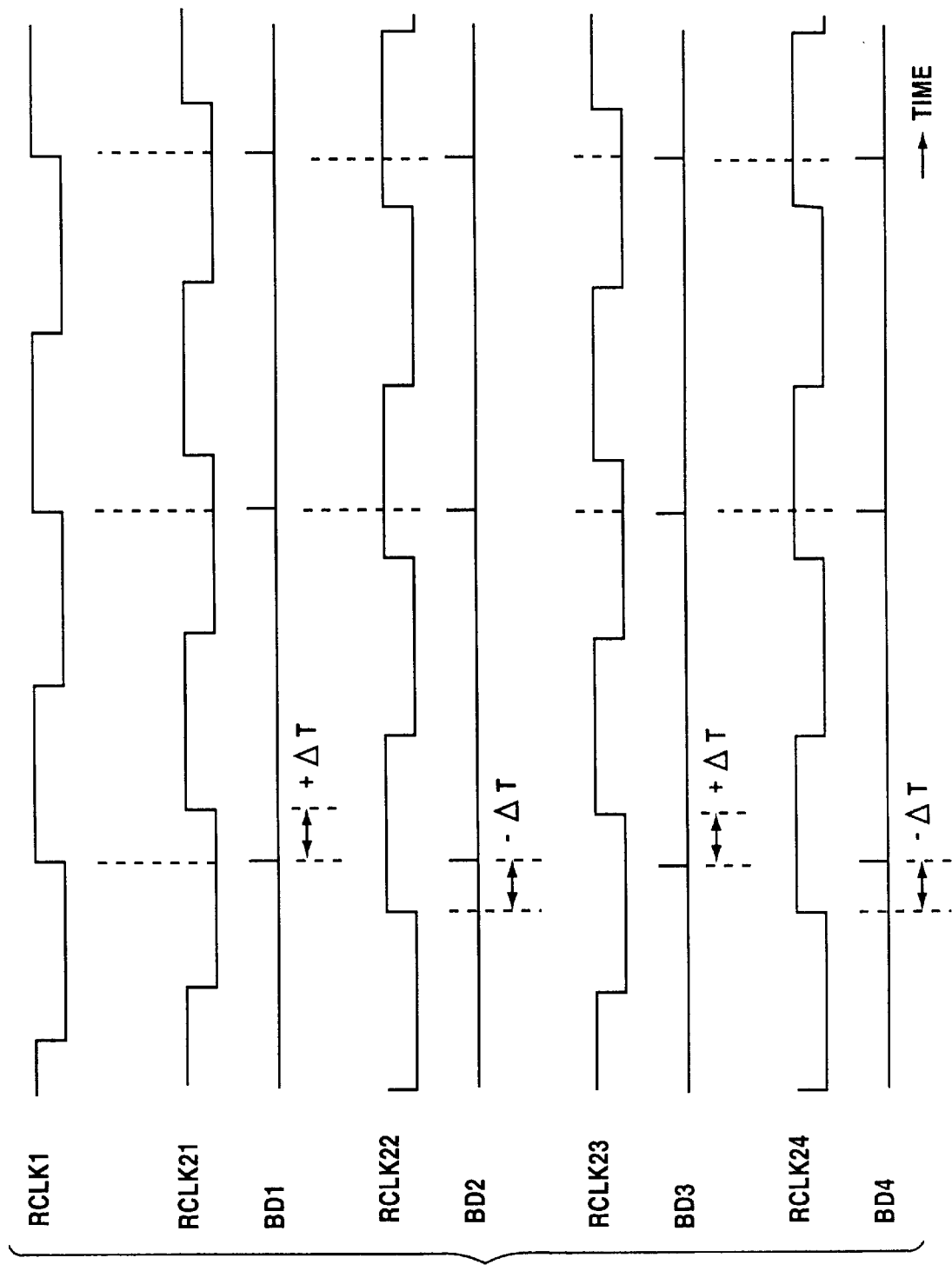
FIG. 13 is a time chart for explaining the operation of the first embodiment of the image forming apparatus.

Accordingly, by carrying out controls similar to the above in each of the optical units 1 through 4, the rising edges of the BD signals BD1 through BD4 output from the respective BD detectors 14 become synchronized to the rising edge of the reference clock signal RCLK1 as shown in FIG. 13. The phase errors between the reference clock signal RCLK1 and the FG signals FG1 through FG4 and the phase errors between the reference clock signal RCLK1 and the BD signals BD1 through BD4 change depending on the change in load, change with time, temperature change and the like of the optical units. In other words, the phase errors between the reference clock signal RCLK1 and the FG signals FG1 through FG4 and the phase errors between the reference clock signal RCLK1 and the BD signals BD1 through BD4 are determined by the characteristics and the environments such as the temperature of each of the individual optical units 1 through 4, and are not always constant. But according to this embodiment, it is possible to synchronize the rising edges of the BD signals BD1 through BD4 to the rising edge of the reference clock signal RCLK1 regardless of the above described changes. For this reason, it is possible to prevent a dot printing error from being generated among a plurality of spindle units in the image which is finally formed on the medium, and the quality of the image can be improved.

Figure 14:
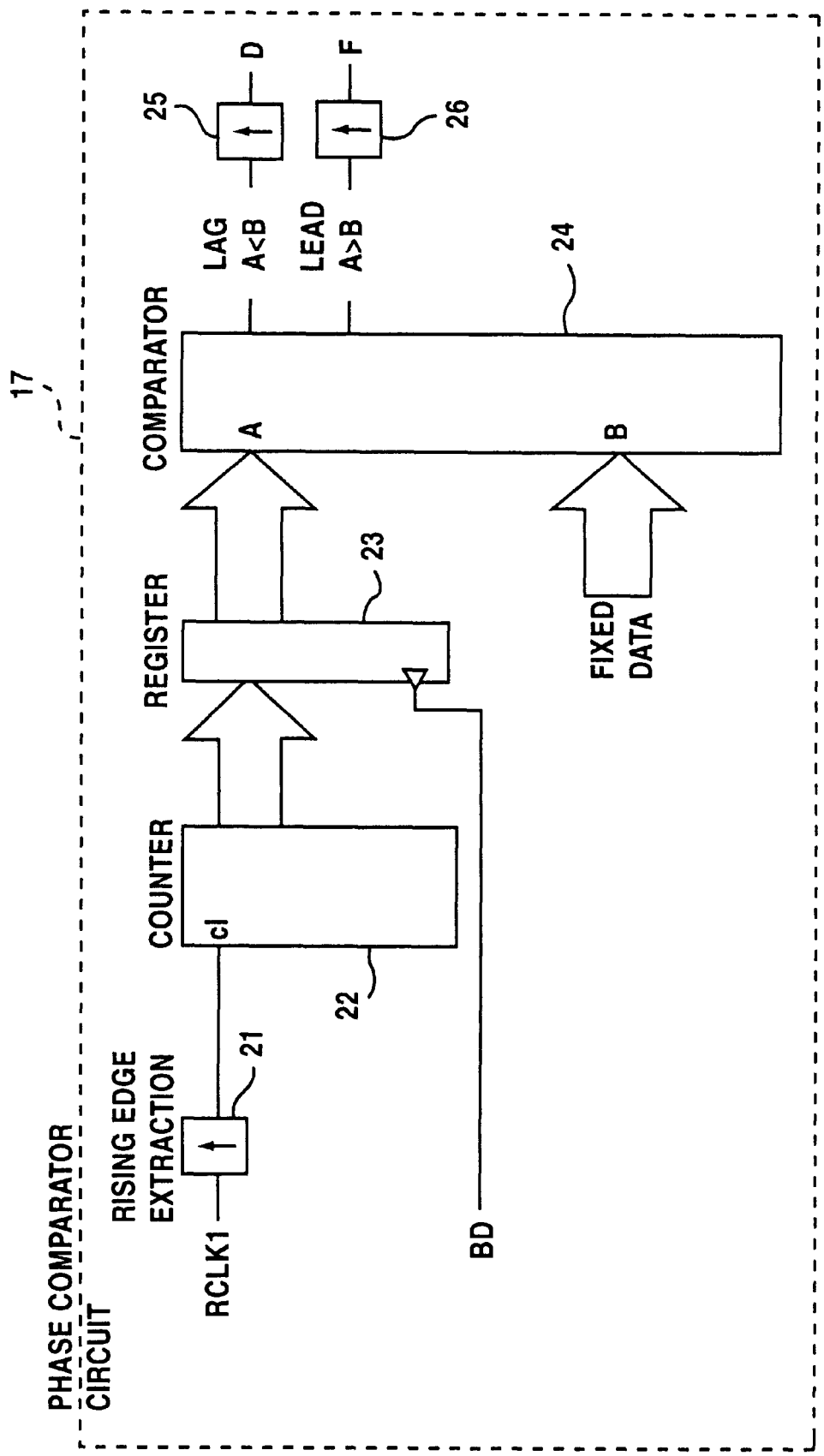
FIG. 14 is a system block diagram showing a first embodiment of a phase comparator circuit.
Figure 15:
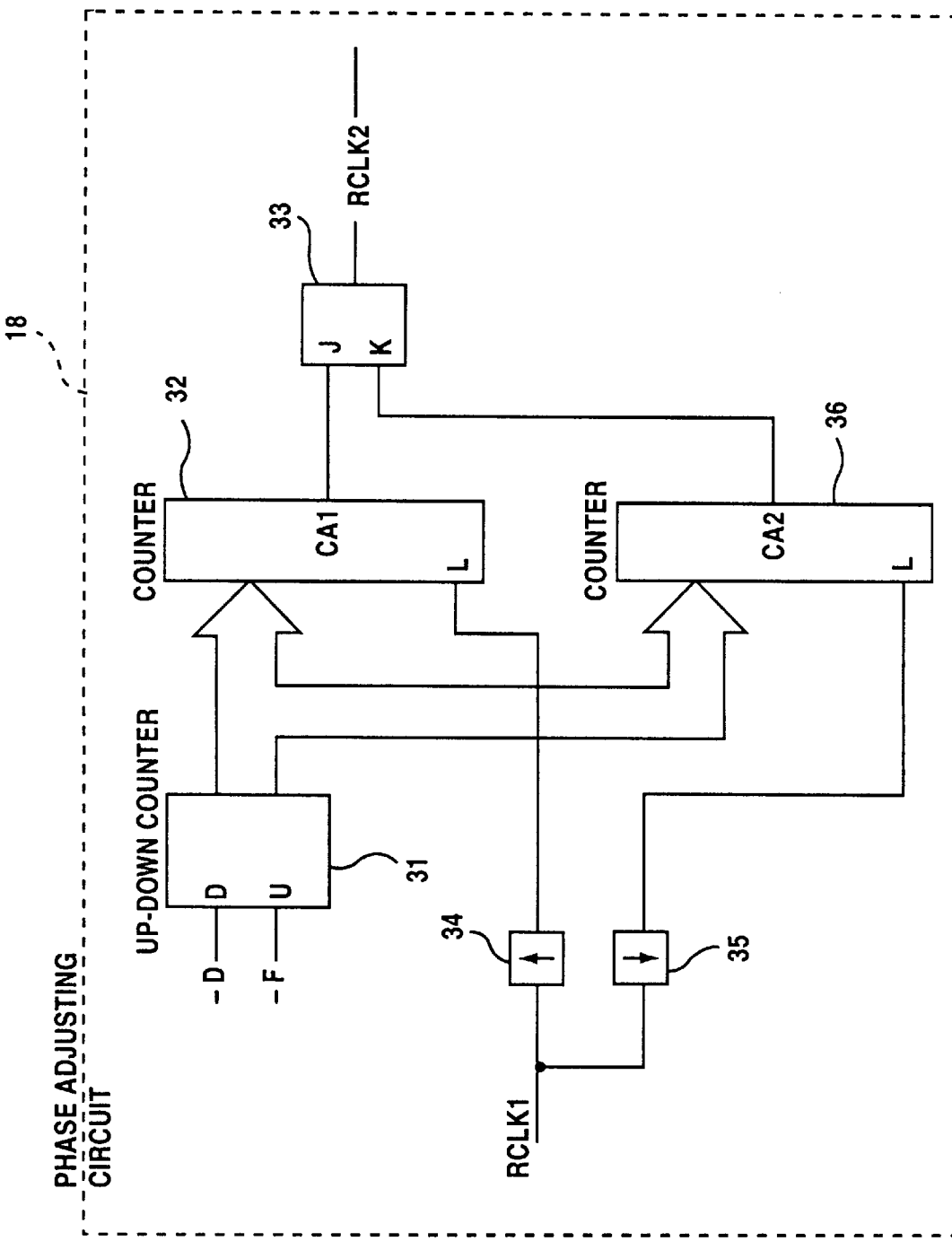
FIG. 15 is a system block diagram showing a first embodiment of a phase adjusting circuit.

FIG. 14 is a system block diagram showing a first embodiment of the phase comparator circuit 17 of this embodiment. FIG. 15 is a system block diagram showing a first embodiment of the phase adjusting circuit 18 of this embodiment.

In FIG. 14, the phase comparator circuit 17 includes a rising edge extracting circuit 21, a counter 22, a register 23, a comparator 24, and rising edge extracting circuits 25 and 26 which are connected as shown. The rising edge of the reference clock signal RCLK1 from the reference clock oscillator 19 is extracted by the rising edge extracting circuit 21 and is supplied to a clear terminal c1 of the counter 22, and the counter 22 starts a count-up operation responsive thereto. A counted value of the counter 22 is supplied to the register 23, and when the rising edge of the BD signal from the BD detector 14 is supplied to the register 23, the counted value at this point in time is supplied from the register 23 to a port A of the comparator 24. A predetermined fixed data indicating ½ the main scan period is supplied to a port B of the comparator 24. When the value supplied to the port A is smaller than the value supplied to the port B, that is, when the rising edge of the BD signal is lagging the rising edge of the reference clock signal RCLK1, a signal corresponding to this phase lag is output from the comparator 24, the rising edge of this signal from the comparator 24 is extracted by the rising edge extracting circuit 25, and a corresponding signal D is supplied to the phase adjusting circuit 18. On the other hand, when the value supplied to the port A is larger than the value supplied to the port B, that is, when the rising edge of the BD signal is leading the rising edge of the reference clock signal RCLK1, a signal corresponding to this phase lead is output from the comparator 24, the rising edge of this signal from the comparator 24 is extracted by the rising edge extracting circuit 26, and a corresponding signal F is supplied to the phase adjusting circuit 18.

In FIG. 15, the phase adjusting circuit 18 includes an up-down counter 31, a counter 32, a JK flip-flop 33, a rising edge extracting circuit 34, a falling edge extracting circuit 35, and a counter 36 which are connected as shown. For example, the signal D from the phase comparator circuit 17 shown in FIG. 14 is supplied to a down terminal D of the up-down counter 31, and the signal F from the phase comparator circuit 17 is supplied to an up terminal U of the up-down counter 31. The up-down counter 31 starts a count-down operation when a signal is received at the down terminal D, and starts a count-up operation when a signal is received at the up terminal U. A counted value of this up-down counter 31 is supplied to the counters 33 and 36.

The reference clock signal RCLK1 from the reference clock oscillator 19 is supplied to the rising edge extracting circuit 34 and the falling edge extracting circuit 35. In the case of FIG. 8, the reference clock signal RCLK1 from the reference clock oscillator 19 passes through the phase comparator circuit 17 as it is, and is supplied to the phase adjusting circuit 18. The rising edge extracting circuit 34 supplies to a load terminal L of the counter 32 a signal which is obtained by extracting the rising edge of the reference clock signal RCLK1. On the other hand, the falling edge extracting circuit 35 supplies to a load terminal L of the counter 36 a signal which is obtained by extracting the falling edge of the reference clock signal RCLK1. The counters 32 and 36 respectively load the counted value from the up-down counter 31 when a signal is received at the load terminal L thereof. A signal output from an output terminal CA1 of the counter 32 is supplied to a J-terminal of the JK flip-flop 33, and a signal output from an output terminal CA2 of the counter 36 is supplied to a K-terminal of the JK flip-flop 33. The JK flip-flop 33 outputs the clock signal RCLK2 and supplies this clock signal RCLK2 to the PLL control circuit 16 shown in FIG. 8.

In other words, responsive to the signal D or F from the phase comparator circuit 17, the phase adjusting circuit 18 supplies a signal to the J-terminal or the K-terminal of the JK flip-flop 33 to operate the JK flip-flop 33 after a time corresponding to the counted value of the up-down counter 31 from the rising edge of the reference clock signal RCLK1, so as to raise the level of the clock signal RCLK2. Thus, the clock signal RCLK2 which has the same period as the reference clock signal RCLK1 and has the phase which is lags or leads the phase of the reference clock signal RCLK1 by an amount corresponding to the counted value of the up-down counter 31 is output from the JK flip-flop 33.

Figure 16:
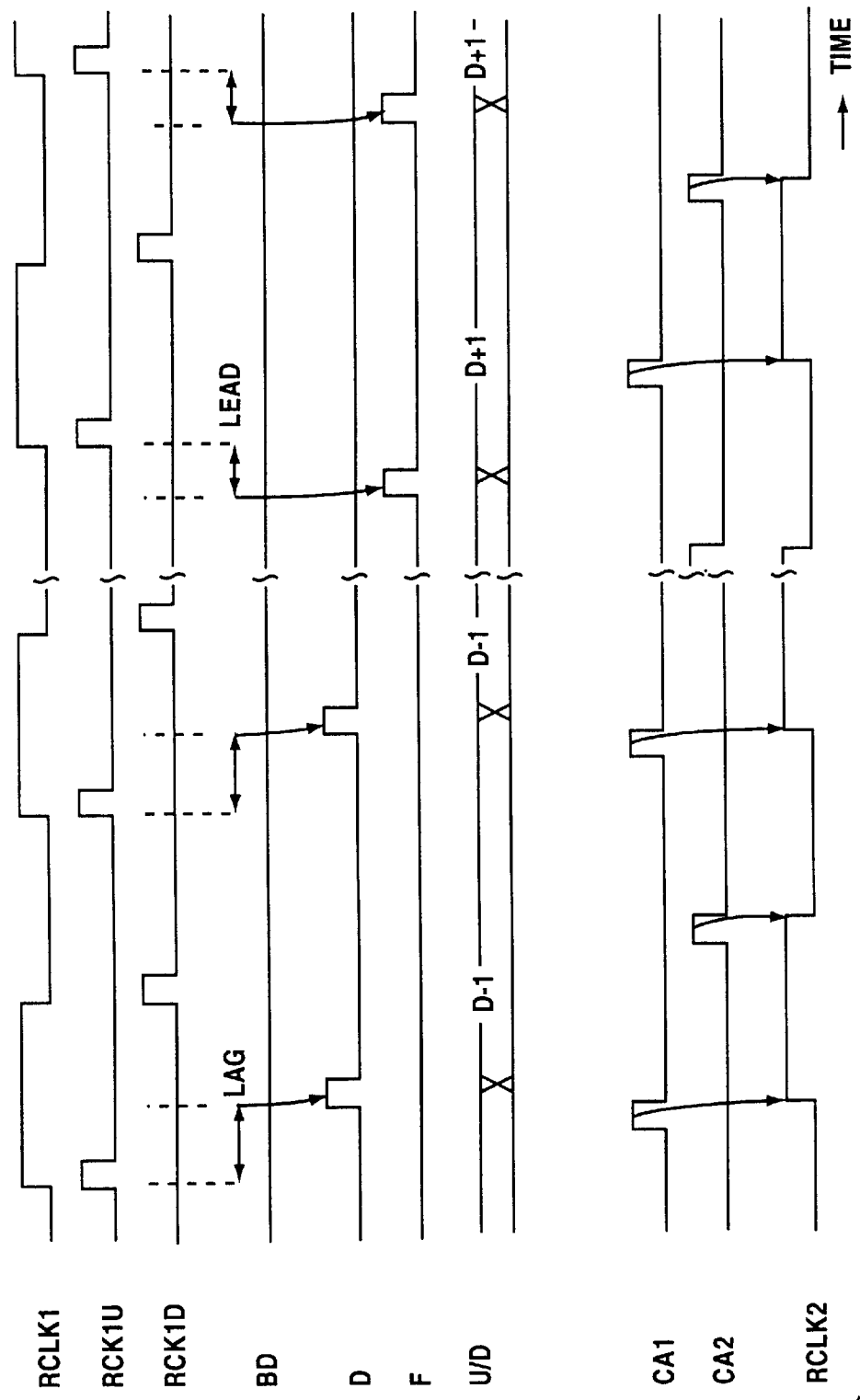
FIG. 16 is a time chart for explaining the operation of the first embodiment of the phase adjusting circuit.

FIG. 16 is a time chart for explaining the operations of the phase comparator circuit 17 and the phase adjusting circuit 18 described above. In FIG. 16, RCLK1 indicates the reference clock signal RCLK1, RCLK1U indicates the output signal of the rising edge extracting circuit 34 which is obtained by extracting the rising edge of the reference clock signal RCLK1, RCLK1D indicates the output signal of the falling edge extracting circuit 35 which is obtained by extracting the falling edge of the reference clock signal RCLK1, and BD indicates the BD signal. In addition, D indicates the output signal D of the rising edge extracting circuit 25, F indicates the output signal F of the rising edge extracting circuit 26, and U/D indicates a count timing of the up-down counter 31. Further, CA1 indicates the signal from the output terminal CA1 of the counter 32, CA2 indicates the signal from the output terminal CA2 of the counter 36, and RCLK2 indicates the clock signal RCLK2 which is output from the phase adjusting circuit 18.

Figure 17:
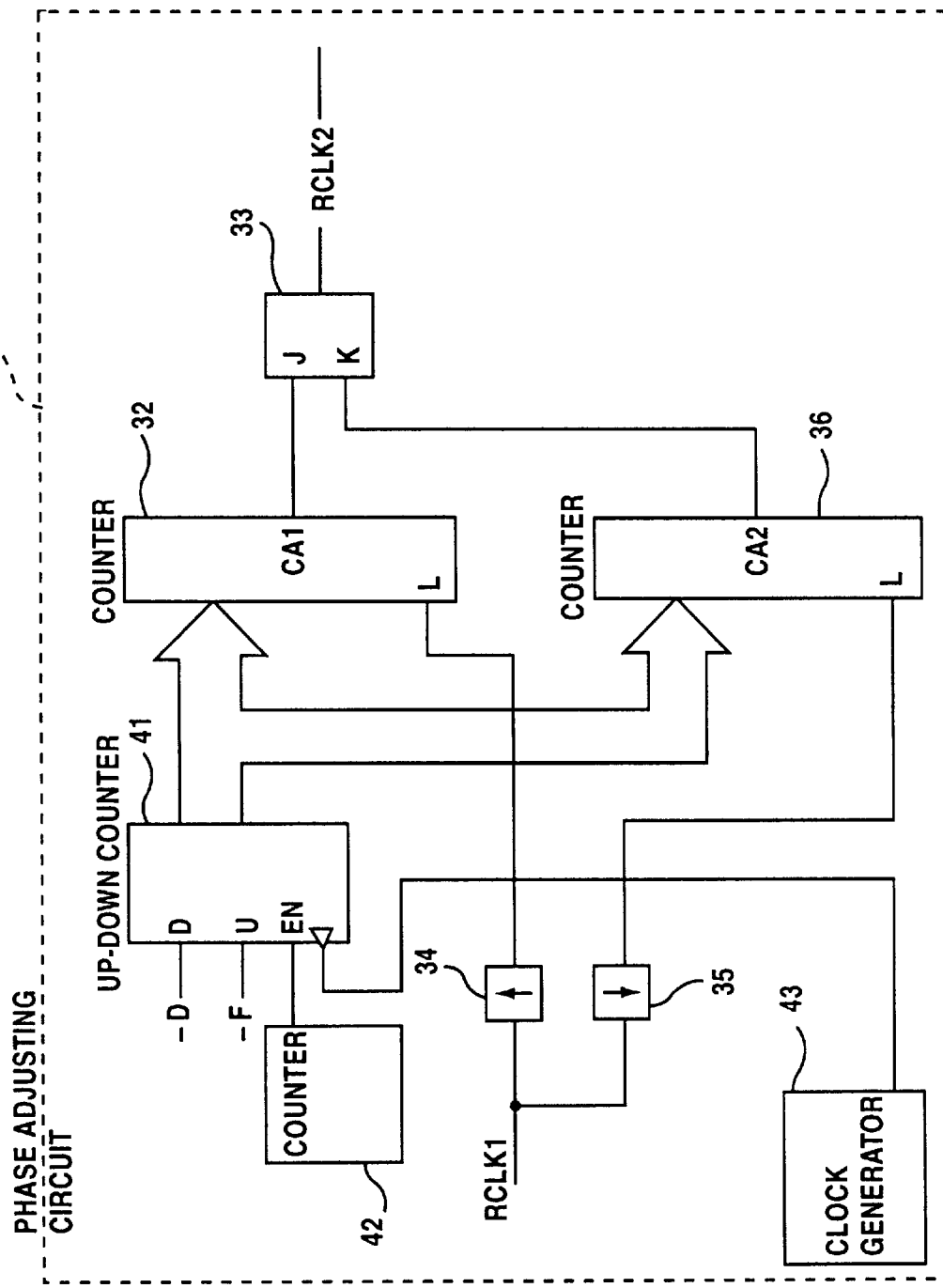
FIG. 17 is a time chart for explaining a second embodiment of the phase adjusting circuit.

FIG. 17 is a system block diagram showing a second embodiment of the phase adjusting circuit 18. In FIG. 17, those parts which are the same as those corresponding parts in FIG. 15 are designated by the same reference numerals, and a description thereof will be omitted.

In FIG. 17, an up-down counter 41 is provide in place of the up-down counter 31 shown in FIG. 15, and a counter 42 and a clock generator 43 are additionally provided. The counter 42 supplies to an enable terminal EN of the up-down counter 41 a signal for every predetermined period, that is for every 4 sec, for example. In addition, the clock generator 43 supplies to a clock terminal of the up-down counter 41 a signal having a period of 1 μsec.

In the phase adjusting circuit 18 shown in FIG. 17, the up-down counter 41 does not operate for every main scan period, but operates for every 4 msec in response to the signal from the counter 42. Hence, it is possible to essentially slow down the operation of the phase adjusting circuit 18. For this reason, it is effective in a case such as when the motor 13, that is, the spindle unit, is stably rotated experimentally. Furthermore, by setting the operation unit of the up-down counter 41 to 1 μsec by the signal from the clock generator 43, it is possible to stably rotate the spindle unit in a similar manner. Of course, the period of the output signal of the counter 42 is not limited to 4 msec, and the period of the signal from the clock generator 43 is also not limited to 1 μsec.

Figure 18:
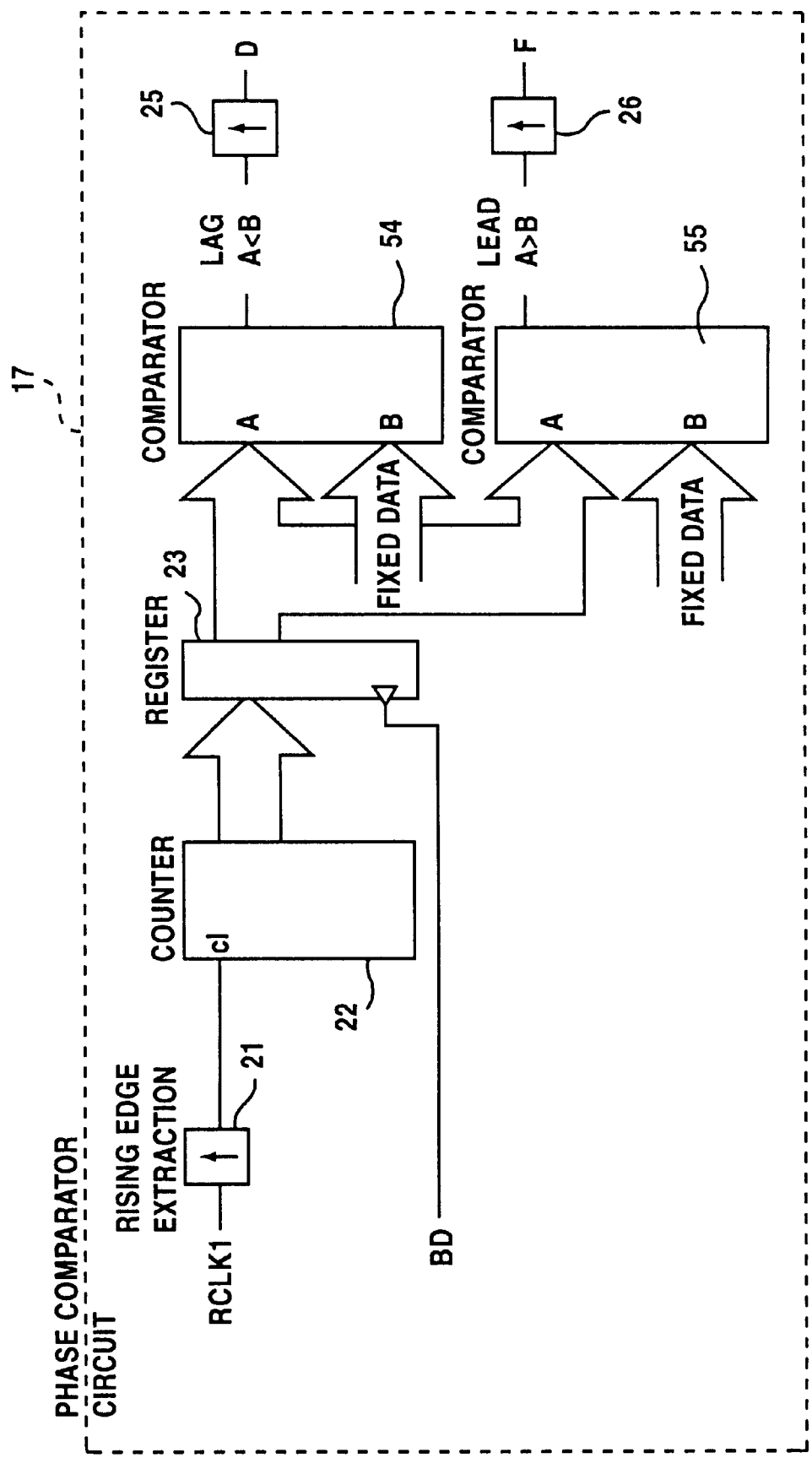
FIG. 18 is a system block diagram showing a second embodiment of the phase comparator circuit.

FIG. 18 is a system block diagram showing a second embodiment of the phase comparator circuit 17. In FIG. 18, those parts which are the same as those corresponding parts in FIG. 14 are designated by the same reference numerals, and a description thereof will be omitted.

In FIG. 18, comparators 54 and 55 are provided in place of the comparator 24. The comparator 54 compares the counted value from the register 23 received by a port A thereof, and a fixed data corresponding to ½·{(main scan period)+β} and received by a port B thereof. When the value received by the port A is smaller than the value received by the port B, that is, when the rising edge of the BD signal lags the rising edge of the reference clock signal RCLK1, the comparator 54 outputs a signal corresponding to this phase lag, and the rising edge of this signal from the comparator 54 is extracted by the rising edge extracting circuit 25 which supplies the signal D to the phase adjusting circuit 18.

On the other hand, the comparator 55 compares the counted value from the register 23 received by a port A thereof, and a fixed data corresponding to ½·{(main scan period)−β} and received by a port B thereof. When the value received by the port A is larger than the value received by the port B, that is, when the rising edge of the BD signal leads the rising edge of the reference clock signal RCLK1, the comparator 55 outputs a signal corresponding to this phase lead, and the rising edge of this signal from the comparator 55 is extracted by the rising edge extracting circuit 26 which supplies the signal F to the phase adjusting circuit 18.

Accordingly, by comparing the counted value of the counter 22 which is obtained via the register 23 with a comparison value which is different depending on whether the rising edge of the BD signal is lagging or leading the rising edge of the reference clock signal RCLK1, it is possible to obtain the phase error between the BD signal and the reference clock signal RCLK1 using a hysteresis characteristic.

Figure 19:
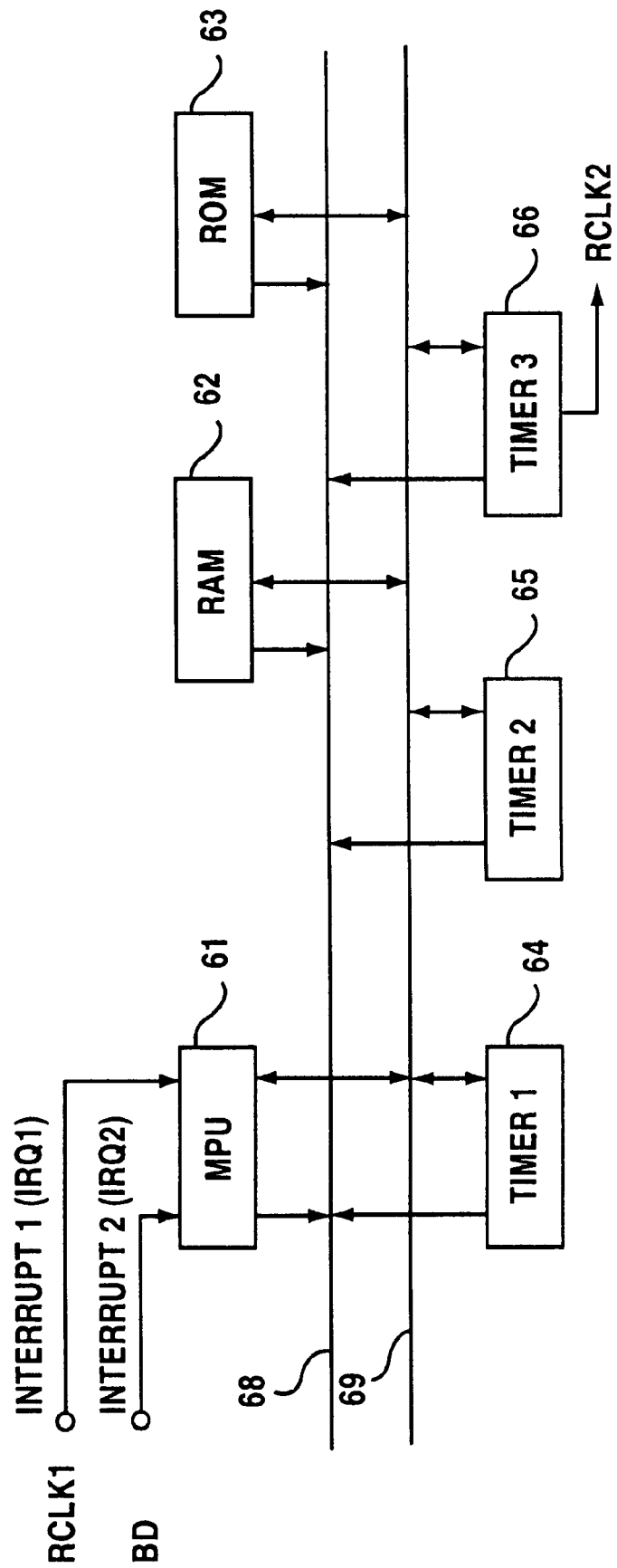
FIG. 19 is a system block diagram showing an embodiment of a construction for a case where the phase comparator circuit and the phase adjusting circuit are realized by software.

In the first embodiment of the image forming apparatus described above, the phase comparator circuit 17 and the phase adjusting circuit 18 shown in FIG. 8 are not limited to being realized by hardware, and may also be realized by software. FIG. 19 is a system block diagram showing an embodiment of a construction corresponding to the phase comparator circuit 17 and the phase adjusting circuit 18 when these circuits are realized by software.

In FIG. 19, a MPU 61, a RAM 62, a ROM 63 and timers 64 through 66 are respectively coupled via an address bus 68 and a data bus 69. The ROM 63 stores programs to be executed by the MPU 61 and data. The RAM 62 stores intermediate data and the like of the programs executed by the MPU 61. The reference clock signal RCLK1 from the reference clock oscillator 19 is input to the MPU 61 as an interrupt IRQ1, and the BD signal from the BD detector 14 is input to the MPU 61 as an interrupt IRQ2. The timer 64 is provided to measure the phase error from the reference clock signal RCLK1 to the BD signal, and the timer 65 is provided to measure the phase error from the BD signal to the reference clock signal RCLK1. In addition, the timer 66 is provided to output the clock signal RCLK2 which has the same period as the reference clock signal RCLK1.

Figure 20:
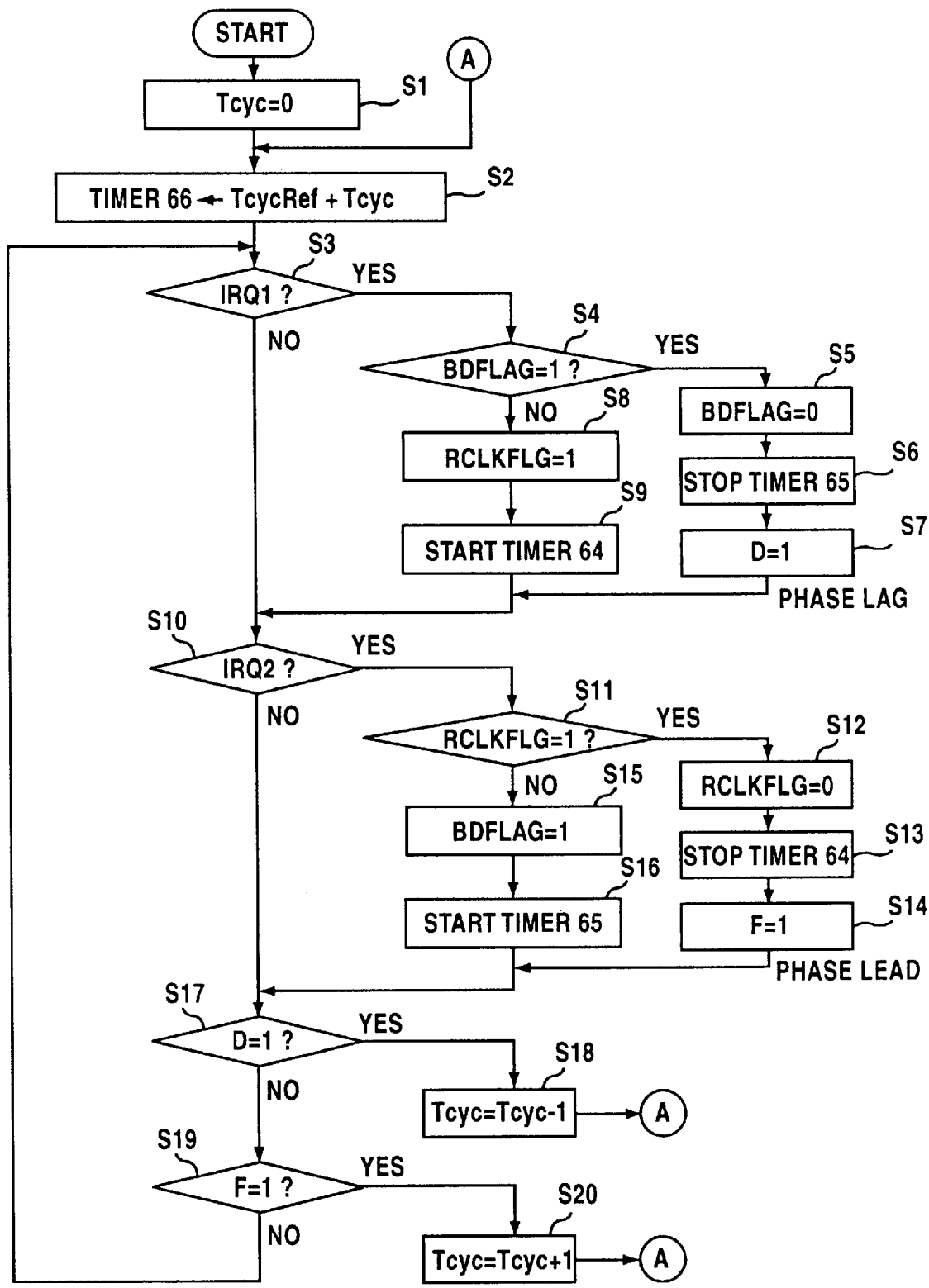
FIG. 20 is a flow chart for explaining the operation of a MPU shown in FIG. 19.

FIG. 20 is a flow chart for explaining the operation of the MPU 61. In FIG. 20, a step S1 initializes a value Tcyc to 0, where this value Tcyc is counted up or down depending on the phase error between the reference clock signal RCLK1 and the BD signal. A step S2 sets TcycRef+Tcyc to the timer 66, where TcycRef indicates the period of the reference clock signal RCLK1. A step S3 decides whether or not the interrupt IRQ1 is input, and if the decision result is YES, a step S4 decides whether or not a flag BDFlag is 1. If the decision result in the step S4 is YES, a step S5 sets the flag BDFlag to 0, a step S6 stops the timer 65, and a step S7 sets D to D=1. On the other hand, if the decision result in the step S4 is NO, a step S8 sets a flag RCLKFlag to 1, and a step S9 starts the timer 64.

If the decision result in the step S3 is NO or, after the step S7 or S9, a step S10 decides whether or not the interrupt IRQ2 is input. If the decision result in the step S10 is YES, a step S11 decides whether or not the flag RCLKFlag is 1. If the decision result in the step S11 is YES, a step S12 sets the flag RCLKFlag to 0, a step S13 stops the timer 64, and a step S14 sets F to F=1. On the other hand, if the decision result in the step S11 is NO, a step S15 sets the flag BDFlag to 1, and a step S16 starts the timer 65.

If the decision result in the step S10 is NO or, after the step S14 or S16, a step S17 decides whether or not D=1. If the decision result in the step S17 is YES, a step S18 decrements the value Tcyc by 1, and the process returns to the step S2. On the other hand, if the decision result in the step S17 is NO, a step S19 decides whether or not F=1. If the decision result in the step S19 is YES, a step S20 increments the value Tcyc by 1, and the process returns to the step S2. The process returns to the step S3 if the decision result in the step S19 is NO.

During the above described operation, the MPU 61 can notify a user or a host unit that an abnormality is generated in the control of the spindle unit, by generating an alarm when a number of times the rotation of the spindle unit is corrected per unit time reaches a predetermined value.

The operation shown in FIG. 20 is carried out with respect to each of the spindle units in parallel. In this case, the system may be designed so that the MPU 61 simultaneously controls all of the spindle units. Alternatively, a plurality of MPUs 61 may be provided, so that each spindle unit is controlled by a corresponding MPU 61 and the control operations of the MPUs 61 are carried out in parallel.

Figure 21:
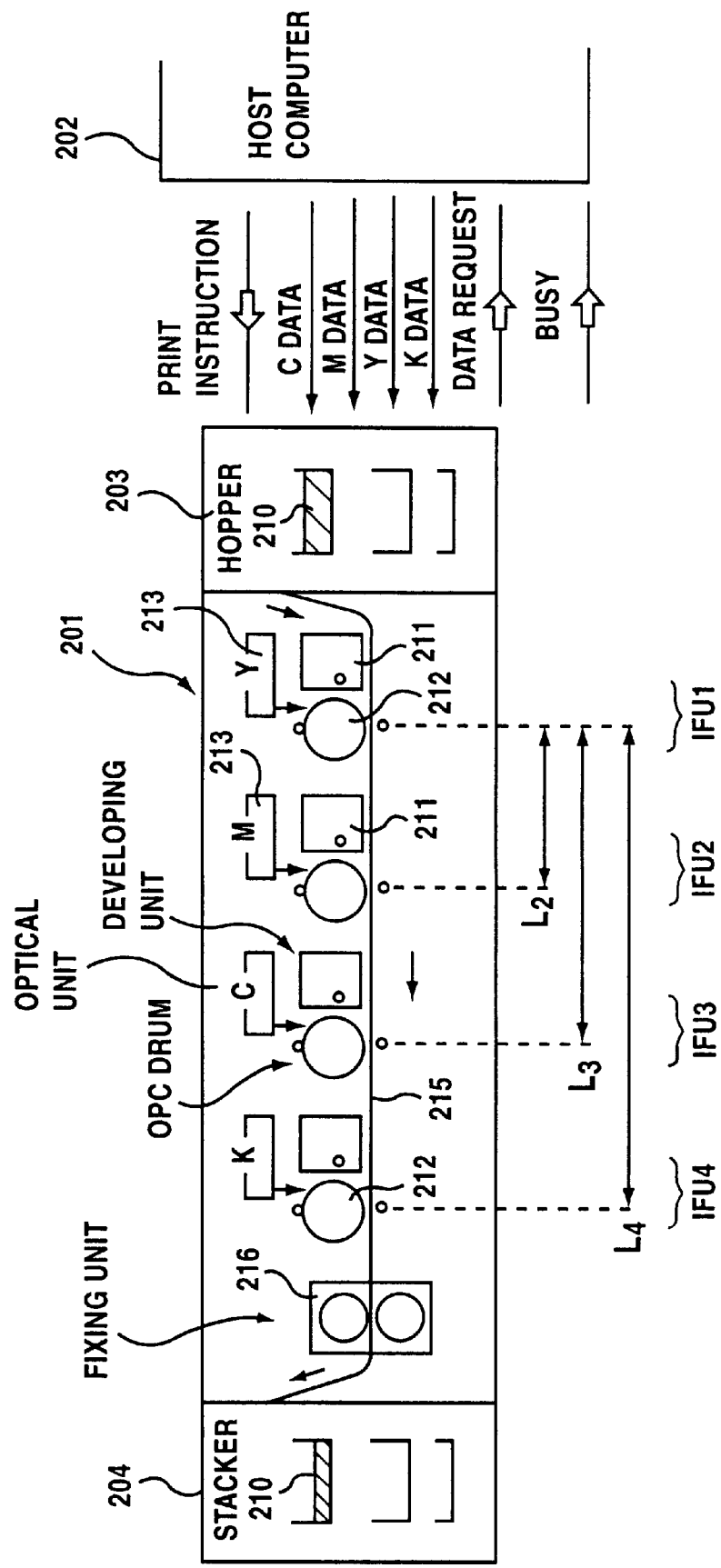
FIG. 21 is a diagram generally showing the image forming apparatus.

FIG. 21 is a diagram showing the general construction of a second embodiment of the image forming apparatus according to the present invention. This second embodiment of the image forming apparatus employs a second embodiment of the spindle unit control method according to the present invention. In this second embodiment of the image forming apparatus, the present invention is applied to a multi-color printer.

In FIG. 21, an image forming apparatus 201 is provided with image forming units IFU1 through IFU4, a hopper 203, a stacker 204, a transport path 215 which transports paper 210, and a fixing unit 216. Each of the image forming units IFU1 through IFU4 is provided with a developing unit 211, a photoconductive (OPC: Organic Photoconductive) drum 212, and an optical unit 213.

The image forming unit IFU1 includes a Y developing unit 211, the photoconductive drum 212 and the optical unit 213. The image forming unit IFU2 includes a M developing unit 211, the photoconductive drum 212 and the optical unit 213. The image forming unit IFU3 includes a C developing unit 211, the photoconductive drum 212 and the optical unit 213. The image forming unit IFU4 includes a K developing unit 211, the photoconductive drum 212 and the optical unit 213.

The hopper 203 supplies the paper 210 to the transport path 215. The stacker 204 holds recorded (printed) paper 210 in a stacked manner. The transport path 215 transports the paper 210 so as to print the image on the paper 210. The fixing unit 216 fixes the images which are transferred onto the paper 210 by each of the photoconductive drums 212.

The developing unit 211 develops the latent image formed on the photoconductive drum 212 using a developing agent, that is, toner corresponding to each of the Y, M, C and K image forming units. The photoconductive drum 212 transfers the image which is developed by the developing unit 211 onto the paper 210. The optical unit 213 forms the latent image on the photoconductive drum 212 by scanning the photoconductive drum 212 by laser light that is modulated by each image data (information).

When printing preparations are not completed, the image forming apparatus 201 makes a busy response with respect to a print instruction from a host computer 202. On the other hand, the image forming apparatus 201 makes a data request in response to the print instruction when the printing preparations are completed. When Y-data, M-data, C-data and K-data are received from the host computer 202, the photoconductive drums 212 of the image forming units IFU1 through IFU4 of the image forming apparatus 201 are scanned by laser lights which are modulated by the corresponding color data in the optical units 213, so as to form latent images on the photoconductive drums 212. The latent images on the photoconductive drums 212 are developed by the developing units 211 using the developing agents.

The paper 210 is supplied to the transport path 215 from the hopper 203, one by one, and the developed images of each of the colors on the photoconductive drums 212 are successively transferred onto the paper 210 as the paper 210 is transported by a belt-shaped transport means. The successively transferred images on the paper 210 are fixed by the fixing unit 216, and the printed paper 210 is finally stored on the stacker 204 in the stacked manner. In FIG. 21, $L_2$, $L_3$ and $P_4$ respectively indicate the distances from the image forming unit IFU1 to the subsequent image forming units IFU2, IFU3 and IFU4.

Figure 22:
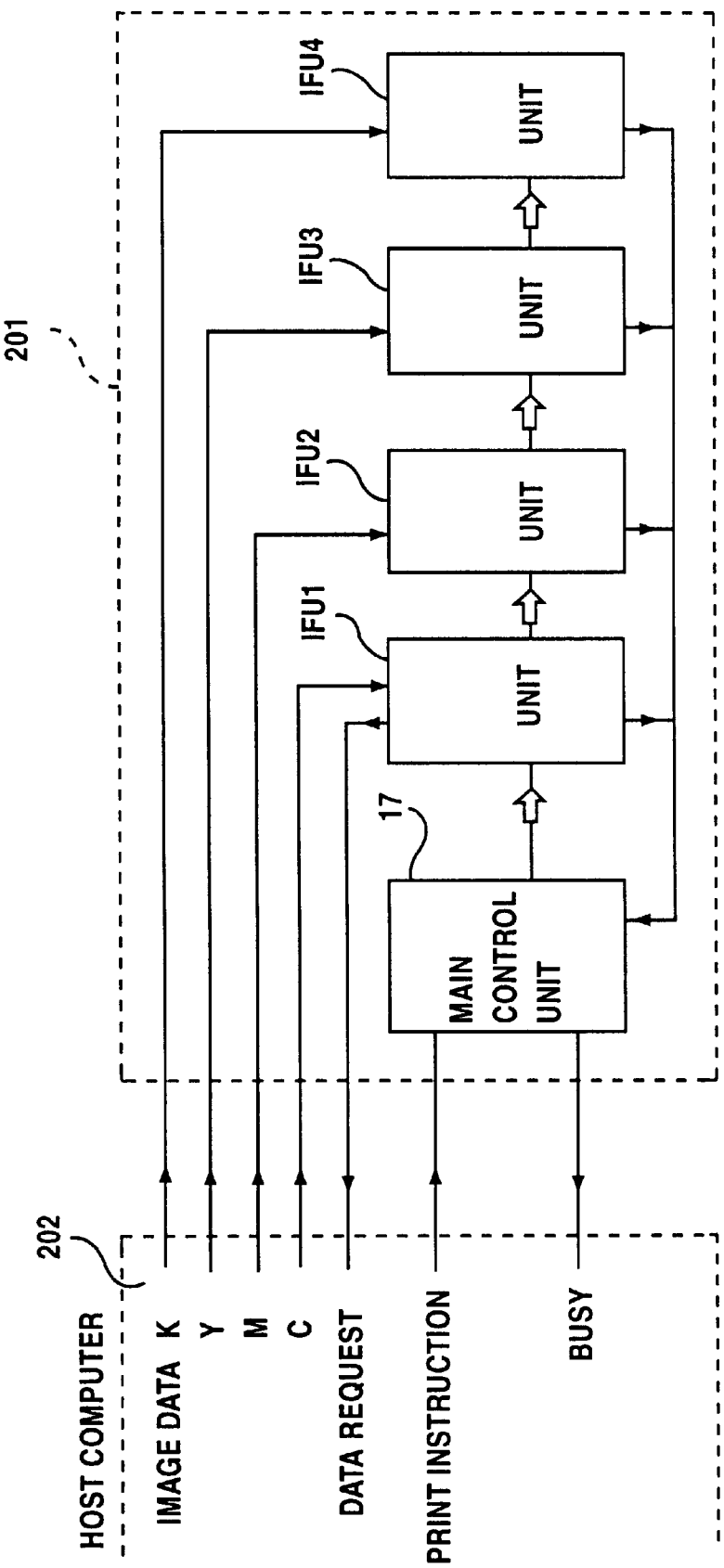
FIG. 22 is a diagram for explaining a control part of the image forming apparatus.

FIG. 22 is a diagram for explaining a control part of the image forming apparatus. In FIG. 22, the control part of the image forming apparatus 201 includes a main control unit 217 and the image forming units IFU1 through IFU4. The main control unit 217 receives the print instruction from the host computer 202, and carries out operations such as notifying the state of the image forming apparatus 201, and controlling the transport timing of the paper 210 among the image forming units IFU1 through IFU4. The image forming units IFU1 through IFU4 receive the instruction from the main control unit 217, make responses to the received instruction from the main control unit 217, make a data request to the host computer 202, and receive the Y, M, C and K image data from the host computer 202.

Figure 23:
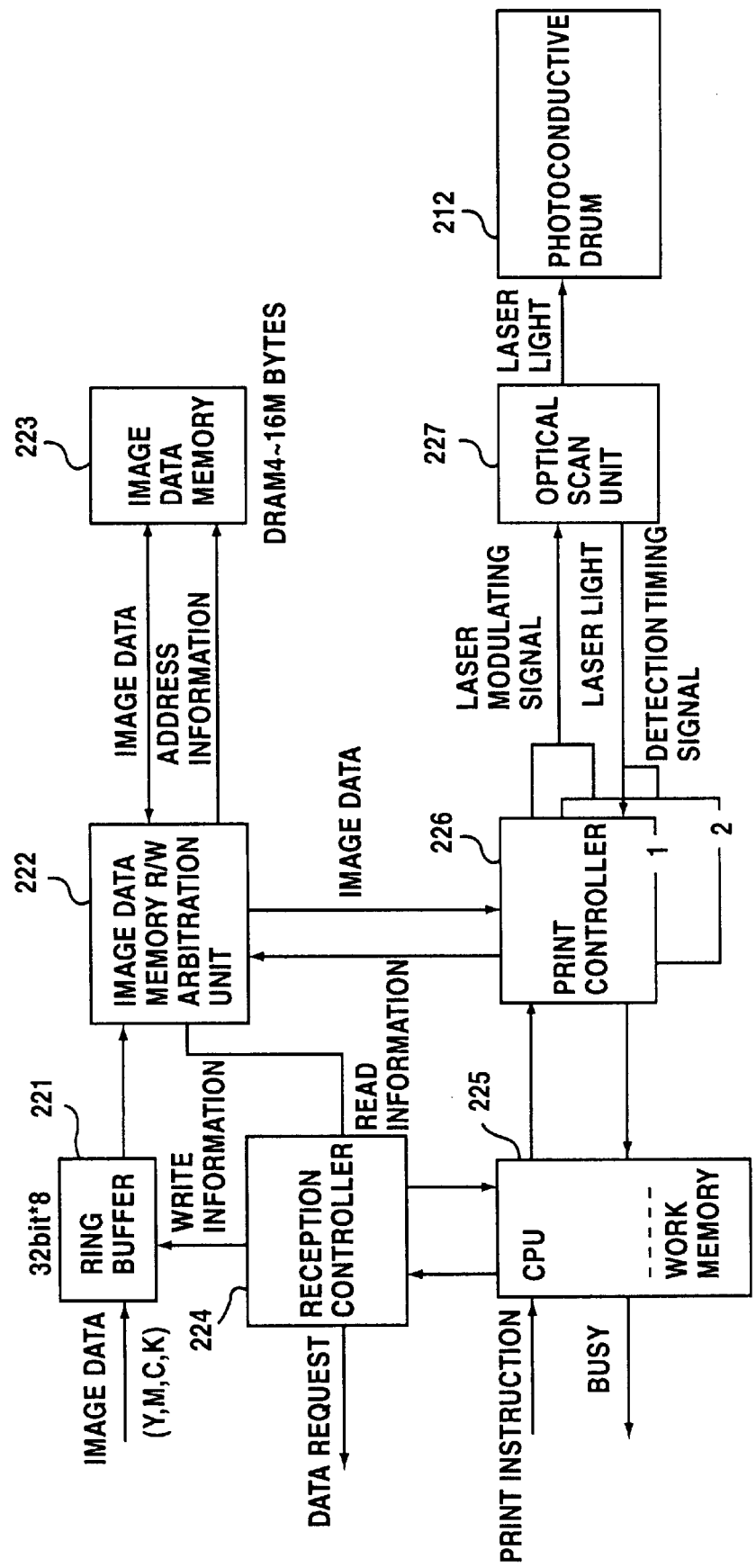
FIG. 23 is a diagram for explaining image forming units IFU1 through IFU4.

FIG. 23 is a diagram for explaining the image forming units IFU1 through IFU4. In FIG. 23, each of the image forming units IFU1 through IFU4 is provided with the photoconductive drum 212, a 32-bit×8 ring buffer 221, an image data memory read/write (R/W) arbitration unit 222, an image data memory 223 made of a 4 to 16 Mbyte dynamic random access memory (DRAM), a reception controller 224, a central processing unit (CPU) 225, two print controllers 226, and an optical scan unit 227.

Each of the image forming units IFU1 through IFU4 operate as follows. When the CPU 225 receives a print instruction from the main control unit 217, the CPU 225 makes a busy response if the preparations for the printing is not completed, and makes a data request corresponding to each image forming units IFU1 through IFU4 with respect to the host computer 202 via the reception controller 224 if the preparations for the printing is completed. Image data amounting to one page from the host computer 202 are temporarily stored in the image data memory 223 via the ring buffer 221 and the image data memory R/W arbitration unit 222.

The print controllers 226 supply read information such as a read timing to the image data memory R/W arbitration unit 222, so as to read the image data from the image data memory 223 via the image data memory R/W arbitration unit 222, and a laser modulating signal which is modulated by the image data is supplied to the optical scan unit 227. The optical scan unit 227 scans the photoconductive drum 212 by the laser light which is modulated by the image data, and forms a latent image on the photoconductive drum 212. The two print controllers 226 are provided in order to increase the printing speed by using two laser beams to scan the photoconductive drum 212.

The print controllers 226 read a detected timing signal from the optical scan unit 227, and supply the laser modulating signal to the optical scan unit 227 based on the read detected timing signal.

Figure 24:
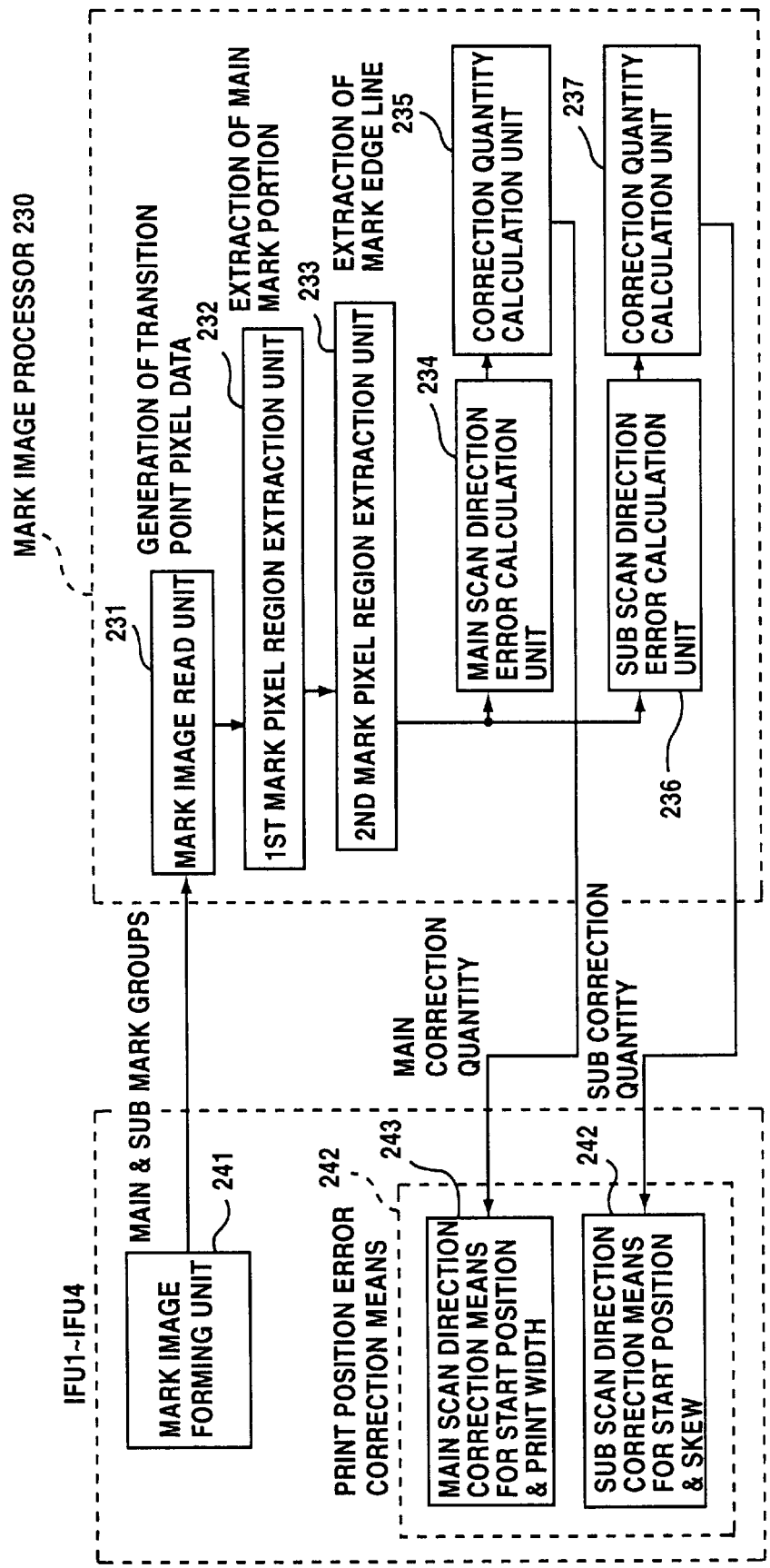
FIG. 24 is a diagram for explaining a print position error correction system as a whole.

FIG. 24 is a diagram for explaining a print position error correction system as a whole. In FIG. 24, a mark image processor 230 and the image forming units IFU1 through IFU4 are provided to correct the print position error. The mark image processor 230 includes a mark image read unit 231, a first mark pixel region extraction unit 232, a second mark pixel region extraction unit 233, a main scan direction error quantity calculation unit 234, a correction quantity calculation unit 235, a sub scan direction error quantity calculation unit 236, and a correction quantity calculation unit 23. A mark image (CCD mark) forming unit 241 and a print position error correction means 242 are provided in the image forming units IFU1 through IFU4. The print position error correction means 242 includes correction means 243 for correcting a main scan direction start position and a print width, and a correction means 244 for correcting a sub scan direction start position and a skew.

The operation of correcting the print position error is carried out as follows. That is, a main pitch mark group 75M and a sub pitch mark group 75S shown in FIG. 26 which will be described later are formed by the mark image forming unit 241 are read by the mark image read unit 231, and transition point pixel data are generated. Then, the first mark pixel region extraction unit 232 extracts a main mark portion, and the second mark pixel region extraction unit 233 extracts a mark edge line portion.

Thereafter, the main scan direction error quantity calculation unit 234 calculates a main scan direction error quantity from the extracted mark described above, and the correction quantity calculation unit 235 calculates main correction quantities for a main scan direction start position and a print width, based on the main scan direction error quantity calculated by the main scan direction error quantity calculation unit 234. The correction with respect to the main scan direction is carried out by the correction means 243 for correcting the main scan direction start position and the print width.

In addition, the sub scan direction error quantity calculation unit 236 calculates a sub scan direction error quantity from the extracted mark described above, and the correction quantity calculation unit 237 calculates sub correction quantities for a sub scan direction start position and a skew, based on the sub scan direction error quantity calculated by the sub scan direction error quantity calculation unit 236. The correction with respect to the sub scan direction is carried out by the correction means 244 for correcting the sub scan direction start position and the skew.

When the number of marks which are printed based on the print information and the number of mark pixel regions extracted by the first and second mark pixel region extraction units 232 and 233 do not match, the mark image processor 230 invalidates the image information of the extracted mark group and returns to the processing of a new mark group. As a result, there is a possibility of dust which has a size corresponding to the pixel width of the main mark portion and is adhered on the paper 210 from being erroneously recognized as a mark, but such an erroneously recognized mark can be discarded based on the print information.

Figure 25:
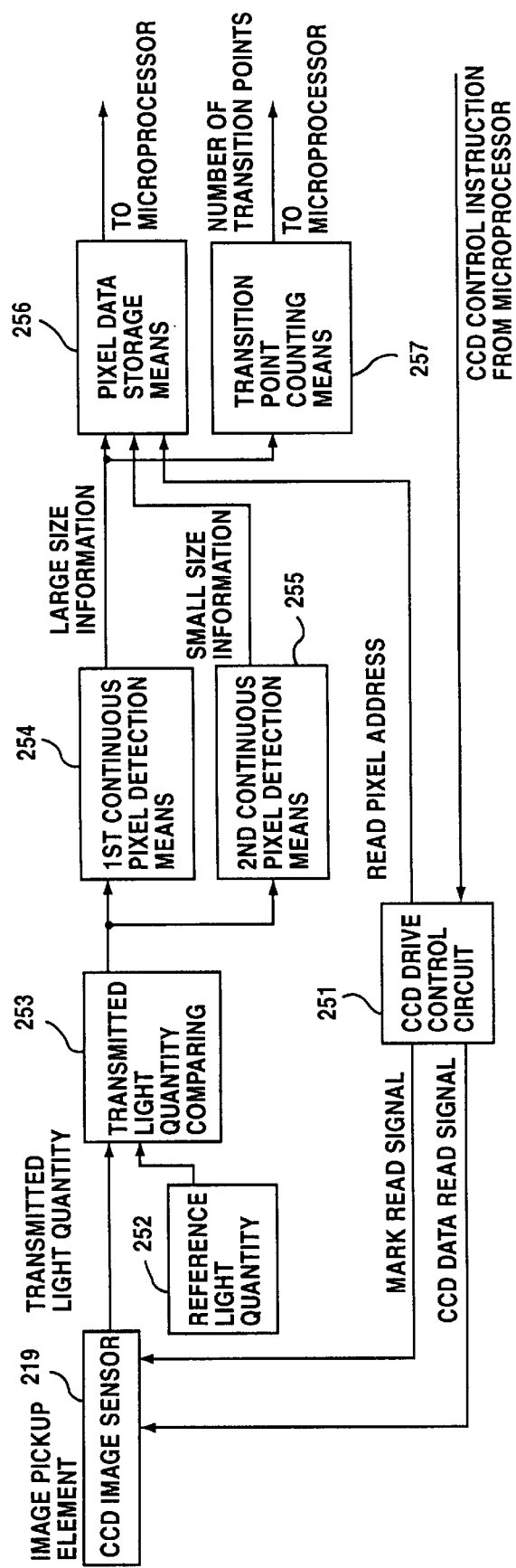
FIG. 25 is a diagram for explaining a mark image read unit.

FIG. 25 is a diagram for explaining a mark image read unit. In FIG. 25, the mark image read unit 231 includes CCD image sensors 219 which are provided as image pickup elements, a CCD drive control circuit 251, a transmitted light quantity comparing means 253 supplied with a reference light quantity 252, a first continuous pixel detection means 254, a second continuous pixel detection means 255, a pixel data storage means 256, and a transition point counting means 257. A microprocessor (not shown) is provided in the mark image processor 230 shown in FIG. 24 described above, and this microprocessor successively reads the pixel data from the pixel data storage means 256 of the mark image processor 230 and carries out a process of a half-tone screen portion of the mark image processor 230.

The mark image read unit 231 operates as follows. First, the CCD drive control circuit 251 supplies a mark read signal and a CCD data read signal to the CCD image sensors 219 in response to a CCD control instruction from the microprocessor. The CCD image sensors 219 output to the transmitted light quantity comparing means 253 a transmitted light quantity which is the CCD data. The transmitted light quantity comparing means 253 compares the transmitted light quantity and the reference light quantity 252, and supplies a comparison result to the first and second continuous pixel detection means 254 and 255.

The first continuous pixel detection means 254 detects continuous pixels of a large size, and supplies large size information to the pixel data storage means 256 and the transition point counting means 257. The second continuous pixel detection means 255 detects continuous pixels of a small size, and supplies small size information to the pixel data storage means 256.

The pixel data storage means 256 forms a pixel data memory (storage means) for storing the large size information, the small size information, the read image address from the CCD drive control circuit 251 and the like, that is, (i) a transition point address or, the pixel address of each of a leading edge transition point and a trailing edge transition point, (ii) a transition point type such as the leading edge and the trailing edge, and (iii) continuous pixel size type.

The transition point counting means 257 counts the transition points of the large size information, and notifies the counted number of transition points to the microprocessor. If the counted value of this transition point counting means 257 falls outside a predetermined range, the microprocessor invalidates the image information of the mark group and returns to the processing of a new mark group. For this reason, when the counted number of transition points falls outside predetermined range, the mark is eliminated as a defective mark, such as blot of the mark or dust, which is generated in a burst, so that it is possible to increase the accuracy of extracting the mark pixel region.

In addition, In addition, it is possible to provide in the mark image read unit 231 a means for automatically adjusting the set value of the reference light quantity 252, so that the counted value obtained in the transition point counting means 257 falls within the predetermined range. For example, it is possible to cope with the changes in the mark density and the transmittance caused by belt stain on the belt-shaped transport means by switching the set value of a slice level which will be described later so that the set value is decreased when the counted value exceeds a prescribed value and is increased when the counted value is smaller than the prescribed value.

Figure 26:
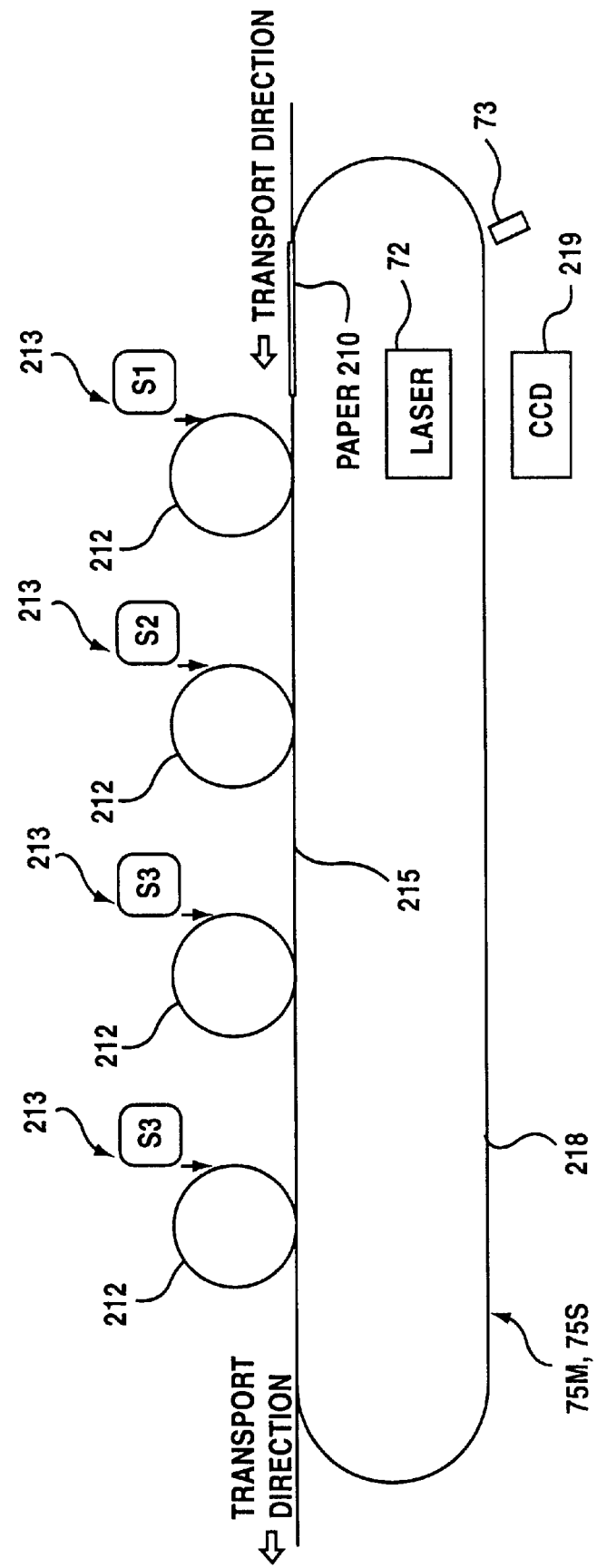
FIG. 26 is a diagram showing a part of the image forming apparatus including the image forming units IFU1 through IFU4 and the CCD image sensors.

FIG. 26 is a diagram showing a part of the image forming apparatus 201 including the image forming units IFU1 through IFU4 and the CCD image sensors 219. The part of the image forming apparatus 201 shown in FIG. 26 generally includes photoconductive drums 212 (hereinafter referred to as DR1 through DR4) and spindle units A1 through S4 of the optical units 213 which are respectively provided with respect to yellow (Y), magenta (M), cyan (C) and black (K), a transport belt 218 which transports the paper 210 on the paper transport path 215, the CCD image sensors 219, a laser light source 72 which irradiates a laser light on the CCD image sensors 219 via the transport belt 218 and a blade 73 which removes the read CCD mark. A driving mechanism for driving the transport belt 218, the spindle units S1 through S4 and the like may be realized by a driving mechanism, spindle units and the like which have known structures, and a description and illustration thereof will be omitted.

The transport belt 218 is made of a transparent material, and the main pitch mark group 75M and a sub pitch mark group 75S are formed at predetermined positions on the transport belt 218. The main pitch mark group 75M includes CCD marks having a predetermined pattern for detecting a color printing error in the main scan direction. On the other hand, the sub pitch mark group 75S includes CCD marks having a predetermined pattern for detecting a color printing error in the sub scan direction. The CCD image sensors 219 include CCDs for reading the main pitch mark group 75M and the sub pitch mark group 75S, and it is possible to detect and correct the color printing errors in the main scan direction and the sub scan direction based on the detection outputs of the CCD image sensors 219.

Description of the Color Printing Error

Figure 27A:
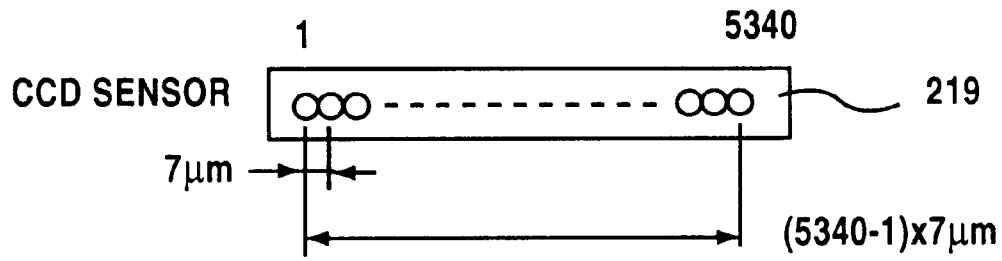
FIGS. 27A and 27B respectively are diagrams for explaining detection of a color printing error.
Figure 27B:
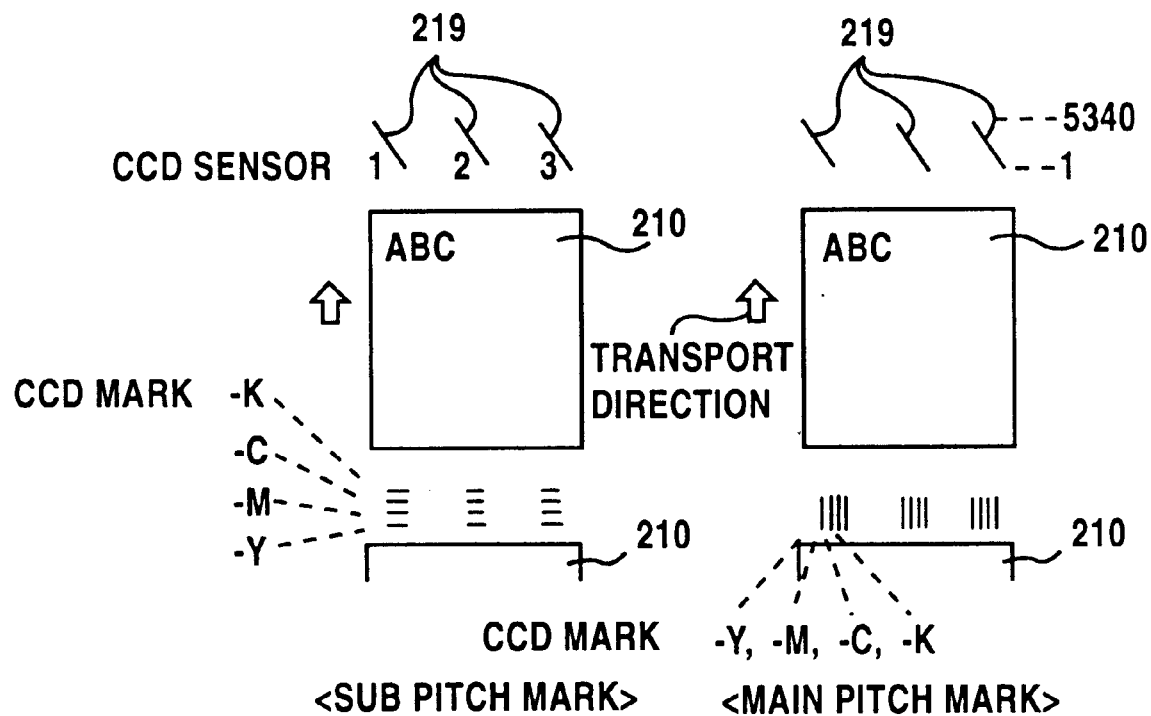

FIGS. 27A and 27B are diagrams for explaining the color printing error. FIG. 27A is a diagram for explaining the CCD image sensor 219, and FIG. 27B is a diagram for explaining an arrangement of the CCD image sensors 219.

As shown on an enlarged scale in FIG. 27A, the CCD image sensor 219 has 5340 linearly arranged CCD cells, each amounting to one pixel, and each having the size of 7×7 $\mu$m. A total length of the linearly arranged CCD cells is (5340–1)×7 $\mu$m.

Figure 3:
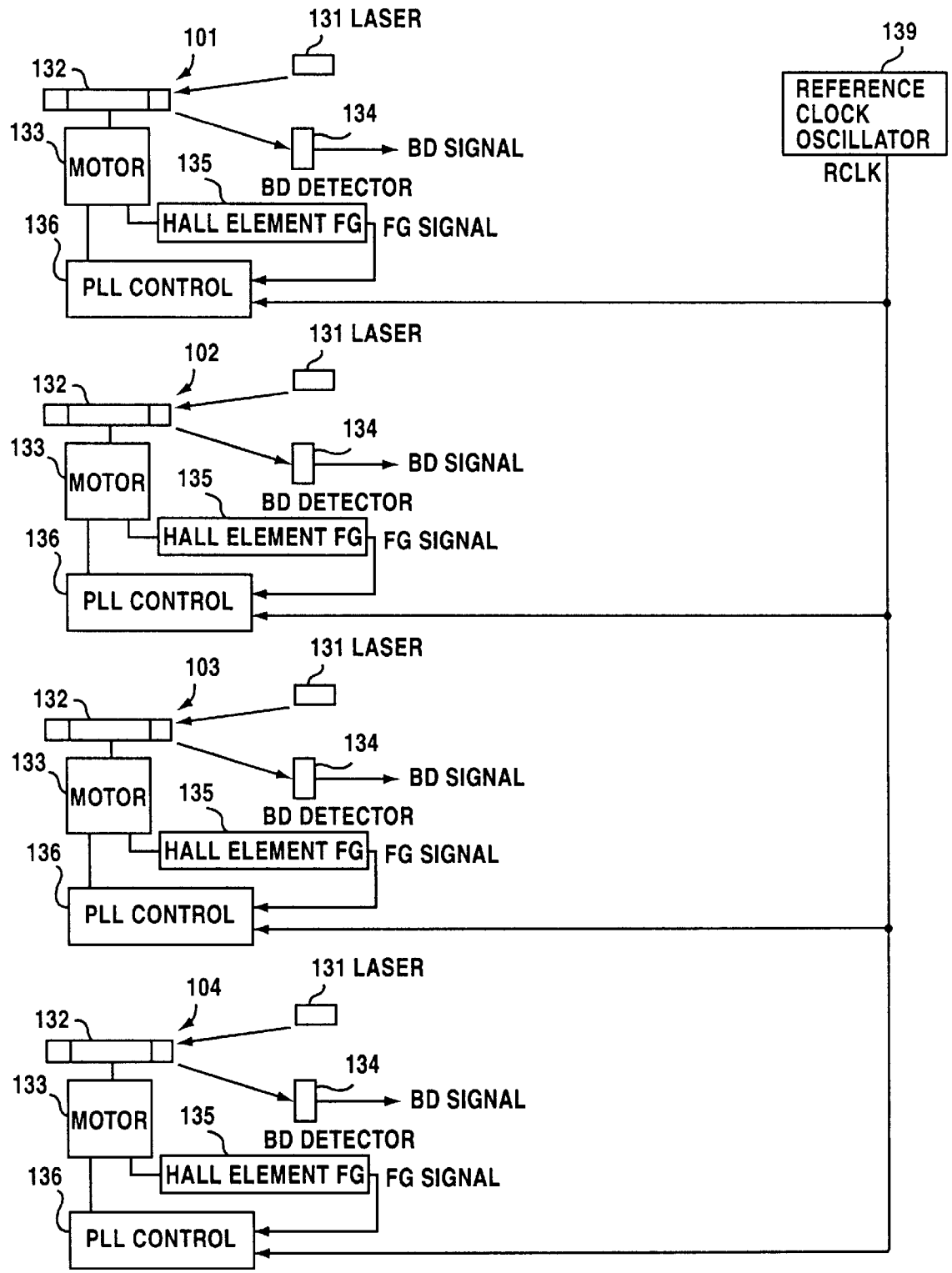
FIG. 3 is a diagram for explaining an example of a conventional spindle unit control method.
Figure 4:
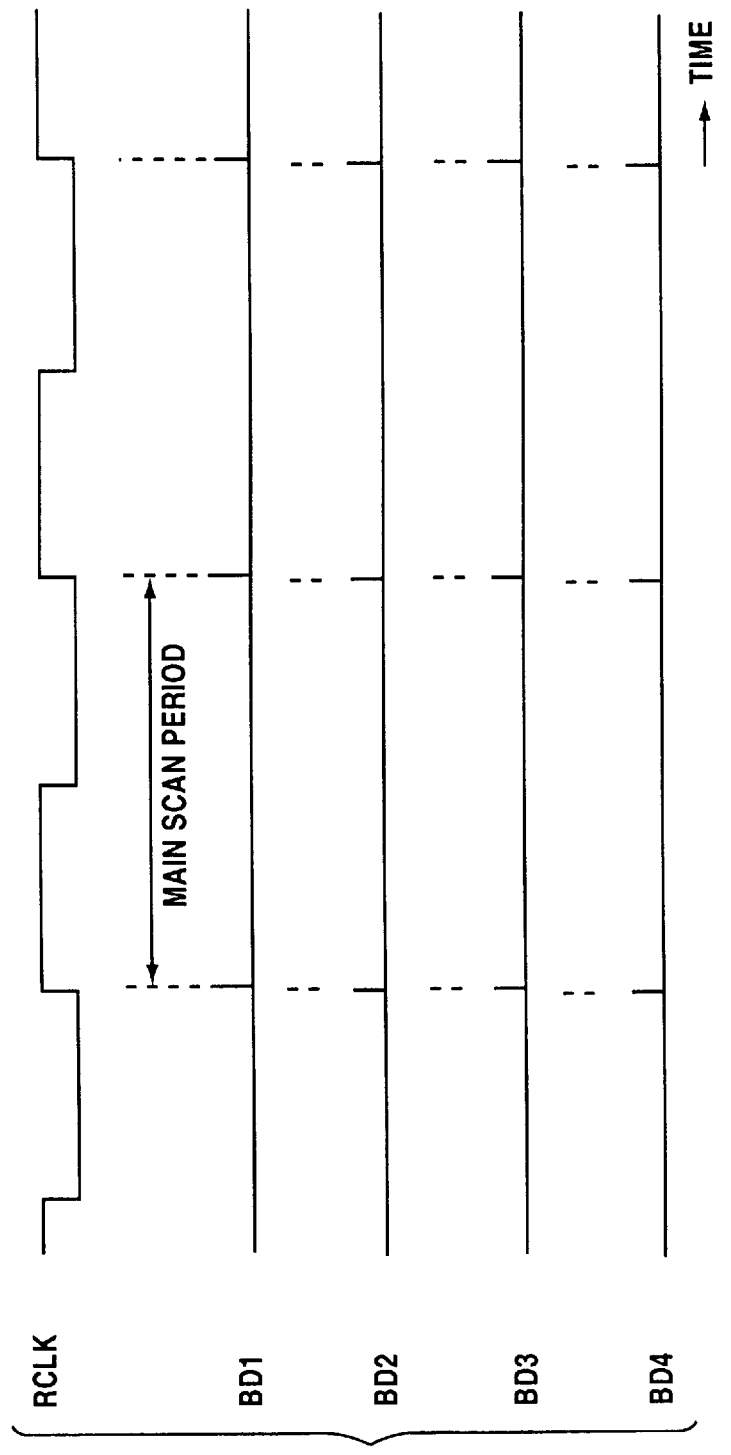
FIG. 4 is a time chart for explaining the conventional spindle unit control method.
Figure 5:
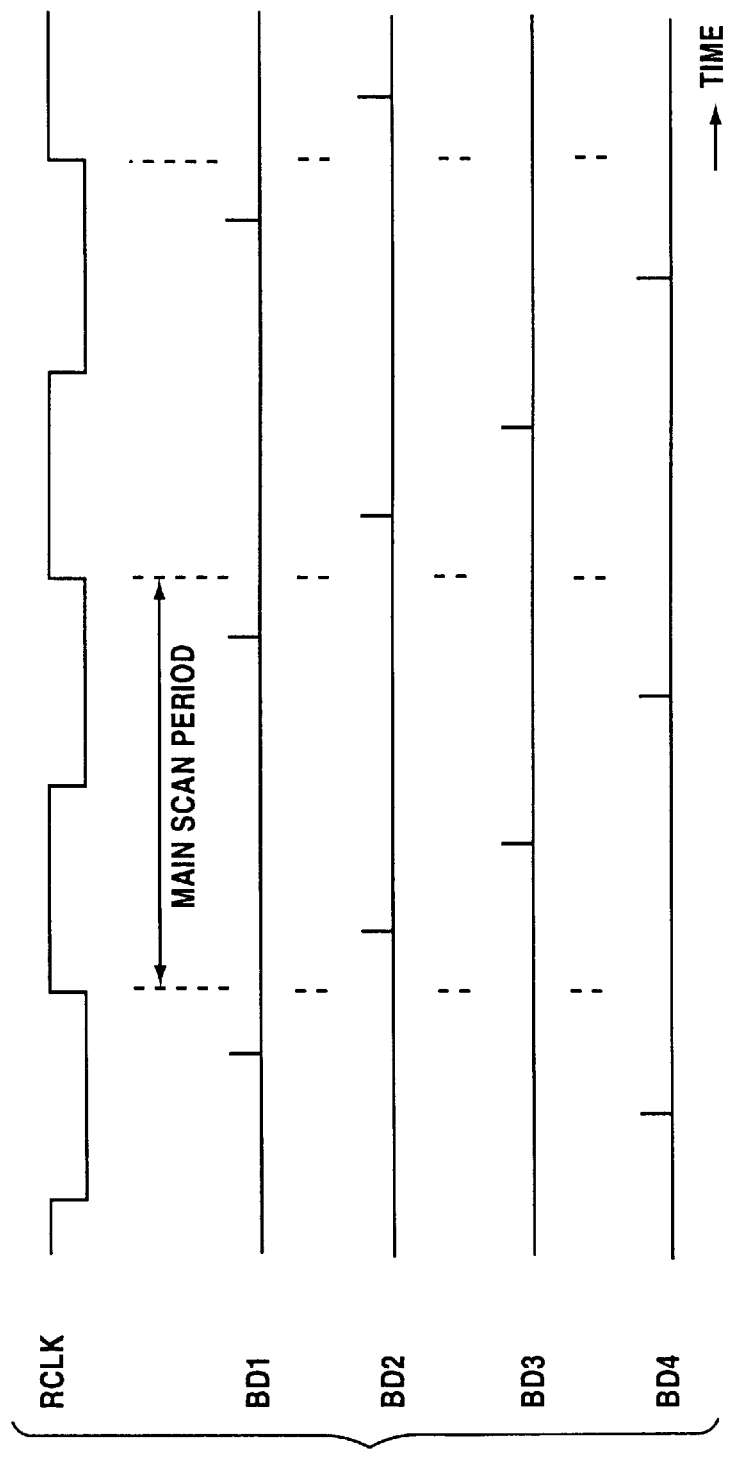
FIG. 5 is a time chart for explaining the conventional spindle unit control method.
Figure 6:
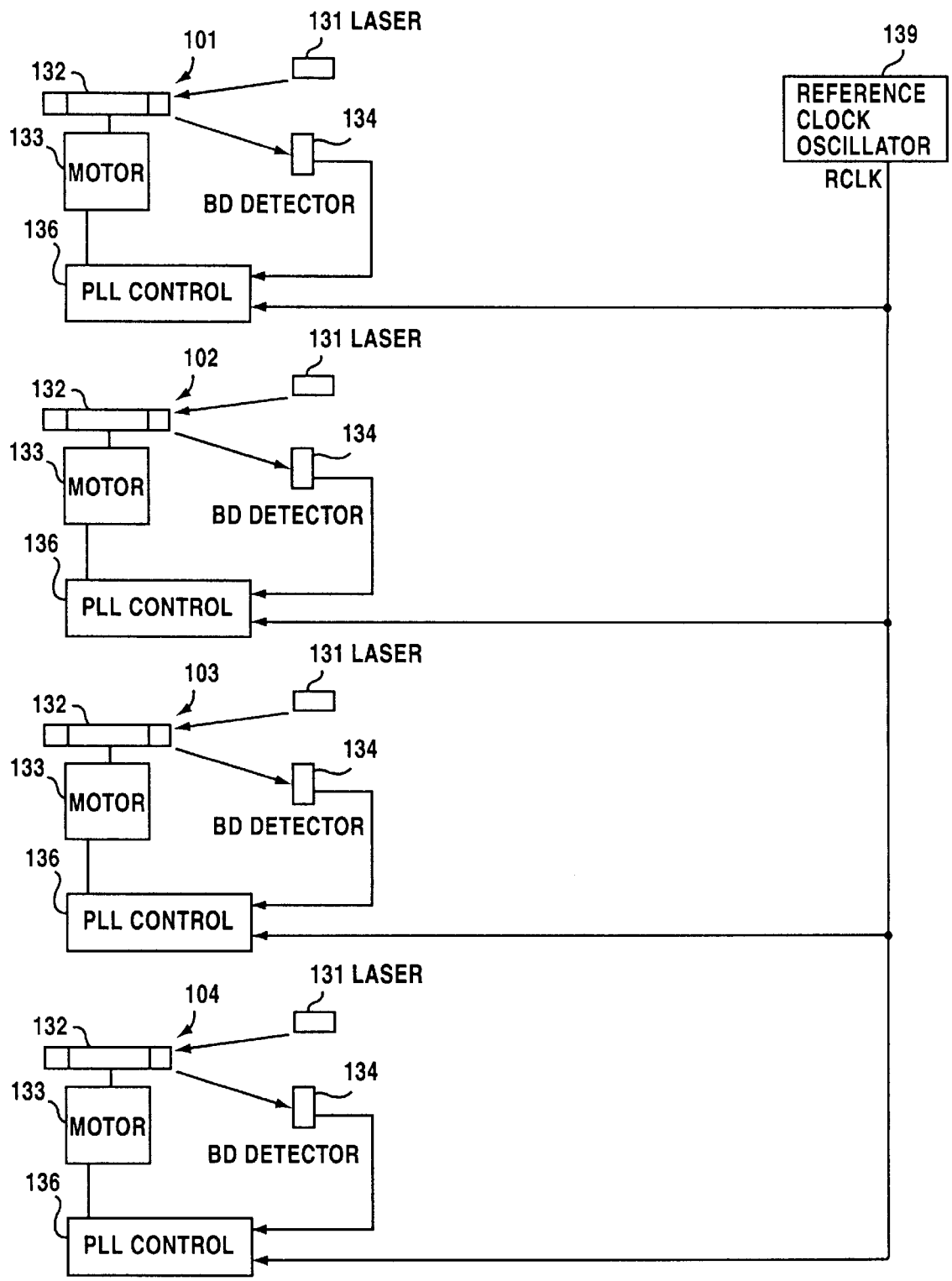
FIG. 6 is a diagram for explaining a proposed spindle unit control method.
Figure 7:
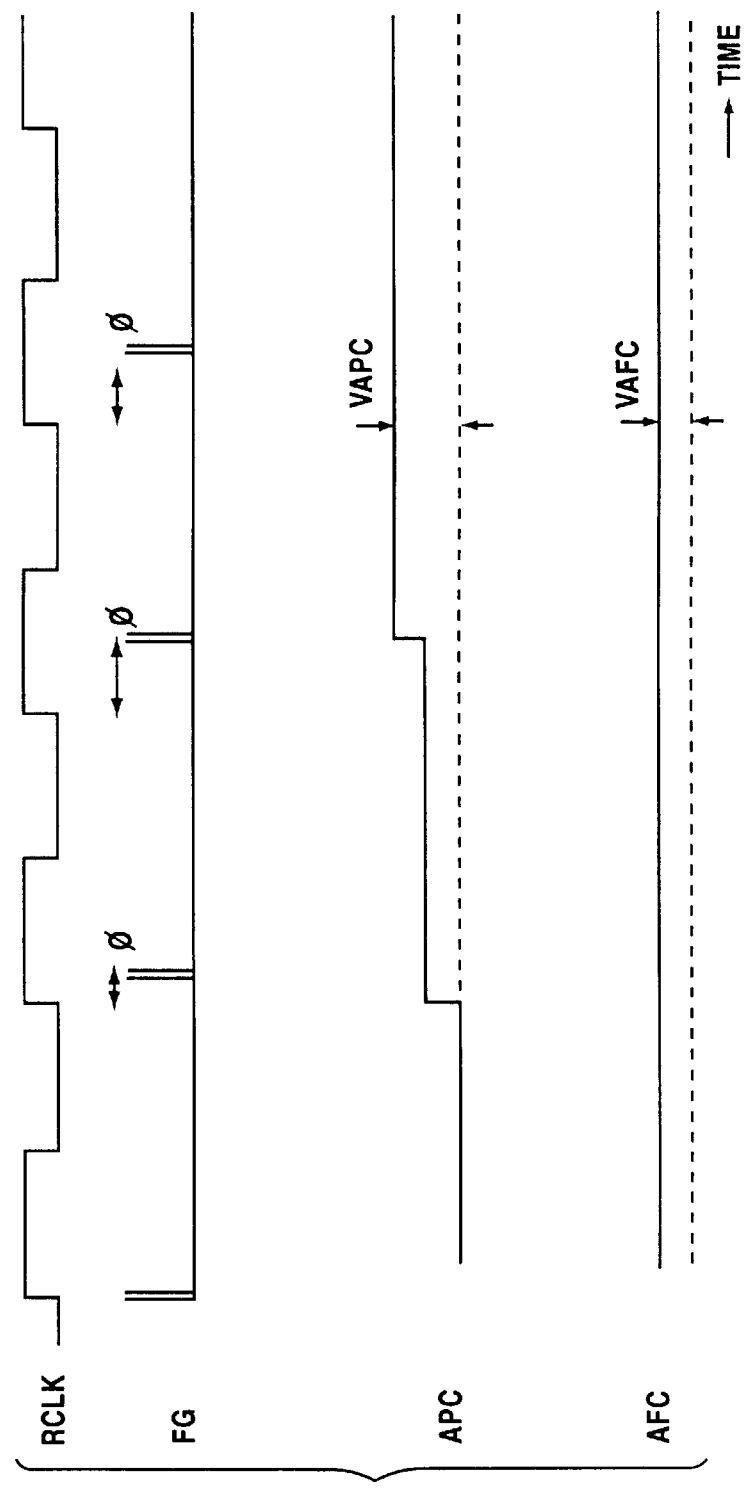
FIG. 7 is a time chart for explaining the proposed spindle unit control method.

In FIG. 27B, 3 CCD image sensors 219 (CCD (1), CCD (2) and CCD (3)) are arranged with an inclination of approximately 60° with respect to the laser beam scan direction. One CCD mark K, one CCD mark C, one CCD mark M and one CCD mark Y are printed on the transparent transport belt 218 between two paper 210 by the corresponding photoconductive drums DR1 through DR4.

In FIG. 27B, the CCD marks K, C, M and Y on the left side form the sub pitch mark group 75S which is parallel to the laser beam scan direction, and are printed at three separate locations so as to be detected by three CCD image sensors 219. On the other hand, the CCD marks K, C, M and Y on the right side form the main pitch mark group 75M which is perpendicular to the laser beam scan direction, and are printed at three separate locations so as to be detected by the three CCD image sensors 219.

The three CCD image sensors 219 are arranged obliquely to the laser beam scan direction, so that one CCD image sensor 219 can detect the sub pitch mark group 75S and the main pitch mark group 75M. In addition, these CCD marks are removed by the blade 73 after passing the CCD image sensors 219.

Next, a description will be given of a color printing error detection means by referring to FIG. 27.

(1) Three CCD image sensors 219 are arranged above the transport belt 218 and on the downstream side of the fourth photoconductive drum DR4, with an inclination of approximately 60° with respect to the laser beam scan direction. In addition, one mark each of the CCD marks Y, M, C and K is printed on the transport belt 218 between two paper 210 at a location 10 to 40 mm from the bottom end of the paper 210 by each of the photoconductive drums DR1 through DR4 for each printing.

(2) A laser pulse light is irradiated from below the transparent transport belt 218 at a time when the four printed CCD marks Y, M, C and K enter pixel regions of the CCD image sensors 219, and the CCD image sensors 219 detect the changes in the transmitted light quantities depending on the CCD marks Y, M, C and K.

(3) Each CCD image sensor 219 includes 5340 linearly arranged CCD cells each having the size of 7×7 μm, and converts the transmitted light quantities corresponding to the pixel positions into charge quantities. The charge quantities are stored in the 5340 CCD cells. In other words, a small amount of charge is stored in the CCD cell corresponding to the pixel which is blocked by one of the CCD marks Y, M, C and K, and a large amount of charge is stored in the CCD cell corresponding to the pixel which is not blocked by one of the CCD marks Y, M, C and K.

(4) Next, the charge quantities stored in each of the CCD cells (pixels) are successively read from the first pixel and compared with the set value. A point in time when the read charge quantity becomes less than or equal to the set value is judged as being a start of the light blocking by the CCD mark Y, M, C or K, and a point in time when the read charge quantity becomes greater than the set value is judged as being an end of the light blocking. The pixel numbers of the pixels corresponding to these points in time are stored in the pixel data memory.

(5) When the fourth CCD marks Y, M, C and K are printed, the number of pixel numbers stored in the pixel data memory becomes (start of blocking)+(end of blocking)×4=8. But actually, the number pixel numbers becomes approximately 50 due to the unclear edges of the CCD marks Y, M, C and K, the stain on the transport belt 218 and the like. For this reason, 8 transition points of the CCD marks Y, M, C and K are extracted according to a process (algorithm) which will be described later.

(6) A difference between the anticipated pixel number and the detected pixel number is converted into a distance by an operation such as multiplying a predetermined coefficient to the difference, so as to measure a color printing error quantity, tat is, calculate an error quantity with respect to the CCD mark K by taking the CCD mark K as a reference. It is desirable to calculate the error quantity with reference to the CCD mark K because black (K) is often used for the printing. However, it is of course possible to use one of the other CCD marks Y, M and C as the reference.

The CCD marks may be detected using a reflected light in place of the transmitted light. In this case, a transport belt which does not transmit light is used to reflect the laser light from the laser light source 72.

Description of Measurement of Color Printing Error

Figure 28:
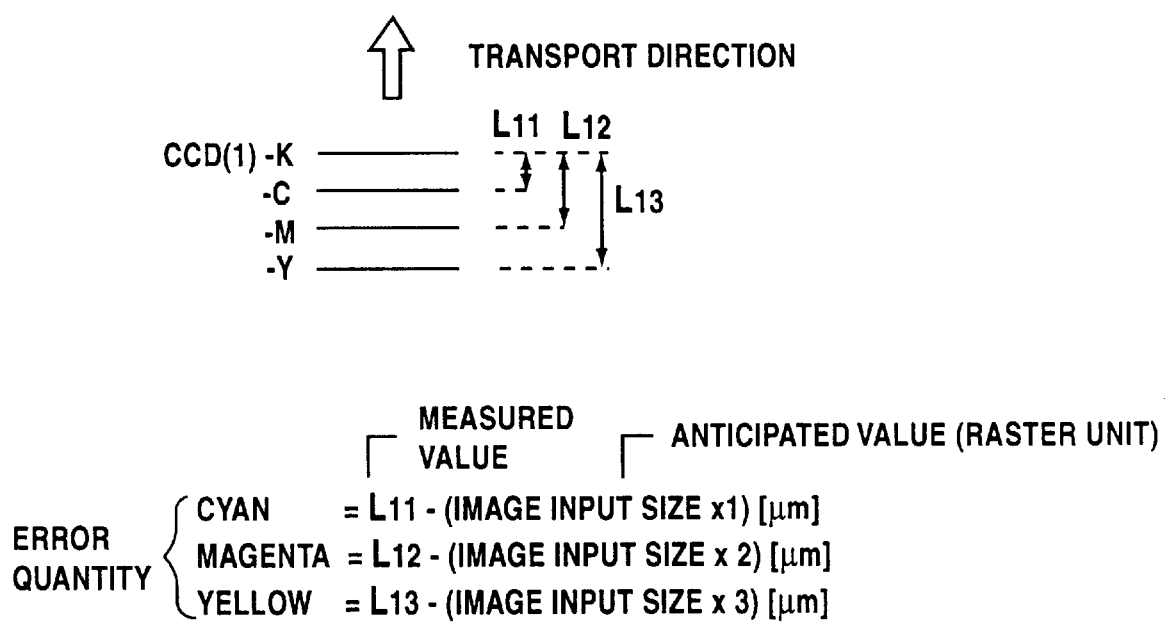
FIG. 28 is a diagram for explaining a sub scan start position error.

Description of Process of Sub Scan Direction Error Quantity Calculation Unit (a) Description of Sub Scan Start Position Error FIG. 28 is a diagram for explaining the sub scan start position error. In FIG. 28, one of the three CCD image sensors 219, namely, the first CCD image sensor CCD (1), is used to detect the four first CCD marks K, C, M and Y which are printed in the main scan direction which is perpendicular to the paper transport direction. Next, distances $L_{11}$, $L_{12}$ and $L_{13}$ of the first CCD marks C, M and Y with respect to the first CCD mark K are measured. Then, these measured distances $L_{11}$, $L_{12}$ and $L_{13}$ are compared with anticipated values in raster units so as to detect the error quantities.

If it is assumed that the four CCD marks K, C, M and Y are printed at equal intervals, the sub scan start position error quantity can be calculated in the following manner.

Error Quantity of Cyan=$L_{11}$−(Image Input Size×1) [μm]

Error Quantity of Magenta=$L_{12}$−(Image Input Size×2) [μm]

Error Quantity of Yellow=$L_{13}$−(Image Input Size×3) [μm]

(b) Description of Skew

Figure 29:
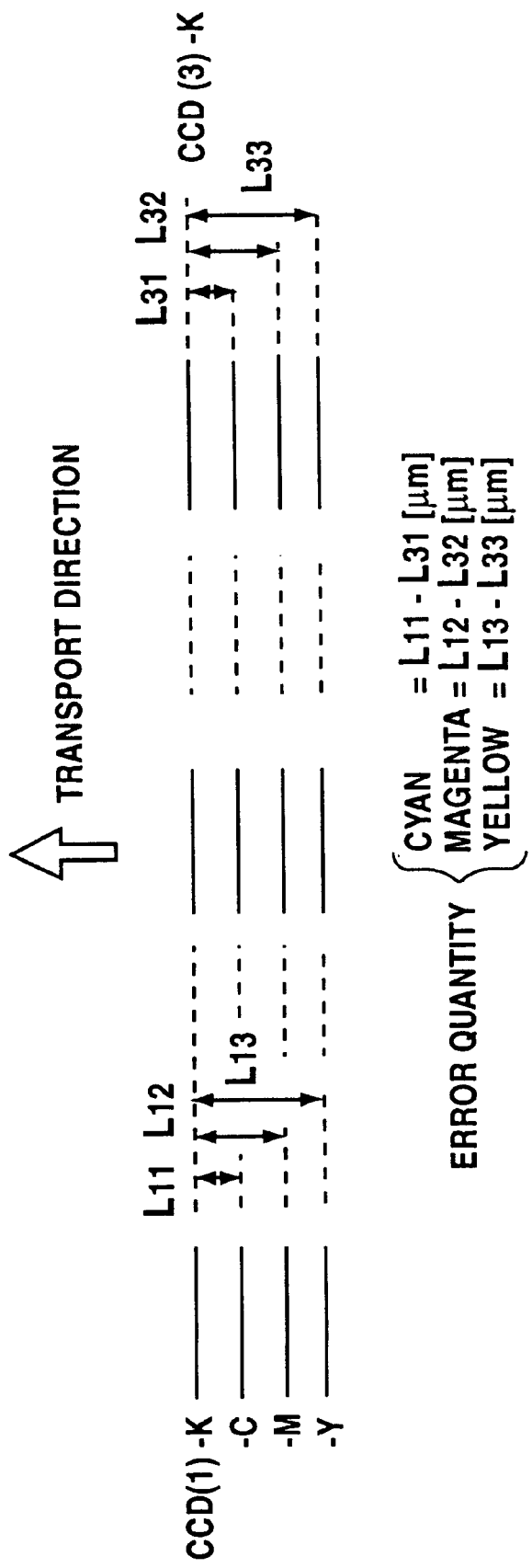
FIG. 29 is a diagram for explaining a skew.

FIG. 29 is a diagram for explaining the skew. In FIG. 29, the skew or parallel deviation in the sub scan direction is detected as follows. That is, two of the three CCD image sensors 219, namely, the first and third CCD image sensors CCD (1) and CCD (3) are used to respectively detect the four first CCD marks K, C, M and Y and the four third CCD marks K, C, M and Y which are printed in the direction perpendicular to the paper transport direction. Then, distances $L_{11}$, $L_{12}$ and $L_{13}$ of the first CCD marks C, M and Y with respect to the first CCD mark K are measured, and distances $L_{31}$, $L_{32}$ and $L_{33}$ of the third CCD marks C, M and Y with respect to the third CCD mark K are measured. Next, these measured distances $L_{11}$, $L_{12}$ and $L_{13}$ and measured distances $L_{31}$, $L_{32}$ and $L_{33}$ are respectively compared with anticipated values in raster units so as to detect the error quantities.

The error quantities of the skew in the sub scan direction can be calculated as follows.

Error Quantity of Cyan=$L_{11}$−$L_{31}$ [μm]

Error Quantity of Magenta=$L_{12}$−$L_{32}$ [μm]

Error Quantity of Yellow=$L_{13}$−$L_{33}$ [μm]

Figure 30:
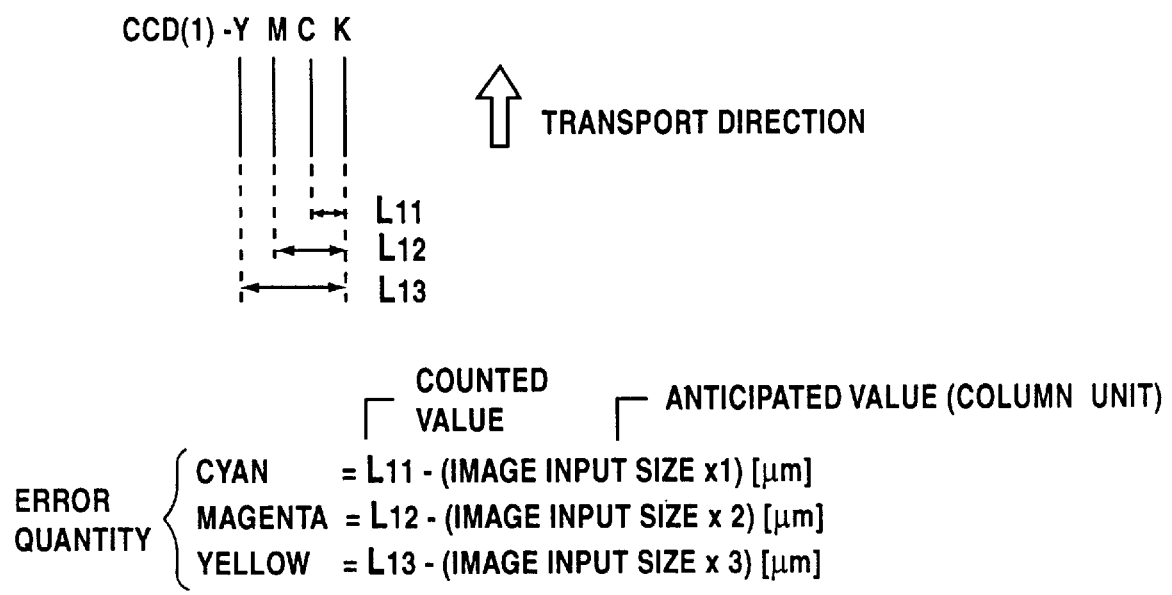
FIG. 30 is a diagram for explaining a main scan start position error.

Description of Process of Main Scan Direction Error Quantity Calculation Unit (a) Description of Main Scan Start Position Error FIG. 30 is a diagram for explaining the main scan start position error. In FIG. 30, one of the three CCD image sensors 219, namely, the first CCD image sensor CCD (1), is used to detect the four first CCD marks K, C, M and Y which are printed in the direction parallel to the paper transport direction. Next, distances $L_{11}$, $L_{12}$ and $L_{13}$ of the first CCD marks C, M and Y with respect to the first CCD mark K are measured. Then, these measured distances $L_{11}$, $L_{12}$ and $L_{13}$ are compared with anticipated values in column units so as to detect the error quantities. In this case, it is also possible to use the second CCD image sensor CCD (2) or the third CCD image sensor CCD (3) in place of the first CCD image sensor CCD (1).

If it is assumed that the four CCD marks K, C, M and Y are printed at equal intervals, the main scan start position error quantity can be calculated in the following manner.

Error Quantity of Cyan=$L_{11}$−(Image Input Size×1) [μm]

Error Quantity of Magenta=$L_{12}$−(Image Input Size×2) [μm]

Error Quantity of Yellow=$L_{13}$−(Image Input Size×3) [μm]

(b) Description of Print Width of Main Scan

The mark image forming unit 241 divides the print region in the main scan direction into one or more sections, and prints at the starting and the end of each section the mark group which is made up of an arrangement of the marks of each of the four colors for use in detecting the positional error. The mark image processor 230 forms the correction quantity of the print position error correction means 242 with respect to the print width, only from values in units of sections which are obtained by further dividing the printing density into sections. If the number of such section is two or greater, the correction quantity of a first section is calculated depending on the error quantity of the first section, and in the second and subsequent sections, the correction is carried out using as the correction quantity a value which is obtained by subtracting the correction quantity of a previous section from the correction quantity which is calculated from the error quantity of the preset section. As a result, the operation of correcting the print width can be carried out simultaneously for all of the sections, thereby enabling a reduction of the processing time.

Figure 31:
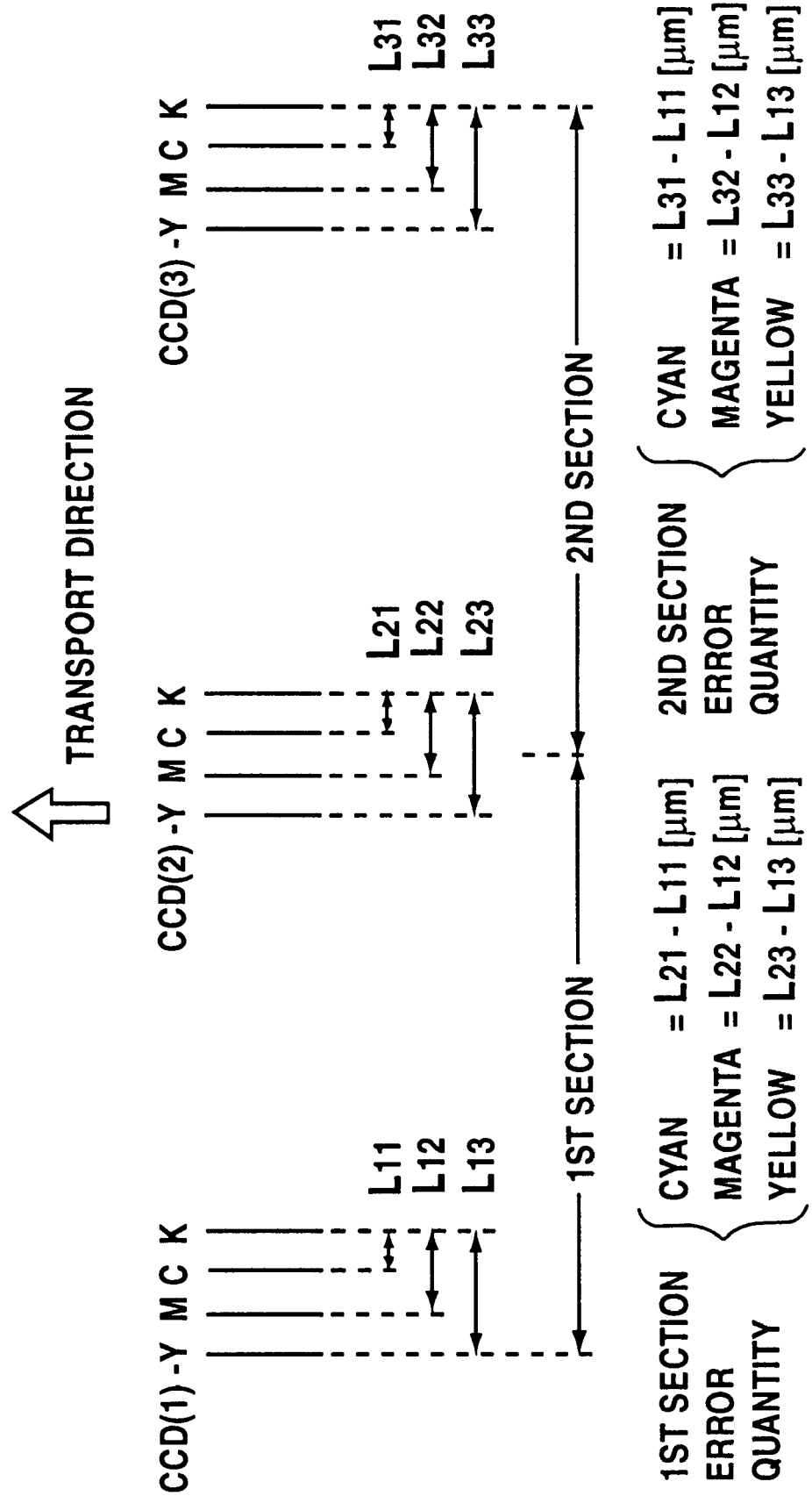
FIG. 31 is a diagram for explaining a print width error in the main scan direction.

FIG. 31 is a diagram for explaining the print width error in the main scanning direction. In FIG. 31, the print width error in the main scan direction is detected as follows. That is, the three CCD image sensors 219, namely, the first, second and third CCD image sensors CCD (1), CCD (2) and CCD (3) are used to respectively detect the four first CCD marks K, C, M and Y, the four second CCD marks K, C, M and Y, and the four third CCD marks K, C, M and Y which are printed in the direction parallel to the paper transport direction. Then, distances $L_{11}$, $L_{12}$ and $L_{13}$ of the first CCD marks C, M and Y with respect to the first CCD mark K are measured, distances $L_{21}$, $L_{22}$ and $L_{23}$ of the second CCD marks C, M and Y with respect to the second CCD mark K are measured, and distances $L_{31}$, $L_{32}$ and $L_{33}$ of the third CCD marks C, M and Y with respect to the third CCD mark K are measured. Next, these measured distances $L_{11}$, $L_{12}$ and $L_{13}$, measured distances $L_{21}$, $L_{22}$ and $L_{23}$, and measured distances $L_{31}$, $L_{32}$ and $L_{33}$ are respectively compared so as to detect the error quantities.

The error quantities of the print width in the main scan direction can be calculated independently for the first section and the second section, as follows.

Error Quantities of First Section

Error Quantity of Cyan=$L_{21}-L_{11}$ [$\mu m$]

Error Quantity of Magenta=$L_{22}-L_{12}$ [$\mu m$]

Error Quantity of Yellow=$L_{23}-L_{13}$ [$\mu m$]

Error Quantities of Second Section

Error Quantity of Cyan=$L_{31}-L_{11}$ [$\mu m$]

Error Quantity of Magenta=$L_{32}-L_{12}$ [$\mu m$]

Error Quantity of Yellow=$L_{33}-L_{13}$ [$\mu m$]

Therefore, by alternately printing the two kinds of marks, that is, the sub pitch marks and main pitch marks, for detecting the print position error in the main scan direction and the sub scan direction, it is possible to successively obtain the correction quantities for the main and sub scan directions. Hence, the print position error correction means 242 can simultaneously correct the print position errors in the main and sub scan directions.

It is possible to provide a correcting operation mode switching means for selectively switching the correcting operation mode between a correcting operation mode in which the mark image forming unit 241 alternately prints at least two or more kinds of mark groups on the transport belt 218 in order to detect the print position errors in the main scan direction and the sub scan direction, and a correcting operation mode in which the mark image forming unit 241 continuously prints the mark on the transport belt 218 for each mark.

Accordingly, first. two kinds of marks for detecting the print position error in the main and sub scan directions are alternately printed, for example, and a decision is made to determine whether the obtain error quantities in the main and sub scan directions fall within prescribed value ranges. If the error quantities in both the main and sub scan directions fall outside the prescribed value ranges, a correcting operation is carried out by the correction means, and thereafter, the two kinds of marks for detecting the print position error in the main and sub scan directions are alternately printed again so as to obtain the error quantities. In addition, if only one of the error quantities in the main and sub scan directions falls outside the prescribed value range, only the corresponding mark is continuously printed and the error quantity is obtained therefrom, so as to reduce the processing time of the positional error correcting process.

Furthermore, it is possible to facilitate the calculation of the error quantities and use a common calculation procedure for the main and sub scan directions, by arranging the colors of the marks which are printed so that the arrangement of the colors of the marks which are stored in the order of the pixel addresses of the CCD image sensor 219 are the same in the main scan direction and the sub scan direction.

Figure 32A:
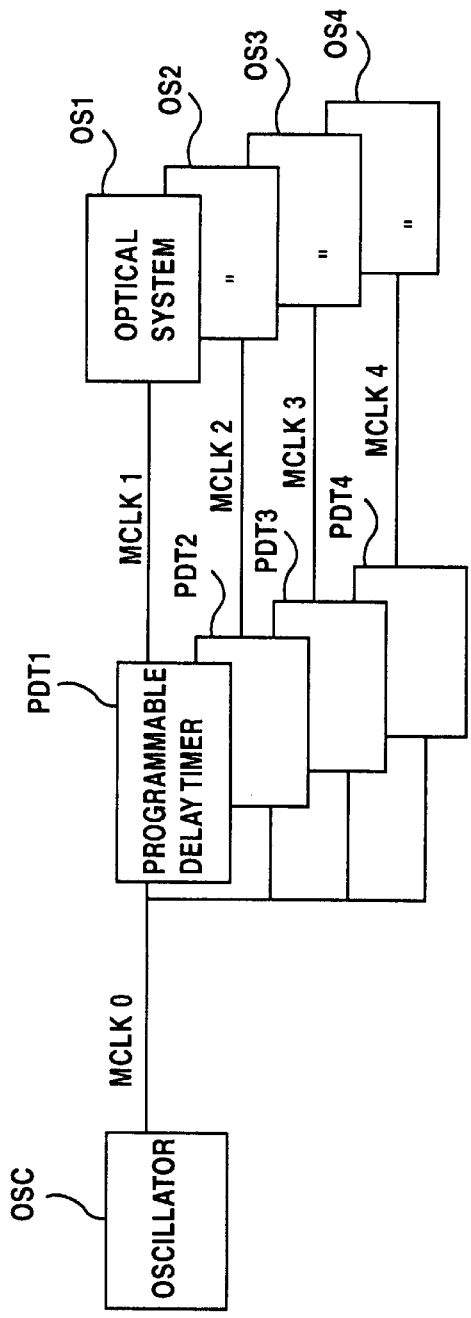
FIGS. 32A and 32B respectively are a diagrams for explaining correction of the sub scan direction start position.
Figure 32B:
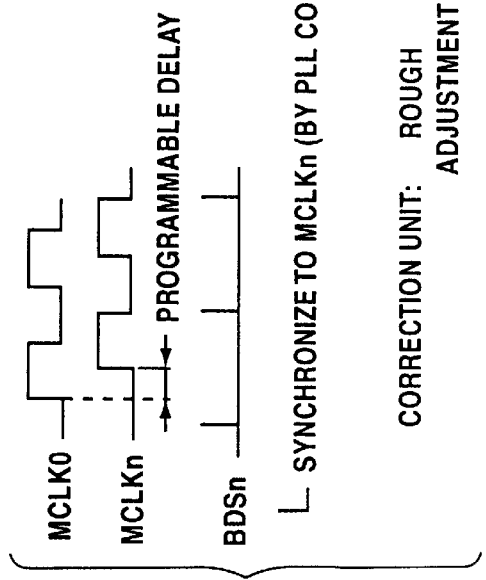

Description of Drawing Output (Print Position Error Correction) For Finely Adjusting Drawing Position Description of Sub Scan Direction Start Position and Skew Correction Means (a) Description of Correction of Sub Scan Start Position FIGS. 32A and 32B are diagrams for explaining the correction of the sub scan direction start position. In FIG. 32A, an oscillator OSC generates a synchronizing signal MCLK0 having a desired beam scan period, and programmable delay timers PDT1 through PDT4 are provided with respect to optical systems OS1 through OS4, that is, the optical units Y, M, C and K, respectively having a mirror motor controller.

Waveforms shown in FIG. 32B include the synchronizing signal MCLK0 output from the oscillator OSC, delayed synchronizing signals MCLKn (n=1, . . . , 4) which are delayed by the programmable delay timers PDT1 through PDT4, and beam scan detection signals BDSN (n=1, . . . , 4). The beam scan detection signals BDSN are detection timing signals, that is, outputs of laser light detectors, of the beam scans synchronized to the synchronizing signal MCLKn.

The synchronizing signal MCLK0 from the oscillator OSC is delayed by each of the programmable delay timers PDT1, PDT2, PDT3 and PDT4 depending on the error quantities in the sub scan direction, and the delayed synchronizing signals MCLK1, MCLK2, MCLK3 and MCLK4 are supplied to the corresponding optical systems OS1, OS2, OS3 and OS4. The optical systems OS1, OS2, OS3 and OS4 input the external input signals, that is, the synchronizing signals MCLK1, MCLK2, MCLK3 and MCLK4, to the mirror motor controllers which use PLL control, and carry out the beam scans in synchronism with the corresponding external input signals.

Accordingly, by varying the delay timer values of the programmable delay timers PDT1 through PDT4 depending on the sub scan direction error quantities described above in conjunction with FIG. 28, it is possible to adjust the sub scan timings of the optical systems OS1 through OS4 and correct the color printing error in the sub scan direction. For example, the correction unit is one raster unit in the case of a coarse adjustment, and is $\frac{1}{22}$ to $\frac{1}{55}$ raster unit in the case of a fine adjustment.

(b) Description of Skew Correction

The skew correction is carried out by turning the spindle units S1 through S4 about vertical shafts by extremely small amounts depending on the error quantities described above in conjunction with FIG. 29. For example, the spindle units S1 through S4 can be turned by the extremely small amounts by pushing reference faces of the spindle units S1 through S4 with respect to a lever (not shown) provided on the side of the image forming apparatus, and turning the lever by a stepping motor or the like depending on the error quantities of the skew. The correction unit in this case may be set to 25 $\mu$m/step, for example.

Figure 33A:
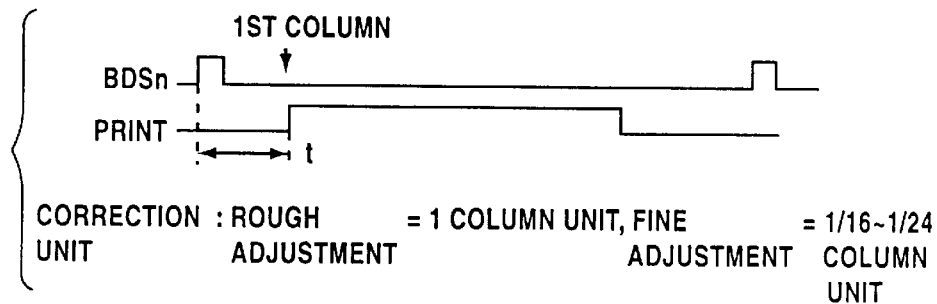
FIGS. 33A, 33B and 33C respectively are diagrams for explaining a correction control system in the main scan direction.
Figure 33B:
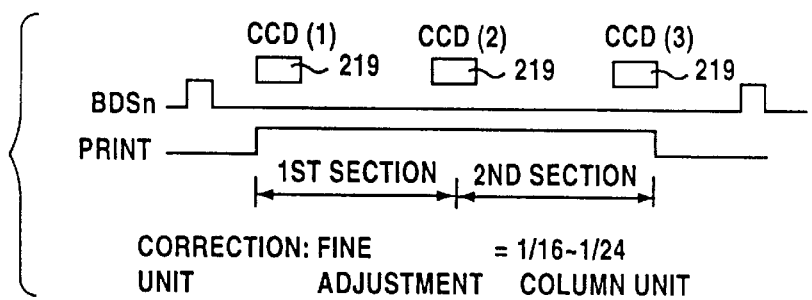
Figure 33C:
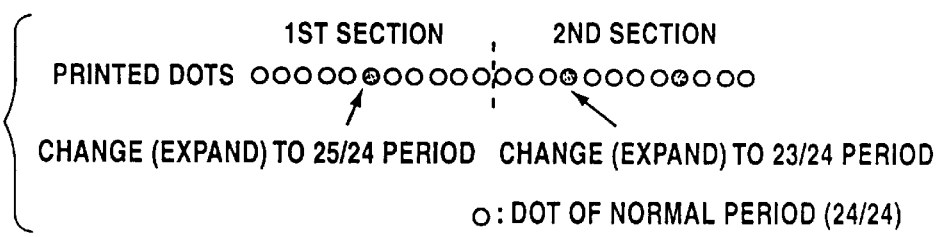

Description of Main Scan Direction Start Position and Print Width Correction Means FIGS. 33A, 33B and 33C are diagrams for explaining the correction control system in the main scan direction. FIG. 33A is a diagram for explaining the correction of the start position, FIG. 33B is a diagram for explaining the correction of the print width, and FIG. 33C is a diagram for explaining an example of the correction of the print width.

(a) Description of Correction of Main Scan Start Position

The correction of the main scan start position is carried out by adjusting a time from the time when a beam scan detection signal BDS is detected to the time when the first column (printing dot) is printed, depending on the error quantity described above in conjunction with FIG. 30. In FIG. 33A, the main scan start position is corrected by adjusting a time t from the time when the beam scan detection signal BDSn is output to the time when the first column is printed. For example, the correction unit is one column unit in the case of a coarse adjustment, and is $\frac{1}{16}$ to $\frac{1}{24}$ column unit in the case of a fine adjustment.

(b) Description of Print Width Correction

The print width is corrected in the following manner. That is, a video clock modulation means is provided to compress or expand the dot period of an arbitrary column position by $\pm 1/N$, the compression or expansion number is calculated depending on the error quantity described above in conjunction with FIG. 31, and the print width is compressed or expanded by evenly distributing the compressed or expanded portions, so as to correct the print width. In FIG. 33B, the printing portion which is a predetermined time after the output of the beam scan detection signal BDSn is divided into the first and second sections, and the adjustment is made with respect to the first and second sections. For example, the correction unit is $\frac{1}{16}$ to $\frac{1}{24}$ column unit for a fine adjustment.

FIG. 33C shows an example of the print width correction for a case where the printing is made at 240 dpi and the normal period of the printed dots is $\frac{24}{24}$ dot. It is assumed in this case that corrections of $+\frac{1}{24}$ (column) and $-\frac{2}{24}$ (column) are respectively required to correct the error quantities of the first and second sections for a certain color with respect to black K. In this case, the first section is changed (expanded) to $\frac{25}{24}$ period, and the second section is changed (compressed) to $\frac{23}{24}$ period.

Actually, the correction quantity for the second section takes into account the correction quantity of the first section, and is set to $-\frac{2}{24} + (+\frac{1}{24}) = -\frac{1}{24}$. Therefore, in this particular case, the compression is made once at an intermediate portion of the second section.

Description of the Process (Algorithm) of Extracting CCD Marks

Based on approximately 50 transition point pixel address data which are obtained by detecting the four CCD marks by the CCD image sensor 219, eight points of CCD mark portion are extracted by the following procedure.

First, in a case where a light blocking member of 800 $\mu$m is placed, the small charge quantity is obtained from 800 $\mu$m÷7 $\mu$m≈114 continuous pixels, as the output of the CCD image sensor 219. Hence, a similar effect may be anticipated with respect to a CCD mark having a width of 800 $\mu$m. However, the following inconveniences exist in the reading evaluation stage of the static CCD mark.

(i) The edge line portion is unclear when the edge portion is enlarged, and chattering occurs in the vicinity of the edge.

(ii) The irregularity caused by the shape of the dots is large when the edge portion is enlarged, and measurement error of the error quantity occurs among the marks.

(iii) The dot printing error among the faces of the polygonal mirror of the spindle unit is large when the edge portion is enlarged, and measurement error of the error quantity occurs among the marks.

(iv) An unprinted portion is generated when the edge portion is enlarged, and insufficient mark width is generated.

With regard to the measures against the above described inconveniences, the effects of the extracting algorithm and averaging are observed with respect to (i) above, and the effects of averaging are observed with respect to (ii) above. Further, a main correcting operation is carried out after completing a correction among the faces with respect to (iii) above, and the effects of averaging are observed with respect to (iv) above.

(a) Description of Extracting Algorithm of CCD Mark (1) A large filter of 100 $\mu$m and a small filter of 25 $\mu$m are provided to check the continuity of the non-transmitting pixels (CCD mark).

(2) When successively reading the data from the CCD image sensor starting from the first pixel, the two filters described above are used. The pixel numbers at both ends of the non-transmitting pixel group of 110 $\mu$m or greater and the non-transmitting pixel group of 25 $\mu$m to 110 $\mu$m which do not pass through the filters, are stored in the pixel data memory together with the filter type and discrimination codes for discriminating starting/terminal ends.

(3) The starting end pixel number and the terminal end pixel number of the CCD mark K are extracted as follows, and carried out by the microprocessor of the mark image processor 30.

First, the starting end pixel number of the large pixel group which is used to detect the main portion of the CCD mark when a detection amounting to 16 or more pixels of the CCD image sensor is made is searched from the pixel data memory, and the first starting end pixel is regarded as the starting end pixel number of the CCD mark K, and a right-adjacent pixel (present address+1) is regarded as the terminal end pixel number.

Next, if the starting end pixel number of the small pixel group which is used to detect the edge line portion of the CCD mark exists when a detection amounting to 4 to 16 pixels of the CCD image sensor is made, the starting end pixel number of the CCD mark K is unconditionally updated to that number, and a connection of the pixel group is made.

A search is made to the right side of the starting end pixel number up to 110% of the CCD mark width, and if the terminal end pixel number of a new large pixel group exists, a new terminal end pixel is successively updated by this number, and a connection of the pixel group is made.

Then, a search is made to the left side of the starting end pixel number up to 110% of the CCD mark width, and if the starting end pixel number of a small pixel group exists, a new starting end pixel is successively updated by this number, and a connection of the pixel group is made.

Furthermore, a search is made to the right side of the terminal end pixel number up to 110% of the CCD mark width, and if the starting end pixel number of a small pixel group exists, a new terminal end pixel is successively updated by the left-adjacent terminal end pixel number.

(4) The starting and terminal end pixel numbers of the next CCD marks C, M and Y are extracted as follows. That is, a right-adjacent pixel to the terminal end pixel of the CCD mark K is used as an origin, and the starting and terminal end pixel numbers of the CCD mark C are extracted by making a search similarly to (3) described immediately above. Thereafter, the starting and terminal end pixel numbers of the CCD marks M and Y are extracted in a similar manner.

(b) Description of Mark Extraction Process With Reference to Drawing

Figure 34:
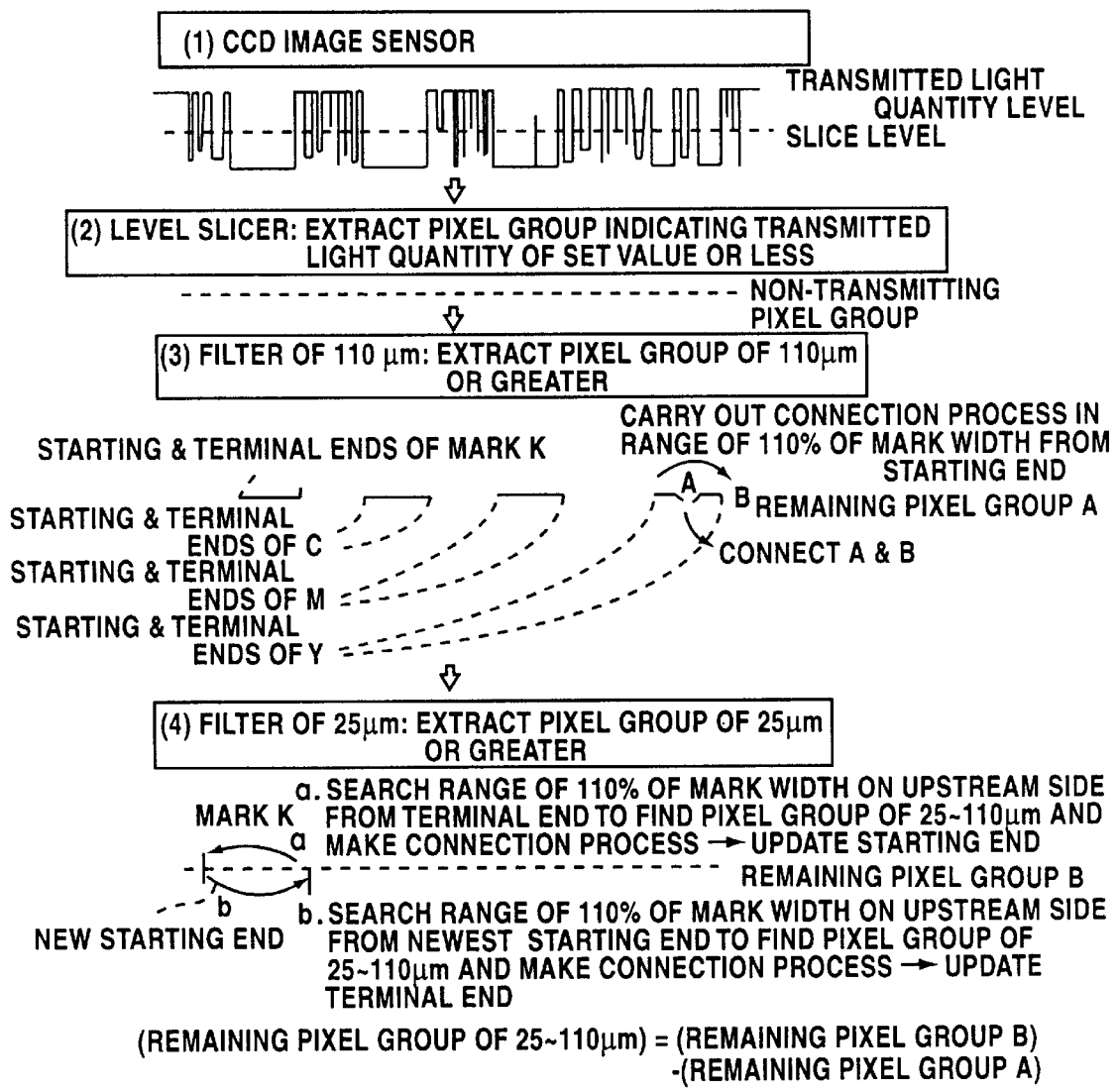
FIG. 34 is a diagram for explaining a mark extraction process.

FIG. 34 is a diagram for explaining the mark extraction process. In FIG. 34, the waveforms from the top to bottom respectively are the output waveforms of the CCD image sensor 219, the non-transmitting pixel group, a remaining pixel group A and a remaining pixel group B. A description will hereunder be given with respect to the CCD mark extraction process by referring to these waveforms.

(1) A slice level indicated by the dotted line is set between an upper end, that is, the transmitted light quantity level, and a lower end of the output waveform of the CCD image sensor 219.

(2) The output waveform of the CCD image sensor 219 is sliced by a level slicer, so as to extract a non-transmitting pixel group which indicates a transmitted light quantity of a set value or less.

(3) Using the filter of 110 μm, the large pixel group that is 110 μm or greater and hereinafter referred to as the remaining pixel group A is extracted and stored in the pixel data memory, and a connection process is carried out with respect to the pixel group. First, the starting end pixel number of the large pixel group is searched from the pixel data memory, and the first starting end pixel is regarded as the starting end pixel number of the CCD mark K, and a right-adjacent pixel is regarded as the terminal end pixel number. Next, a search is made to the right side of the starting end pixel number up to 110% of the CCD mark width, and if the terminal end pixel number of a new large pixel group exists, a new terminal end pixel is successively updated by this number. In the case of the CCD mark Y shown in FIG. 34, marks A and B are connected. This process corresponds to the process of the first mark pixel region extraction unit shown in FIG. 24.

(4) Using the filter of 25 μm, the small pixel group that is 25 μm or greater and hereinafter referred to as the remaining pixel group B is extracted and stored in the pixel data memory, and a connection process is carried out with respect to the pixel group.

First, (a) a search is made from the terminal end up to 100% the CCD mark width on the upstream side, and the connection process is carried out with respect to the pixel group if the small pixel group of 25 μm to 110 μm exists, and the starting end is updated. Furthermore, (b) a search is made from the most recent starting end towards the terminal end up to 110% the CCD mark width so as to search the small pixel group of 25 μm to 110 μm, and the connection process is carried out with respect to the pixel group, and the terminal end is updated. This process corresponds to the process of the second mark pixel region extraction unit shown in FIG. 24.

The remaining small pixel group of 25 μm to 110 μm can be obtained from the following formula.

(Remaining Pixel Group of 25 μm to 110 μm)=(Remaining Pixel Group B)−(Remaining Pixel Group A)

Therefore, the filter size is set to a value in a range of approximately ⅓ to ⅙ the regular mark width for the large size, and is set to a value which is in a range of approximately 10 μm to 30 μm and is sufficiently small for the small size. For this reason, it is possible to detect the mark region with a high accuracy even when the mark is thin or broken.

(c) Description of Averaging

The mark image processor 230 counts the extracted number of mark groups, and when the counted value reaches a preset counted number of mark groups, takes an average of the relative quantities of the number of extracted mark groups for each color, excluding a maximum value and a minimum value of each color. The error quantity of each color with respect to the reference mark color is calculated from the average value and the reference value, and the correction quantity is calculated based on the error quantity.

Figure 35:
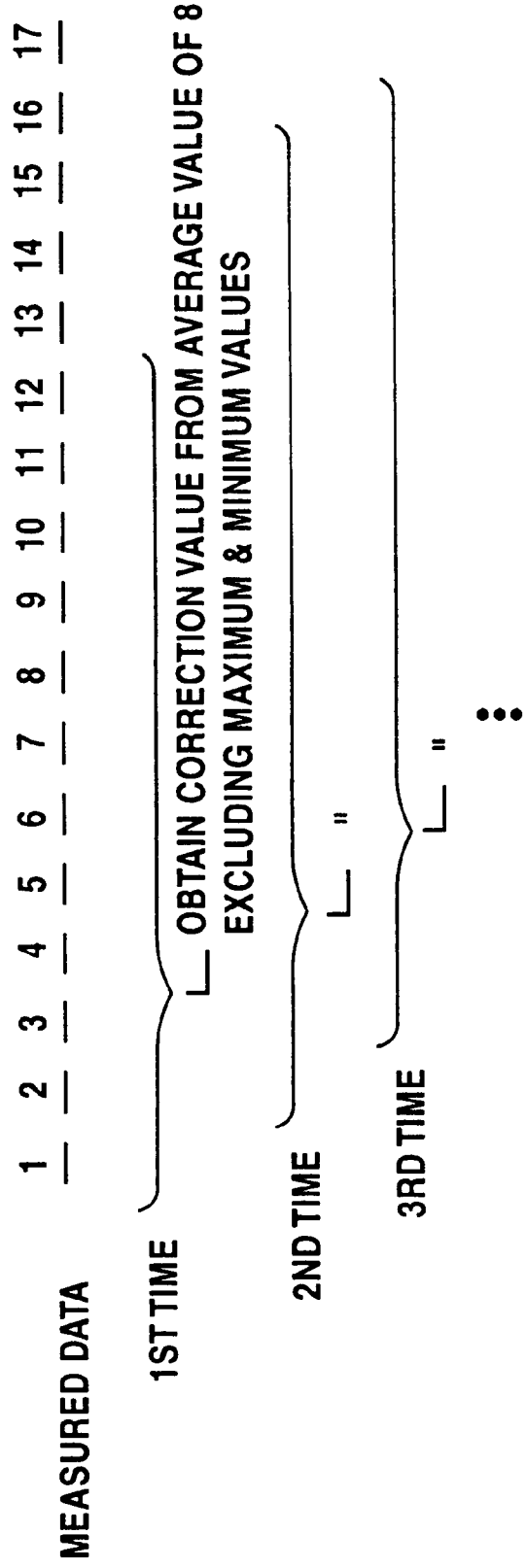
FIG. 35 is a diagram for explaining averaging of measured data.

FIG. 35 is a diagram for explaining the averaging of measured data. FIG. 35 shows 17 measured data 1 to 17 which are obtained by detecting the CCD mark. At the first time, the 12 measured data 1 to 12 are used, and the correction value is obtained from the average value of the 8 measured data excluding the maximum value and the minimum value of the measured data 1 to 12.

Next, at the second time, the 12 measured data 2 to 13 are used, and the correction value is obtained from the average value of the 8 measured data excluding the maximum value and the minimum value of the measured data 2 to 13. At the third time, the 12 measured data 3 to 14 are used, and the correction value is obtained from the average value of the 8 measured data excluding the maximum value and the minimum value of the measured data 3 to 14. Similarly thereafter, the correction value is obtained from the average value of the measured data by successively adding a new measured data in the measured data which are averaged.

According to the above described method of correcting the color printing error in the main scan direction and the sub scan direction, the dot printing error is not corrected depending on the characteristics of the spindle units S1 through S4 themselves. However, depending on the characteristics of the spindle units S1 through S4, the intervals of the dots formed on the corresponding photoconductive drums DR1 through DR4 may deviate in the main scan direction. In addition, the focal distances of the spindle units S1 through S4 with respect to the corresponding photoconductive drums DR1 through DR4 differ for each of the spindle units S1 through S4, and the scan width in the main scan direction of the photoconductive drums DR1 through DR4 differs depending on the spindle units S1 through S4. Hence, particularly when a multi-color image is to be formed, the dot printing error is easily generated among the Y, M, C and K images. For this reason, if the above described dot printing errors in the main scan direction are corrected depending on each of the causes, it is possible to more effectively correct the color printing error described above.

Hence, in this embodiment, the correction of the color printing error is improved by taking the following measures. That is, information related to the characteristic and focal distance is obtained in advance for each of the spindle units S1 through S4. Then, the dot printing error is corrected using the information, so as to prevent the dot printing error in the image which is finally formed on the paper 210 and improve the quality of the image.

Figure 36:
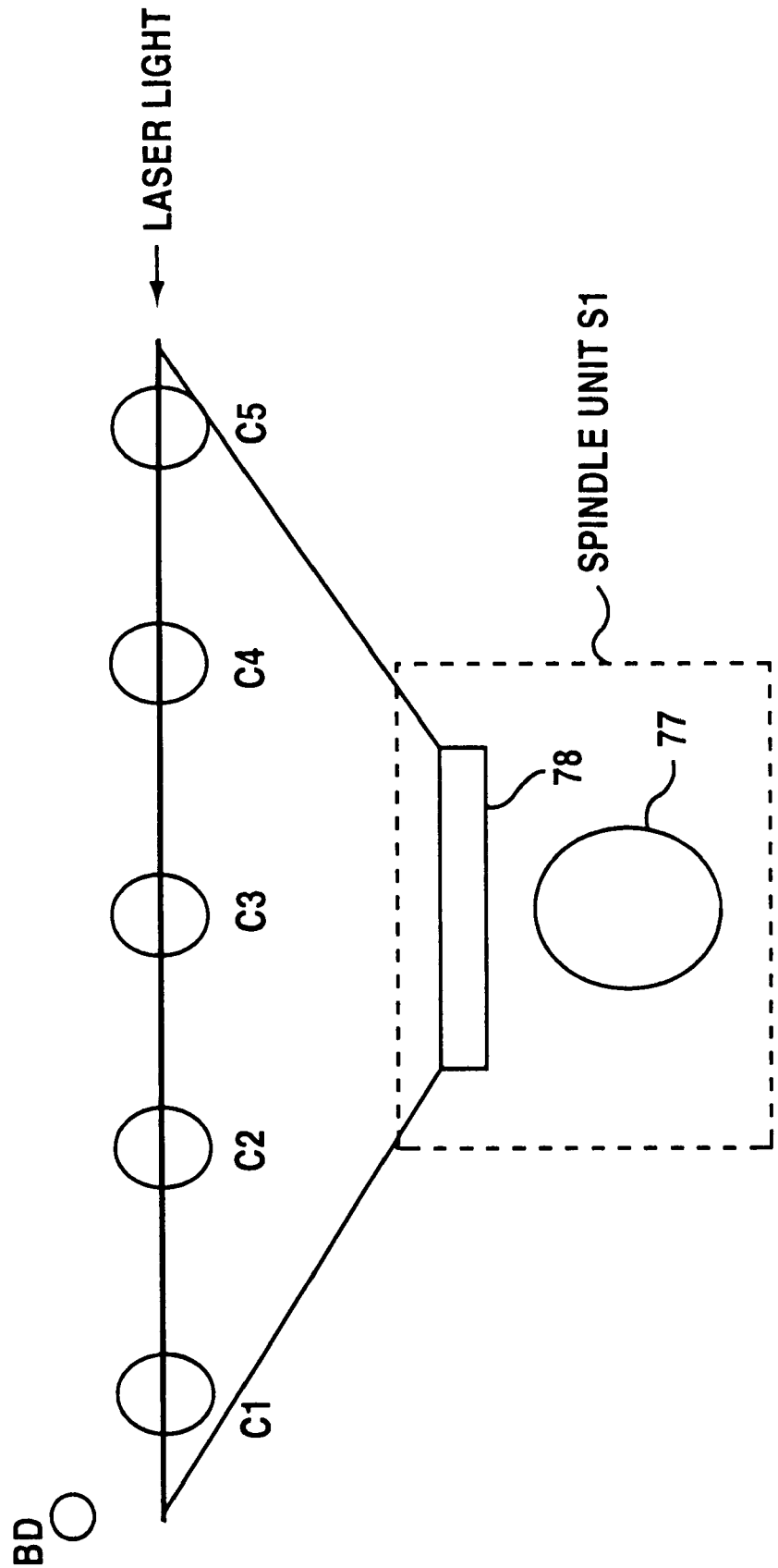
FIG. 36 is a diagram for explaining a method of measuring a characteristic of a spindle unit.

FIG. 36 is a diagram for explaining a method of measuring the characteristic of the spindle unit. For the sake of convenience, it is assumed that the characteristic of the spindle unit S1 is measured. In FIG. 36, the spindle unit S1 includes a polygonal mirror 77 which rotates together with the spindle, and a fθ lens. A camera (not shown) detects the laser light from the spindle unit S1 at each of positions C1 through C5, and the dot forming position is measured with respect to the absolute values of the distances of each of sections including the section from the position C1 to the position C2, the section from the position C2 to the position C3, the section from the position C3 to the position C4, and the section from the position C4 to the position C5. In FIG. 36, BD denotes a starting position of the main scan period.

Since the dot forming position is measured in this case by the distance, the unit of the measured distance is converted into a video clock rate indicating the minimum unit of the image data. For example, the conversion unit of the video clock rate is 1/16 (approximately 6.6 μm) of 240 dpi. Hence, the distance of the section from the position C1 to the position C2 is fixed by calculation so that the center of the camera is 1000 dots for the resolution of 240 dpi, and the error of the light emitting position from the center of the camera is measured for the case where the light emission is actually made at only the 1000th dot. In this case, if it is assumed that the light emission takes place at a position which is −530 μm from the center of the camera, the video clock rate is expanded for 530/6.6=80 dots within the 1000 dots in order to improve the characteristic of the section from the position C1 to the position C2.

Accordingly, the dot forming positions in all of the sections of the main scan period are measured, and the characteristic of each section is calculated. The calculated characteristic data is stored in the image data memory described above, for example, as the characteristic of the spindle unit S1. In FIG. 36, four sections exist in the main scan period, and thus, four characteristic data are stored in the image data memory. Furthermore, if the characteristic data is calculated for each face of the polygonal mirror 77 of the spindle unit S1, characteristic data amounting to four times the number of faces of the polygonal mirror 77 are stored in the image data memory with respect to one spindle unit S1. The characteristic data are calculated similarly and stored in the image data memory for each of the other spindle units S2 through S4.

Figure 37:
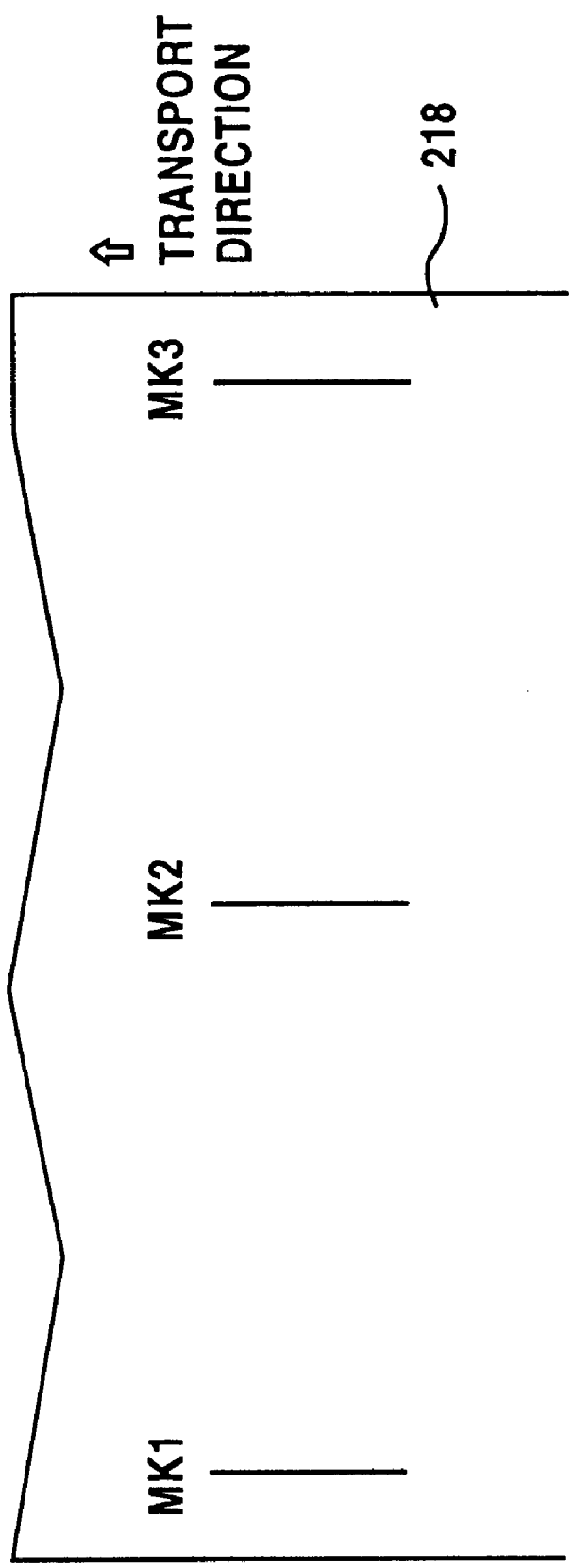
FIG. 37 is a diagram for explaining marks printed on a transport belt.

The difference of the image scan widths of the spindle unit S1 due to the difference in the focal distances with respect to the corresponding photoconductive drum 212 (DR1) can be detected as follows. First, marks MK1 through MK3 shown in FIG. 37 are printed on the transport belt 218, and these marks MK1 through MK3 are detected by the CCD image sensor 219 shown in FIG. 26 so as to measure each distance between the adjacent marks. When printing the marks MK1 through MK3, the characteristic data stored in the image data memory are used, and the video clock rate is changed to a video clock rate suited for the characteristic of the spindle unit S1.

For example, it is assumed that the marks MK1 and MK2 are printed so that the distance between the marks MK1 and MK2 is 2000 dots for the resolution of 240 dpi, but the mark is detected at a position which is −400 μm from the anticipated position. In this case, the video clock rate is expanded for 400/6.6=60 dots within the 2000 dots. Further, the distance between the marks MK1 and MK2 is set equal to the distance of the section from the position C1 to the position C2, and the distance between the marks MK2 and MK3 is set equal to the distance of the section from the position C3 to the position C5.

If it is assumed that the characteristic of the section from the position C1 to the position C2 is −80 dots, the characteristic of the section from the position C2 to the position C3 is −20 dots, and the characteristic between the marks MK1 and MK2 is −60 dots, and when these characteristics are evenly distributed to the final video clock rate, the characteristic of the section from the position C1 to the position C2 becomes −80+(−60/2)=−110 dots, and the characteristic of the section from the position C2 to the position C3 becomes −20 +(−60/2)=−50 dots. Accordingly, by expanding the video clock rate by 110 dots in the section from the position C1 to the position C2 and expanding the video clock rate by 50 dots in the section from the position C2 to the position C3, it is possible to prevent the dot printing error caused by the characteristic of the spindle unit S1, and to prevent the dot printing error caused by the difference in magnifications introduced by the difference in the focal distances of the spindle unit S1 with respect to the photoconductive drum 212 (DR1).

Therefore, it is possible to prevent the dot printing error caused by the characteristic of the spindle unit, and prevent the dot printing error caused by the difference in the magnifications introduced by the difference in the focal distances, with respect to each of the spindle units S1 through S4. By preventing the dot printing error and correcting the color printing error of the spindle units S1 through S4 by the process described above, it is possible to print on the paper 210 an image of a high quality.

Furthermore, instead of evenly distributing the characteristic of the section from the position C1 to the position C2, the characteristic of the section from the position C2 to the position C3, and the characteristic between the marks MK1 and MK2 to the final video clock rate, it is possible to make a more accurate distribution so that ratios of the video clock rates in the sections match the characteristic of the spindle unit S1. This is because, when the expanding or compressing amount of the video clock rate greatly differs for each section, the expanding or compressing amount of the video clock rate becomes different from the amount that is anticipated from the characteristic of the section even if the characteristics are evenly distributed among the sections.

Figure 38:
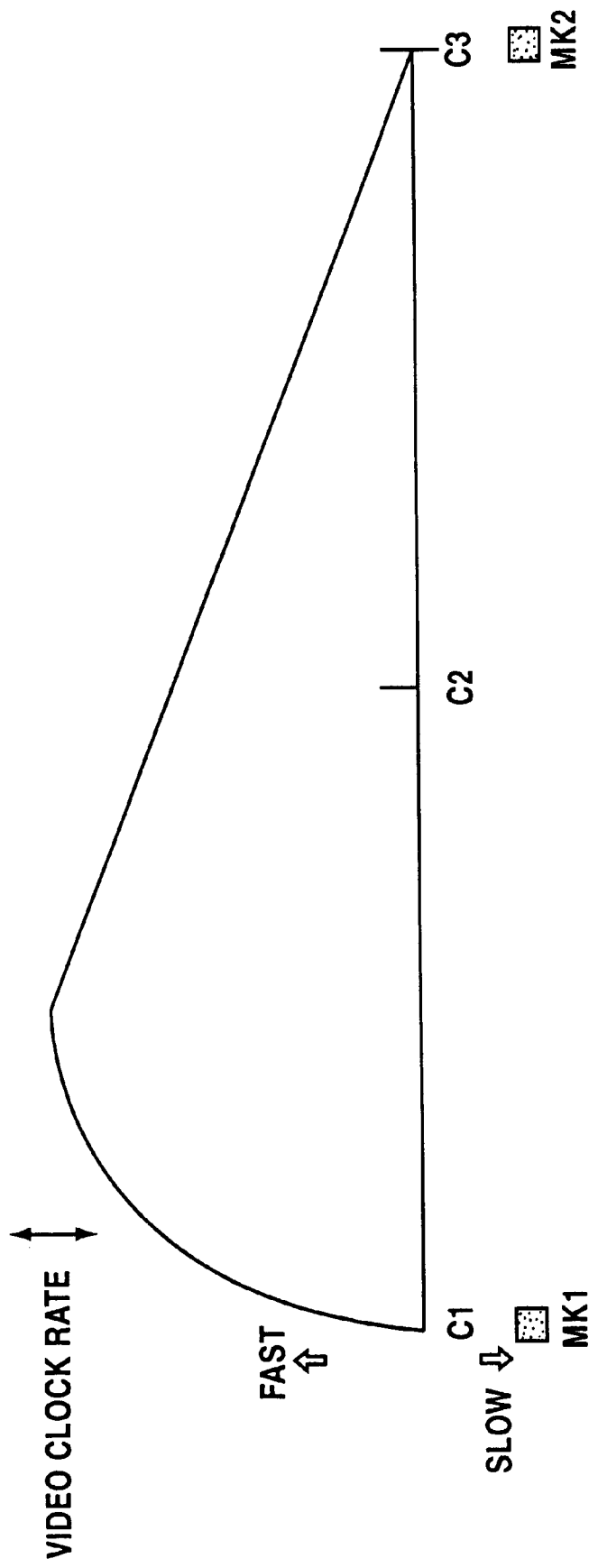
FIG. 38 is a diagram showing the characteristic of the spindle unit.

For example, suppose that the spindle unit S1 has the characteristic shown in FIG. 38. In FIG. 38, the ordinate indicates the video clock rate, and if the video clock rate is the same within the section, the faster the video clock rate the narrower the dot interval. In addition, if the video clock rate is the same within the section, the slower the video clock rate, the wider the dot interval. In this case, if it is assumed that the characteristic of the section from the position C1 to the position C2 is −80 dots, the characteristic of the section from the position C2 to the position C3 is −20 dots, and the characteristic between the marks MK1 and MK2 is −60 dots as in the above described case, the ratios of the characteristics in the section from the position C1 to the position C2 and the section from the position C2 to the position C3 is 80:20=4:1. Accordingly, the characteristic between the marks MK1 and MK2, that is, −60 dots, are distributed with respect to the characteristics in the section from the position C1 to the position C2 and the section from the position C2 to the position C3 with the ratio of 4:1. In other words, −80 +(−60/5×4)=−128 dots are distributed with respect to the section from the position C1 to the position C2, and −20 +(−60/5×1)=−32 dots are distributed with respect to the section from the position C2 to the position C3. Hence, the video clock rate of 128 dots is expanded in the section from the position C1 to the position C2, and the video clock rate of 32 dots is expanded in the section from the position C2 to the position C3.

Figure 39:
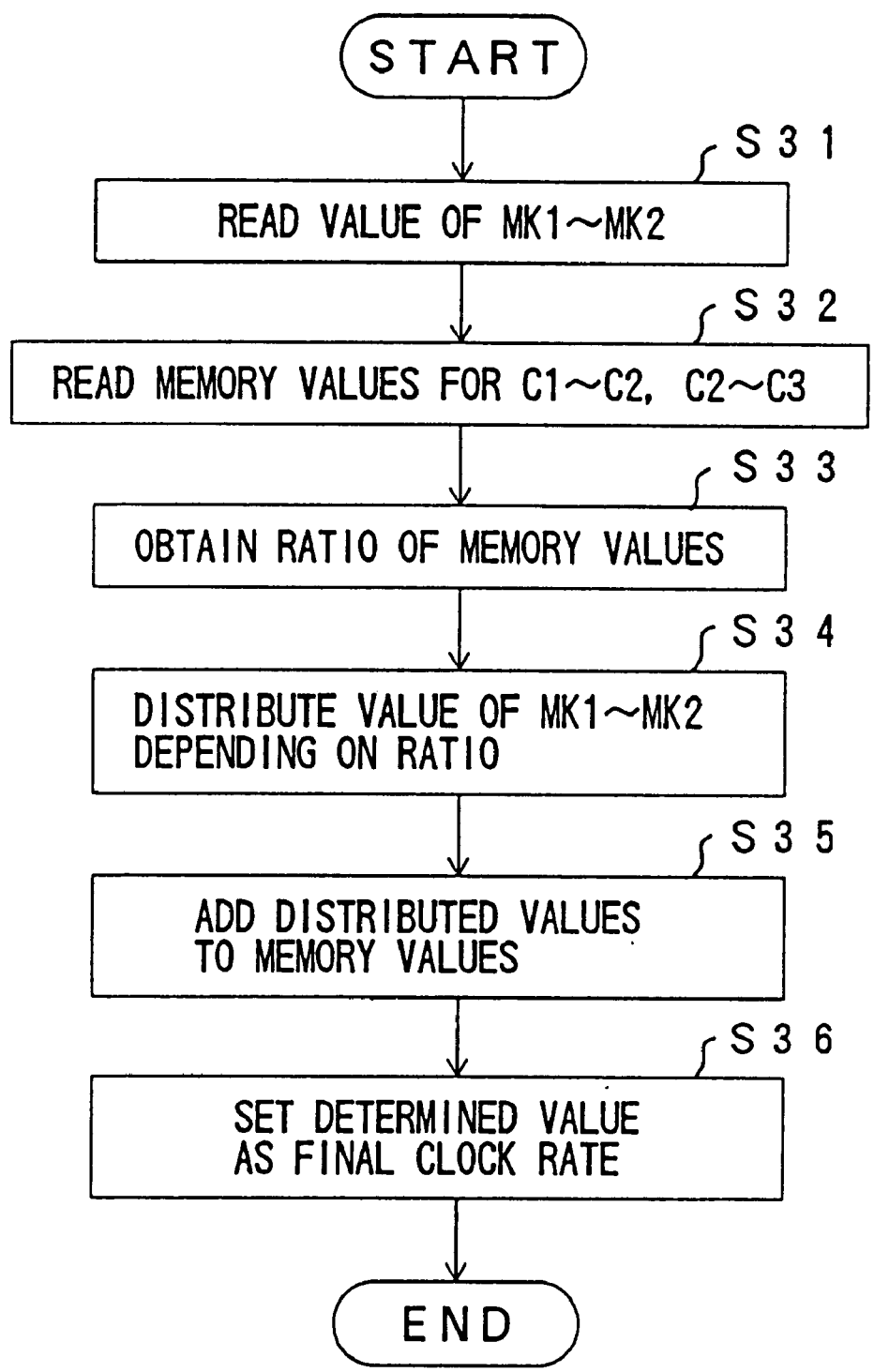
FIG. 39 is a flow chart for explaining an embodiment of a process of a CPU.

The above described calculation process for distributing the characteristics of the section from the position C1 to the position C2, the section from the position C2 to the position C3, and the between the marks MK1 and MK2 so that the ratios of the characteristics match the characteristic of the spindle unit S1, may be carried out by the CPU 225 shown in FIG. 23, for example, using the characteristic data stored in the image data memory 223. FIG. 39 is a flow chart showing an embodiment of the process of the CPU 225 for this case.

In FIG. 39, when an instruction to distribute the characteristics of the sections and the characteristic between the marks with ratios matching the characteristic of the spindle unit is received from the host computer 202, a step S31 reads the characteristic data (60 dots) between the marks MK1 and MK2 from the image data memory 223, and a step S32 reads the characteristic data (80 dots) of the section from the position C1 to the position C2 and the characteristic data (20 dots) of the section from the position C2 to the position C3 from the image data memory 223. A step S33 obtains the ratio (80:20=4:1) of the characteristic of the section from the position C1 to the position C2 and the characteristic of the section from the position C2 to the position C3. A step S34 distributes the characteristic data (60 dots) between the marks MK1 and MK2 depending on the obtained ratio (4:1). In this case, the distribution ratio between the section from the position C1 to the position C2 and the section from the position C2 to the position C3 is 128:32. A step S35 adds the distributed values to the corresponding characteristic data of the section from the position C1 to the position C2 and the section from the position C2 to the position C3 which are read from the image data memory 223. A step S36 sets the characteristic data (128:32) obtained by the addition as the final video clock rate, and the process ends.

Figure 40:
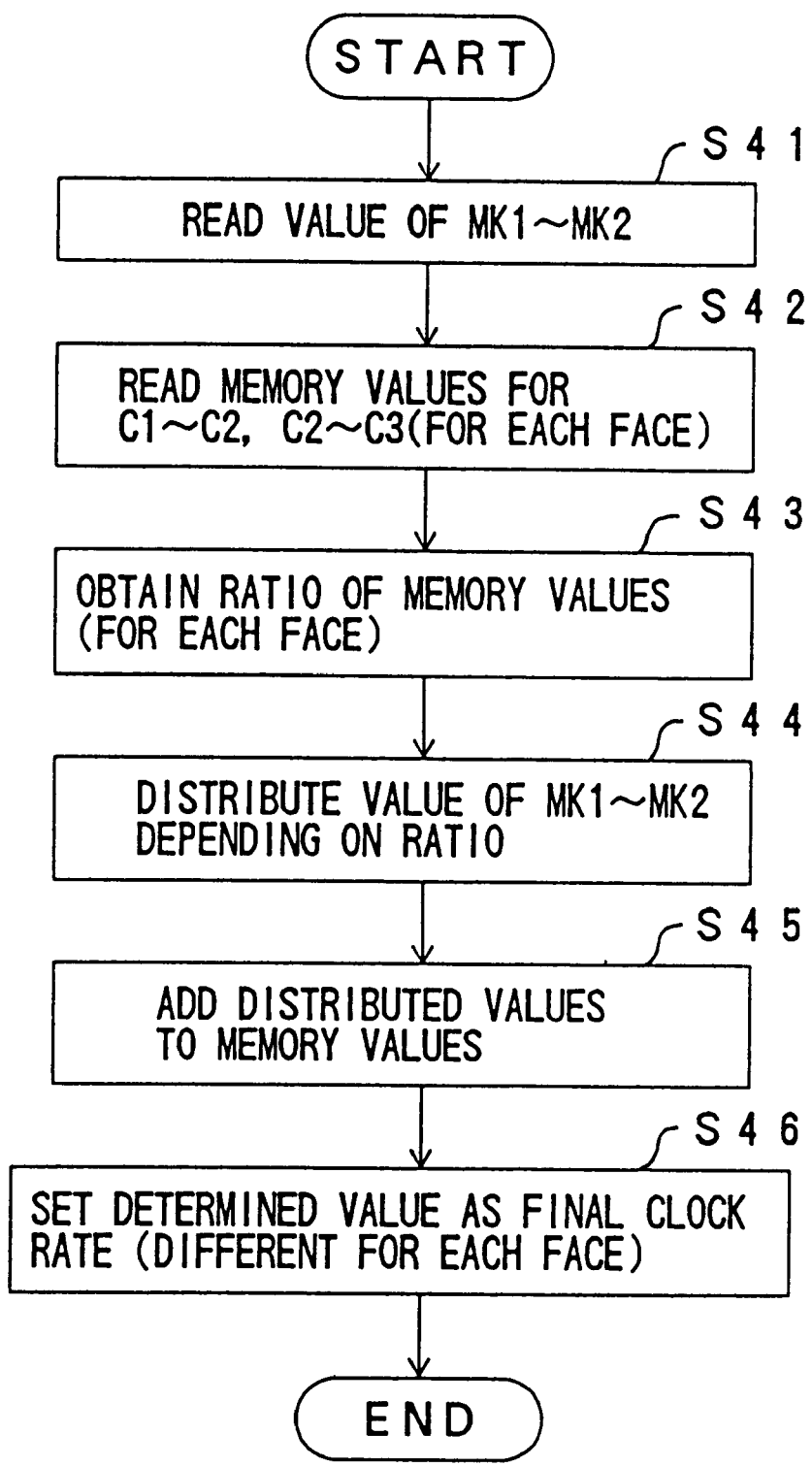
FIG. 40 is a flow chart for explaining an embodiment of a process of a CPU.

It is possible to store in the image data memory 223 characteristic data including face irregularities of the polygonal mirror of the spindle unit S1, for each face of the polygonal mirror. In this case, it is possible to obtain an accurate video clock rate by making the correction for each face of the polygonal mirror using such characteristic data. FIG. 40 is a flow chart showing an embodiment of the process of the CPU 225 for this case.

In FIG. 40, when an instruction to distribute the characteristics of the sections and the characteristic between the marks with ratios matching the characteristic of the spindle unit is received from the host computer 202, a step S41 reads the characteristic data between the marks MK1 and MK2 from the image data memory 223, and a step S42 reads the characteristic data of the section from the position C1 to the position C2 and the characteristic data of the section from the position C2 to the position C3 from the image data memory 223, with respect to each face of the polygonal mirror of the spindle unit. A step S43 obtains the ratio of the characteristic of the section from the position C1 to the position C2 and the characteristic of the section from the position C2 to the position C3, with respect to each face of the polygonal mirror of the spindle unit. A step S44 distributes the characteristic data between the marks MK1 and MK2 depending on the obtained ratio, with respect to each face of the polygonal mirror of the spindle unit. A step S45 adds the distributed values to the corresponding characteristic data of the section from the position C1 to the position C2 and the section from the position C2 to the position C3 which are read from the image data memory 223, with respect to each face of the polygonal mirror of the spindle unit. A step S46 sets the characteristic data which are obtained with respect to each face of the polygonal mirror by the addition as the final video clock rate, and the process ends.

The characteristic data between the marks MK1 and MK2 may be obtained every time the resolution of the image data is switched, and stored in the image data memory 223. In addition, the characteristic data stored in the image data memory 223 may be used to carry out the process shown in FIG. 39 or FIG. 40 every time the resolution is switched.

Figure 41:
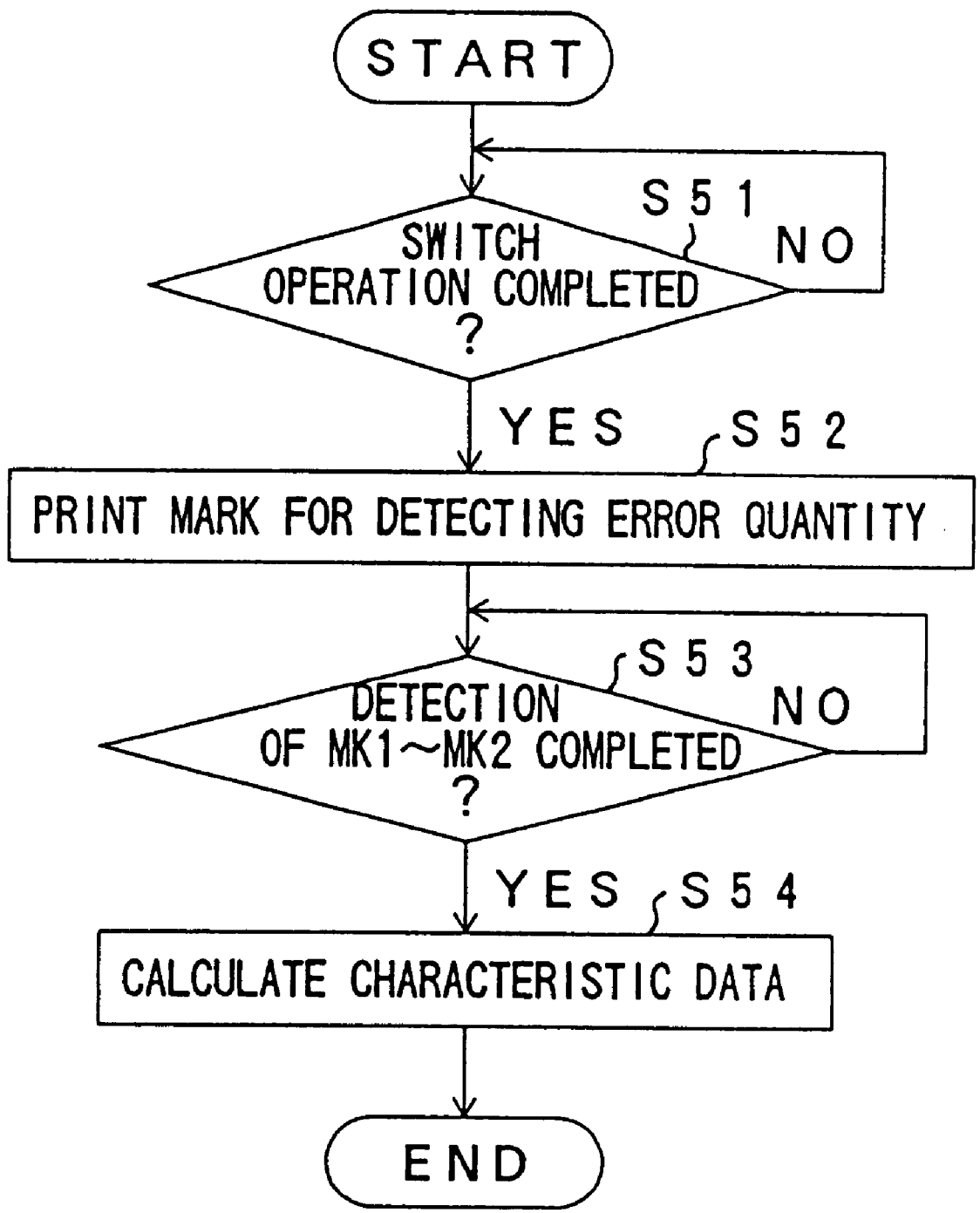
FIG. 41 is a flow chart for explaining an embodiment of a process of a CPU.

FIG. 41 is a flow chart showing an embodiment of the process of the CPU 225 for the case where the characteristic data between the marks MK1 and MK2 are obtained and stored in the image data memory 223 every time the resolution of the image data is switched.

In FIG. 41, when an instruction to switch the resolution is received from the host computer 202, a step S51 decides whether or not the operation to switch the resolution is completed. When the decision result in the step S51 becomes YES, a step S52 prints on the transport belt 218 the marks MK1 and MK2 which are used to detect the dot printing error. A step S53 decides whether or not the detection of the marks MK1 and MK2 by the CCD image sensor 219 is completed. When the decision result in the step S53 becomes YES, a step S54 obtains the characteristic data between the marks MK1 and MK2 by carrying out a calculation, and the characteristic data are stored in the image data memory 223, thereby ending the process. When immediately correcting the dot printing error using the characteristic data stored in the image data memory 223, the process shown in FIG. 39 or FIG. 40 is carried out thereafter.

The video clock rate may be obtained by carry out a calculation based on a video clock rate which is once determined with respect to a resolution. FIG. 42 is a flow chart showing an embodiment of the process of the CPU 225 for this case.

In FIG. 42, when an instruction to switch the resolution is received from the host computer 202, a step S61 decides whether or not the operation to switch the resolution is completed. When the decision result in the step S61 becomes YES, a step S62 reads the video clock rate which is calculated before with respect to a reference resolution and is stored in the image data memory 223. For example, the reference resolution is 240 dpi, and the resolution is switched to 600 dpi. A step S63 obtains the dot printing error at the print starting position by multiplying the ratio of the resolutions, that is, (reference resolution):(resolution after switching), to the video clock rate with respect to the reference resolution. In this case, the ratio (reference resolution):(resolution after switching)=1:2.5, and thus, a value 2.5 is multiplied to the video clock rate with respect to the reference resolution. A step S64 sets the value obtained in the step S63 as the final video clock rate; and the process ends.

In each of the embodiments described above, the present invention is applied to a printer. However, the present invention is not limited to the printer, and the present invention is similarly applicable to various other kinds of image forming apparatuses such as a copying machine.

Further, the present invention is not limited to these embodiments, but various variations and modifications may be made without departing from the scope of the present invention.

What is claimed is:

1. A spindle unit control method which controls a plurality of spindle units which rotate in synchronism with each other, said spindle unit control method with respect to each of the spindle units comprising:

a first step of obtaining a phase error by comparing phases of a detection signal indicating a rotary reference position of the spindle unit and a first clock signal;

a second step of generating a second clock signal having a phase which is adjusted by delaying or advancing the phase of the first clock signal by said phase error; and a third step of controlling the rotation of the spindle unit by a phase locked loop based on the detection signal and the second clock signal, said first clock signal being used in common with respect to each of the spindle units, said second clock signal being independent for each of the spindle units.

2. The spindle unit control method as claimed in claim 1, wherein said second step adjusts the phase of the first clock signal for every period of time T.

3. The spindle unit control method as claimed in claim 2, wherein said second step changes a value of the period of time T depending on said phase error.

4. The spindle unit control method as claimed in claim 1, wherein said second step adjusts the phase of the second clock signal for every period of time T.

5. The spindle unit control method as claimed in claim 1, wherein said first step obtains the phase error between the detection signal and the first clock signal using a hysteresis characteristic.

6. The spindle unit control method as claimed in claim 1, wherein said third step is carried out after the rotation of each of the spindle units stabilize.

7. The spindle unit control method as claimed in claim 1, wherein said third step generates an alarm when a number of times the rotation of the spindle unit is corrected per unit time becomes a predetermined value.

8. The spindle unit control method as claimed in claim 1, which further comprises, with respect to each of the spindle units:

a fourth step of dividing a scan interval which is scanned by a light beam from the spindle unit into a plurality of sections in a main scan direction, and correcting a video clock rate which indicates a minimum unit of image data within each of the sections depending on a characteristic of the spindle unit; and a fifth step of correcting the video clock rate depending on distances between the spindle unit and each of the sections.

9. The spindle unit control method as claimed in claim 8, wherein said fifth step corrects the video clock rate depending on a resolution of the image data.

10. An image forming apparatus comprising a plurality of spindle units which rotate in synchronism with each other, said image forming apparatus, with respect to each of the spindle units, comprising:

phase comparing means for obtaining a phase error by comparing phases of a detection signal indicating a rotary reference position of the spindle unit and a first clock signal;

phase adjusting means for generating a second clock signal having a phase which is adjusted by delaying or advancing the phase of the first clock signal by said phase error; and control means for controlling the rotation of the spindle unit by a phase locked loop based on the detection signal and the second clock signal, said first clock signal being used in common with respect to each of the spindle units, said second clock signal being independent for each of the spindle units.

11. The image forming apparatus as claimed in claim 10, wherein said phase adjusting means adjusts the phase of the first clock signal for every period of time T.

12. The image forming apparatus as claimed in claim 11, wherein said phase adjusting means changes a value of the period of time T depending on said phase error.

13. The image forming apparatus as claimed in claim 10, wherein said phase adjusting means adjusts the phase of the second clock signal for every period of time T.

14. The image forming apparatus as claimed in claim 10, wherein said phase comparing means obtains the phase error between the detection signal and the first clock signal using a hysteresis characteristic.

15. The image forming apparatus as claimed in claim 10, wherein said control means carries out a control after the rotation of each of the spindle units stabilize.

16. The image forming apparatus as claimed in claim 10, wherein said control means generates an alarm when a number of times the rotation of the spindle unit is corrected per unit time becomes a predetermined value.

17. The image forming apparatus as claimed in claim 10, which further comprises with respect to each of the spindle units:

first means for dividing a scan interval of a to-be-scanned member which is scanned by a light beam from the spindle unit into a plurality of sections in a main scan direction, and correcting a video clock rate which indicates a minimum unit of image data within each of the sections depending on a characteristic of the spindle unit; and second means for correcting the video clock rate depending on distances between the spindle unit and each of the sections.

18. The image forming apparatus as claimed in claim 17, wherein said second means corrects the video clock rate depending on a resolution of the image data.

19. A spindle unit control method comprising:

a first step of dividing a scan interval which is scanned by a light beam from a spindle unit into a plurality of sections in a main scan direction, each section being measured by a minimum unit of image data with a corresponding video clock rate, and determining a first video clock rate correction value that compensates for a positional deviation in the main scan direction of the light beam from an end position of each section; and a second step of determining a second video clock rate correction value that compensates for variations in focal distances between the spindle unit and a photoconductive drum.

20. The spindle unit control method of claim 19 wherein said second step determines the second video clock rate correction value based on a deviation from a predetermined distance in the main scan direction between a pair of printed marks on a transfer belt, the pair of printed marks being printed using the first video clock rate correction value applied to the video clock rate.

21. The spindle unit control method of claim 19 further comprising a third step of applying the first and second video clock rate correction values to the video clock rate, wherein the second video clock rate correction value is evenly distributed among the plurality of sections.

22. The spindle unit control method of claim 19 further comprising a third step of applying the first and second video clock rate correction values to the video clock rate, wherein the second video clock rate correction value is distributed among the plurality of sections corresponding to a ratio of the first video clock rate correction value across each of the plurality of sections.

23. An image forming apparatus comprising:

a spindle unit scanning a to-be-scanned member by a light beam;

first means for dividing a scan interval of the to-be-scanned member which is scanned by the light beam into a plurality of sections in a main scan direction, each section being measured by a minimum unit of image data with a corresponding video clock rate and determining a first video clock rate correction value that compensates for a positional deviation in the main scan direction of the light beam from an end position of each section; and second means for determining a second video clock rate correction value that compensates for variations in focal distances between the spindle unit and a photoconductive drum.

24. The image forming apparatus as claimed in claim 23 wherein said second means determines the second video clock rate correction value based on a deviation from a predetermined distance in the main scan direction between a pair of printed marks on a transfer belt, the pair of printed marks being printed using the first video clock rate correction value applied to the video clock rate.

25. The image forming apparatus as claimed in claim 23 further comprising a third means for applying the first and second video clock rate correction values to the video clock rate, wherein the second video clock rate correction value is evenly distributed among the plurality of sections.

26. The image forming apparatus as claimed in claim 23 further comprising a third means for applying the first and second video clock rate correction values to the video clock rate, wherein the second video clock rate correction value is distributed among the plurality of sections corresponding to a ratio of the first video clock rate correction value across each of the plurality of sections.

* * * * *